US012732664B2

(12) United States Patent
Splittgerber et al.

(10) Patent No.: US 12,732,664 B2
(45) Date of Patent: Sep. 8, 2026

(54) SMART VIDEO SEEK AND PLAYBACK EXPERIENCES

(71) Applicant: Roku, Inc., San Jose, CA (US)

(72) Inventors: Kyle Matthew Splittgerber, San Jose, CA (US); Sheldon Thane Radford, Palo Alto, CA (US); Sunil Ramesh, Saratoga, CA (US); Frank Maker, Livermore, CA (US); Samir Saxena, Los Altos, CA (US); Ritwick Babbar, Fremont, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/918,908

(22) Filed: Oct. 17, 2024

(65) Prior Publication Data

US 2026/0113510 A1 Apr. 23, 2026

(51) Int. Cl.

*H04N 21/472* (2011.01)
*G06V 10/74* (2022.01)
*G06V 10/77* (2022.01)
*G06V 20/40* (2022.01)
*H04N 21/845* (2011.01)

(52) U.S. Cl.

CPC ..... *H04N 21/47217* (2013.01); *G06V 10/761* (2022.01); *G06V 10/7715* (2022.01); *G06V 20/46* (2022.01); *G06V 20/48* (2022.01); *H04N 21/8455* (2013.01)

(58) Field of Classification Search

CPC ......... H04N 21/47217; H04N 21/8422; G06V 10/7715; G06V 20/46; G06V 10/761; G06V 20/48

USPC ........................................................ 386/241

See application file for complete search history.

(56) References Cited

U.S. PATENT DOCUMENTS

2019/0272088 A1* 9/2019 Liu .................... H04N 21/2393

* cited by examiner

*Primary Examiner* — Girumsew Wendmagegn

(74) *Attorney, Agent, or Firm* — Straylight LLP

(57) ABSTRACT

System, apparatus, article of manufacture, method and/or computer program embodiments are provided for implementing smart video experiences. An example method includes receiving a request to perform a video control operation during playback of a video; based on a type of video control operation of the video control operation and a playback position of the video, selecting one or more video markers for the video control operation from a plurality of video markers associated with respective video frames from a plurality of video frames of the video, the one or more video markers being associated with one or more video frames of the video; selecting the one or more video frames for the video control operation based on the one or more video markers; and generating a signal configured to trigger the video control operation based on the one or more video frames associated with the one or more video markers.

20 Claims, 14 Drawing Sheets

SMART VIDEO SEEK AND PLAYBACK EXPERIENCES

BACKGROUND

Field

This disclosure is generally directed to video intelligence and recognition and, more specifically, smart video control experiences generated using video markers generated for video frames based on context information and features extracted from video and related content.

SUMMARY

Provided herein are system, apparatus, article of manufacture, method and/or computer program product embodiments (and/or combinations and/or sub-combinations thereof) for smart video seek, replay, and playback experiences. In some aspects, a method is provided for smart video seek, replay, and playback experiences. An example method can include receiving a request to perform a video control operation during playback of a video at a client device; based on a type of video control operation of the requested video control operation and a playback position of the video, selecting one or more video markers for the video control operation from a plurality of video markers associated with respective video frames from a plurality of video frames of the video, the one or more video markers being associated with one or more video frames of the video; selecting the one or more video frames for the requested video control operation based on the one or more video markers; and generating a signal configured to trigger the video control operation based on the one or more video frames associated with the one or more video markers.

In some aspects, a system is provided for smart video seek, replay, and playback experiences. The system can include one or more computing and/or media devices such as, for example, a television, a media player, a server, a computer, a set-top box, an Internet-of-Things (IoT) device, a peripheral device, a mobile device (e.g., a smartphone, etc.), a wearable computing device (e.g., a smartwatch, smartglasses, a head-mounted display (HMD), an extended reality (e.g., virtual reality, augmented reality, mixed reality, virtual reality with video passthrough, etc.) glasses, etc.) system, a single-board computer (SBC) or system-on-chip (SoC) device, a video game console, and/or a smart device, among others.

The system can include memory used to store data (e.g., computing instructions, etc.) and one or more processors coupled to the memory and configured to receive a request to perform a video control operation during playback of a video at a client device; based on a type of video control operation of the requested video control operation and a playback position of the video, select one or more video markers for the video control operation from a plurality of video markers associated with respective video frames from a plurality of video frames of the video, the one or more video markers being associated with one or more video frames of the video; select the one or more video frames for the requested video control operation based on the one or more video markers; and generate a signal configured to trigger the video control operation based on the one or more video frames associated with the one or more video markers.

In some aspects, a non-transitory computer-readable medium is provided for smart video seek, replay, and playback experiences. In some cases, the non-transitory computer-readable medium can have instructions stored thereon that, when executed by one or more processors, cause the one or more processors to perform operations including receiving a request to perform a video control operation during playback of a video at a client device; based on a type of video control operation of the requested video control operation and a playback position of the video, selecting one or more video markers for the video control operation from a plurality of video markers associated with respective video frames from a plurality of video frames of the video, the one or more video markers being associated with one or more video frames of the video; selecting the one or more video frames for the requested video control operation based on the one or more video markers; and generating a signal configured to trigger the video control operation based on the one or more video frames associated with the one or more video markers.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
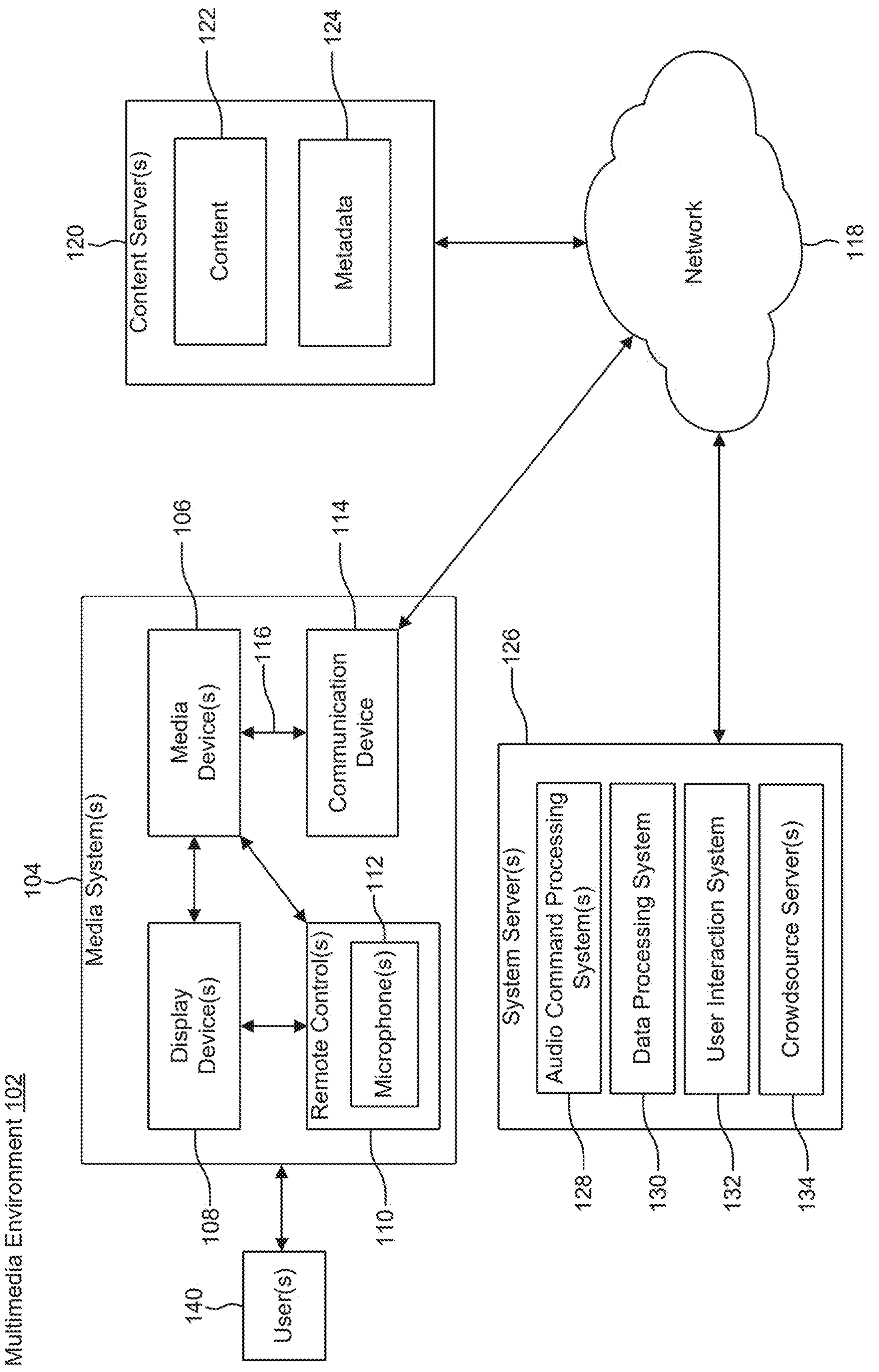
FIG. 1 is a block diagram illustrating an example multimedia environment, according to some examples of the present disclosure.

Users can access and consume media content using various types of media devices such as, for example and without limitation, mobile phones (e.g., smartphones), set-top boxes, computers (e.g., desktop computers, laptop computers, tablet computers, etc.), televisions (TVs), Internet Protocol television (IPTV) devices or receivers, media players, displays or monitors, projectors, video game consoles, smart wearable devices (e.g., smartwatches, smartglasses, head-mounted displays (HMDs), extended reality devices (e.g., virtual reality glasses, augmented reality glasses, mixed reality glasses, virtual reality devices with video pass-through, etc.), single-board computers (SBCs) or system-on-chip (SoC) devices, and Internet-of-Things (IoT) devices, among other devices. The media content can include or encompass digital formats and/or assets such as, for example and without limitation, videos (e.g., live videos, pre-recorded or on-demand videos, streamed videos, TV shows, movies, animated videos, motion graphics videos, live action recordings, video clips, any sequence of video frames or graphics, etc.), video games, audio, text (e.g., closed captions, subtitles, onscreen text, intertitles, superimposed text, and/or any other text content), graphics, video channels, and/or images, among other types.

For example, a user can use a media device to watch a video from a media content platform, a streaming service, an online content delivery network, a media player application, an online video sharing application, a web browser, a TV platform, etc. The video can include, for example, a live or on-demand video (e.g., a movie, a TV show, a live video feed, a video stream, etc.), an animated video, a video broadcast, a video game, a video conference, etc. The media device can stream the video from a media platform (e.g., a content provider, an online or streaming service, a media channel, a media application, a video broadcast receiver, a web browser, a video receiver, a video sharing or social media platform, etc.) or access the video from storage. The media device can then display the video for a user on a display/screen of the media device and/or a separate/external display. The user of the media device can use the media device, a remote control device, and/or an application to manage settings of the video (e.g., a volume, closed caption settings, subtitle settings, a video or display resolution for the video, color settings, etc.), navigate the video, control a playback or behavior of the video, access other media content, etc. In many cases, the media device can include, access, and/or manage a wide range of media content items (e.g., videos such as live videos, and/or on-demand videos, images, audio content, etc.), channels, applications, settings, output devices, functionalities, and/or other features and components.

Unfortunately, the media devices and videos available to users generally have limited controls, settings, and control functionalities for controlling the behavior of the videos or making other adjustments to the videos. For example, the videos generally have limited playback options and settings that are predetermined and lack capabilities for customizing the videos as well as playback options settings for the user. The media devices used to access the videos may have a limited set of controls that users can use to interact with the videos and manage their viewing experience, but such controls are also pre-set and lack flexibility and capabilities for customization. While there are other control devices, such as remote control devices, that allow users to interact with videos and manage their viewing experience, such devices typically have limited control options and functionalities, which are similarly fixed/predetermined and lack flexibility to implement different, more tailored controls, options, settings, or experiences for the users.

For example, control devices such as remote controls and media devices with control capabilities may have an instant replay button or feature that allows users to replay a portion of a video. However, the instant replay button or feature is generally pre-set according to a fixed time interval defined for the instant replay effect associated with the instant replay button or feature. Here, the instant move the playback position of the video by a fixed time interval to an earlier position within the video playback timeline corresponding the fixed time interval relative to the current playback position. Thus, the instant replay button or feature typically provides the same replay behavior across devices, users, and content, even though different users may have different preferences for replay behaviors (and associated time intervals) and, indeed, a same user may have different replay preferences for different videos or video segments, which may depend on various reasons such as, for example, the reason why the user triggered the instant replay, the content being watched by the user, and/or the context associated with the content (e.g., the scene depicted in the content, activity depicted in the content, events depicted in the content, etc.). Some devices may provide other control options such as software-based playback controls (e.g., software remote controls, playback controls on media player applications, etc.), but the software-based playback controls are similarly limited and provide fixed/pre-determined playback options across users, videos, and devices. Therefore, the software-based playback controls are also inflexible and lack options to account for differences in user preferences, contexts, content, and user experiences.

Moreover, video content providers generally prepare videos for large audiences and configure the videos to include a common set of features, settings, options, and control functionalities across users and devices in order to limit costs and provide consistent user experiences at the expense of other benefits to the users, such as customization and intelligent behaviors and functionalities. As a result, the videos from the video content providers are not tailored to users and provide little, if any, flexibility for users to deviate from the pre-set controls, options, behaviors, and parameters of the videos for a more unique or customized user experience. However, users would otherwise benefit from more intelligent, flexible, and customizable video content and playback control options, features, and behaviors, particularly given the increasing amount of video content available to users, which could otherwise be leveraged to provide better user experiences, and the increasing variety of media devices used to consume such video content.

In addition, many users find it difficult and cumbersome to navigate video content and the large amount of videos available from different channels, applications, platforms, devices, and media libraries. For example, it can be difficult and cumbersome for users to navigate to a specific segment or event in a video and otherwise control and manipulate video content for better, more intelligent user experiences. Users often feel limited in the tools available to help them navigate video content and make desired adjustments to the video content and the behavior of the video content. This can lead to user frustration and dissatisfaction.

Provided herein are system, apparatus, device, method (also referred to as a process) and/or computer program product embodiments, combinations and/or sub-combinations thereof (also referred to as "systems and techniques" hereinafter) for smart video seek and playback experiences. The systems and techniques described herein can intelligently detect portions of a video(s) containing certain features and use the detected portions of the video(s) to provide intelligent and/or customized user experiences, such as intelligent/customized video content, seek controls, playback controls, content settings, and/or content behaviors. The detected features can include certain content, characteristics, and/or information learned, determined, and/or predefined as candidate features for smart video seek and playback experiences, such as certain content attributes, content estimated to have threshold saliency scores/values, content estimated to have threshold user interest scores, content estimated to have threshold user disinterest scores, activity levels, motion levels, anomalies estimated to have threshold anomality scores, content with certain uniqueness or distinctiveness scores, content estimated to have threshold importance scores, content changes, content estimated to have certain changes or change scores, etc.

For example, the features used to detect the portions of a video(s) can include features predicted or estimated to be of interest to a user(s) (and/or have a threshold user interest score or likelihood), which can be used to detect associated content for inclusion in viewing experiences such as custom content experiences and smart video seek and playback (VSP) experiences; features predicted or estimated to be of disinterest to the user(s) (and/or have a threshold user disinterest score or likelihood), which can be used to determine associated content for exclusion from viewing experiences such as custom content experiences and/or smart VSP experiences; features predicted or estimated to have certain attributes, saliency, activity, motion, characteristics, etc., which can be used to determine whether to select associated content for inclusion in or exclusion from viewing experiences such as custom content experiences and/or smart VSP experiences. In some examples, the detected features can include and/or correspond to, without limitation, certain (and/or certain types and/or levels of) events, scenes, activities, objects, moments, patterns, behaviors, users/faces, content, shapes, qualities, conditions, information, attributes, motion, saliencies, anomalies, and/or characteristics of and/or depicted in the video(s) (e.g., in a single video and/or across a set of videos).

Similarly, the detected portions of a video(s) containing such features can include, for example and without limitation, certain (and/or certain types and/or levels of) events, scenes, activities, objects, moments, patterns, segments, behaviors, content, shapes, qualities, conditions, information, attributes, motion, users/faces, saliencies, and/or characteristics of or depicted in the detected portions of the video(s) (e.g., in a single video and/or across a set of videos). For example, a detected portion of the video(s) containing one or more of such features can include one or more events, scenes, objects, moments, activity, patterns, users/faces, attributes, content, motion, information, etc., that may be of interest to a user(s) (and/or that may have a threshold user interest or likelihood of interest score) in cases where such portion of the video(s) is detected for inclusion in a viewing experience, or that may be of disinterest to the user(s) (and/or that may have less than a threshold user interest or likelihood of interest score) in cases where the portion of the video(s) is detected for exclusion in/from a viewing experience (e.g., through a skip or forward function, etc.). When determining a portion of a video(s) and/or a feature in/of the portion of the video(s) should be detected for use/inclusion in or exclusion from a viewing experience (e.g., a custom content experience, a smart VSP experience, etc.), the systems and techniques described herein can take into account a number of factors and/or insights used to provide detection intelligence, accuracy, customization, and/or other benefits.

For example and without limitation, in some cases, when determining whether a portion of a video(s) and/or a feature in/of the portion of the video(s) should be detected for use/inclusion in or exclusion from the viewing experience, the systems and techniques described herein can take into account user preferences defined by a user(s) and/or learned from user interactions, a content of the portion of the video(s), a semantic meaning or quality/characteristic of the content and/or anything depicted in the portion of the video(s), a relevance or similarity of the content in the portion of the video(s) to other content within the same video(s) and/or other videos, an attribute of the portion of the video(s) and/or the associated content, the type of content in the portion of the video(s), what the portion of the video(s) depicts or conveys, previous user interactions with any videos (and/or video portions), information about the user (e.g., demographics, location information, a user profile, user interests, etc.), contextual information (e.g., an environment of the user(s) or an associated media device, a type of content, a user sentiment, a location of the user(s) and/or an associated media device, a type of media device and/or display used by the user(s) to consume the video(s), capabilities of the media device and/or display, activity and/or interactions depicted in the portion of the video(s), visual information in the portion of the video(s), audio information in the portion of the video(s), text information in the portion of the video(s), a language or other setting of the video(s), etc.), and/or any other factor and/or insight.

A smart VSP experience can include, depict, and/or implement, for example and without limitation, a replay function (e.g., instant replay, highlight replay, action replay, clip or segment replay, scene replay, event replay, etc.), a skip or forward function, a rewind function, a pause or stop function, a playback function, a record function, a playback speed adjustment function (e.g., slow motion, fast motion, etc.), a custom video package or rendering (e.g., a highlight video, a custom reel, a play-by-play or action-by-action video, a video timeline, etc.), a mute function, and shuffle function, a render function, and/or any other video experience. In some examples, the systems and techniques described herein can use the detected portion(s) of the video(s) to provide smart VSP controls, options/settings, and/or behavior. For example, rather than using a fixed/predetermined time interval to configure instant replay or other seek controls for the video(s), the systems and techniques described herein can configure the instant replay and/or other seek controls for the video(s) based on the detected portion(s) of the video(s). This way, when a user triggers an instant replay control during a playback of a video, the instant replay control can return the playback position of the video to a location before or within a selected portion of the video having certain features (e.g., a feature of interest to the user, a feature having a threshold interest score, a feature having a threshold likelihood of interest score, a feature having a threshold saliency score, etc.), rather than a location calculated based on a fixed and predetermined time interval relative to a current playback position. In other words, rather than configuring all instant replays to move a seek position by a fixed time interval, the systems and techniques described herein can configure each instant replay to more intelligently move the seek position to a location within the video determined to contain a certain feature(s) detected, learned, and/or defined for smart VSP experiences, such as a feature of interest to the user.

To illustrate, assume the user is watching a video showing a soccer game and the user misses (or may be interesting in replaying) a goal scored in the soccer game. The systems and techniques described herein can detect (e.g., offline or during playback such as in real-time) that a goal was scored in the video/game (e.g., by detecting the goal or score change in a portion of the video). Here, the goal can be a feature detected by the systems and techniques described herein for use in or to provide smart VSP experiences. The systems and techniques described herein can thus detect that the goal and the video portion depicting the play leading to the goal for the smart VSP experience, and set a marker on the video portion depicting the play leading to the goal, which defines a location or point in the video that represents a seek position for a smart VSP experience, such as an instant replay. Thus, the marker can identify the beginning of the play leading to the goal as the seek position for the start of an instant replay.

In this example, when the user triggers the instant replay (e.g., via a remote control, a media device, or a software application), the systems and techniques described herein can provide a smart instant replay (e.g., which can be a type of smart VSP experience) by using the marker to identify and move the seek position of the video for the smart instant replay to the beginning of the play leading to the goal, and replaying the play leading to the goal starting from the seek position set for the smart instant replay. This way, the smart instant replay can intelligently replay the goal (and associated play) for the user as opposed to replaying a portion of the video corresponding to a fixed time interval. On the other hand, if the instant replay portion is instead determined by a fixed time interval, the instant replay portion may not include the play leading to the goal, may not include the beginning of the play, may start earlier or later than desired by the user, may require the user to trigger the instant replay multiple times to move the seek position by the fixed time interval multiple times to include a more complete portion of the play, or may require the user to manually skip (e.g., via rewind) through the video until the seek position of the video is changed to the desired location within the video that shows the beginning of the play leading to the goal.

As another example, if the user is watching a video showing a debate and the systems and techniques described herein detect (e.g., offline, in real-time, during playback, etc.) a particular discussion or comment identified as a candidate feature for a smart VSP experience (e.g., because the particular discussion or comment is predicted to be of interest to the user, have a threshold user interest score, have a threshold likelihood of interest to the user, include a particular topic, etc.). The systems and techniques described herein can thus detect the portion of the video that includes the detected feature (e.g., the discussion or comment) as a candidate for a smart VSP experience, and set a marker on the portion of the video (e.g., at the beginning of the portion of the video corresponding to the beginning of the discussion or comment). Here, the marker can represent or define a seek position for the smart VSP experience, such as a smart instant replay. If the user misses the discussion or comment or wants to rewatch the portion of the video that includes the discussion or comment, the user can trigger a smart instant replay configured to intelligently initiate a replay of the portion of the video associated with the marker set as the seek position for the smart instant replay and which includes the beginning of the discussion or comment. As shown, the smart instant replay here is intelligently set to replay the portion of the video determined to include a candidate feature for smart VSP, rather than replaying a fixed time interval which may or may not include the discussion/comment or all of the discussion/comment.

The systems and techniques described herein can use the portions of a video(s) that have candidate features for smart VSP to configure any smart VSP experience, such as any smart seek and playback controls, features, functionalities, attributes, packages, etc. For example, the systems and techniques described herein can use a portion(s) of a video(s) that includes a candidate feature for smart VSP to allow the user(s) to intelligently replay content in the portion(s) of the video, skip the content, rewind the content, record the content, change a playback speed of the content (e.g., slower motion, faster motion), include the content in a custom video package, exclude the content from a custom video package, etc. In some examples, the portion(s) of a video(s) identified for use in a smart VSP experience and/or associated with a marker for smart VSP can include a content and/or feature that the systems and techniques described herein predict or determine that a user(s) may be interested in viewing, replaying, reviewing, forwarding, recording, rewatching, storing, skipping, adjusting (e.g., adjusting a playback speed or setting, etc.), filtering, and/or reusing (e.g., as part of customized content such as a highlight video or package, a customized reel or clip, a play-by-pay video, a customized video or package, etc.). To illustrate, in the context of a smart VSP experience including a smart skip control, a portion of a video determined for the smart skip control can include a content and/or feature of interest to a user in the sense that the user may be interested in skipping such portion of the video containing that content and/or feature such that, when the user triggers a smart skip control during playback of the video, the video can skip such portion of the video and continue playback after the skipped portion of the video.

For example, if the user likes to skip portions of a game when the game pauses for a player injury or foul (e.g., as determined from user preferences, learned behavior, previous interactions, user feedback, etc.), the systems and techniques described herein can detect each player injury or foul that occurs during the game depicted in a video, and configure a smart video skip control that, when triggered (e.g., by the user through a remote, application, and/or media device), causes the video to skip over a next or closest player injury or foul that occurred during the game relative to a current playback position of the video. As illustrated, in this example, when a player injury or foul occurs during the game and the user triggers the video skip control during playback of the video of the game, the video skip control can identify a skip marker corresponding to a next or closest player injury or foul relative to a current playback position, and use the skip marker to skip over that player injury or foul (e.g., by moving the seek position to a position within the video after or at the end of the portion of the video showing the player injury or foul) and continue playback of the video from a position after the player injury or foul (e.g., when the game resumes).

In this example, the systems and techniques described herein can determine that content/events that include or depict player injuries or fouls are candidate features for smart VSP (e.g., are features of interest to the user in the context of video skip controls). The systems and techniques described herein can detect such content/events as candidate features for smart VSP based on user preferences indicating that the user prefers to skip over player injuries or fouls, a learned behavior from the user (and/or other users), user interactions with videos where the user (and/or other users) skip over player injuries or fouls, feedback from the user (and/or other users) indicating a lack of (or lower) interest in watching player injuries or fouls, and/or any other factors.

In some cases, the systems and techniques described herein can use a set of detected video portions (from a single video or across multiple videos) containing one or more candidate features detected for smart VSP, to generate a customized video or package for a user. The customized video or package can include the detected video portions. For example, the detected video portions can be stitched or combined together to form a video reel of customized content. To illustrate, if the systems and techniques described herein determine that a user likes to watch a specific type of play from a particular player, the systems and techniques described herein can detect each video portion (e.g., each video frame or set of video frames) depicting that player performing the specific type of play, and generate a highlight video reel that contains each video portion depicting that player performing the specific play. To generate the highlight video reel, the systems and techniques described herein can stitch together the video portions depicting the player performing the specific type of play. The video portions can be detected as candidate features for smart VSP from videos associated with a particular time-frame (e.g. a year or season, all available years or seasons, a particular tournament, etc.), a particular team of the player (or multiple teams of the player such as a club team and a national team or different club teams that the player played for), a particular team that the player played against, and/or any other filter or inclusion parameters. The systems and techniques described herein can display the highlight video reel for the user, provide the highlight video reel to a device for presentation to the user, provide a link to the highlight video reel, and/or notify the user about the highlight video reel (and/or notify the user about a link where the user can access the highlight video reel).

As previously noted, in some examples, the systems and techniques described herein can generate markers used to identify positions within videos corresponding to video portions selected for smart VSP experiences based on features in the video portions detected (and/or recognized) as candidate features for smart VSP. The systems and techniques described herein can use the markers associated with the videos to implement smart VSP experiences such as smart video seek/playback controls (e.g., smart instant replays, video skip, video rewind, video speed adjustment, video record, video seek, etc.), smart custom video packages or reels, smart notifications, etc. For example, the markers associated with the videos (e.g., embedded within the videos, signaled with the videos, correlated or mapped to the videos, included with the videos and/or associated metadata, identified in video data and/or signaling information, etc.) can identify positions within the videos used by the systems and techniques described herein to respond to smart VSP signals (e.g., smart VSP control signals, etc.) and/or generate customized content (and/or associated notifications) for users such as highlight video reels, play-by-play videos, year-in-review videos, favorites video reels, custom video packages, etc.

To illustrate, when a user triggers a smart VSP control action (e.g., an instant replay, a video skip, a video rewind, a slow-motion setting, a fast-motion setting, a resolution change, a seek function, etc.) during playback of a video, the systems and techniques described herein can search for a smart VSP marker in the video or associated with the video and use the smart VSP marker to implement the smart VSP control action. If the video contains multiple smart VSP markers, the systems and techniques described herein can correlate the smart VSP control action with a particular marker, and implement the smart VSP control action based on the particular marker correlated to the smart VSP control action. The particular marker can be correlated to the smart VSP control action based on one or more factors such as, for example, the type of smart VSP control action compared to the type of markers associated with the video, the position of each marker relative to the current playback position (e.g., the distance of each marker to the current playback position), one or more characteristics (e.g., parameters, attributes, commands, requests, etc.) of a smart VSP signal corresponding to the smart VSP control action, etc.

For example, the systems and techniques described herein can correlate the smart VSP control action with the closest marker (e.g., relative to other markers) to the playback position of the video when the smart VSP control action was triggered or received, the marker corresponding to the type of smart VSP control action that is closest to (relative to other markers and/or other markers corresponding to the type of smart VSP control action) the current playback position when the smart VSP control action, a marker determined to be most relevant to a context associated with the smart VSP control action, etc. The systems and techniques described herein can use the correlated/identified marker to determine a seek position within the video corresponding to the position of or identified by the marker for the smart VSP control action, and move the current playback position of the video to that seek position within the video. In some cases, the smart VSP control action can then trigger playback of the video from that seek position.

The systems and techniques described herein can embed the markers within videos (e.g., within corresponding positions/locations in the videos), encode the markers with the videos or the video signals, include the markers in metadata of the videos, signal the markers with the videos, provide the videos with pointers representing or identifying the markers, provide pointers to the markers with or as part of the videos, provide a data structure with markers that can be referenced when processing the videos, and/or provide the markers in any other manner. In some cases, the markers can be generated by video content providers and/or a data processing system(s) associated with a platform, host, provider, application, service, repository, entity (e.g., author, owner, etc.), and/or source of the videos. In some cases, markers can additionally or alternatively be generated by a local device used to access the videos, such as a media device used to play the videos. Moreover, video markers can be generated offline (e.g., when preparing the videos, when making the videos available to users, when storing the videos in a platform or repository, when pre-processing the videos, when generating video feeds, etc.), while providing the videos (e.g., during live broadcasts of the videos, while streaming the videos, etc.) to a device for playback, during playback of the videos, and/or at any other time.

Various embodiments and aspects of this disclosure may be implemented using, and/or may be part of, multimedia environment 102 shown in FIG. 1. It is noted, however, that the multimedia environment 102 is provided for illustrative purposes and is not limiting. Examples and embodiments of this disclosure may be implemented using, and/or may be part of, environments that are different from and/or in addition to the multimedia environment 102, as will be appreciated by persons skilled in the relevant art(s) based on the teachings contained herein. An example of the multimedia environment 102 shall now be described.

Example Multimedia Environment

FIG. 1 illustrates a block diagram of a multimedia environment 102, according to some embodiments. In some examples, multimedia environment 102 may be directed to media content, such as streaming media, a conversational AI system implemented by one or more devices, and interactions with media devices and display systems using the conversation AI system. However, this disclosure is applicable to any type of media (instead of or in addition to media content and interactions with media devices and display systems), as well as any mechanism, means, protocol, method and/or process for distributing media content, interacting with media devices, and/or implementing conversational systems for interacting with various devices.

The multimedia environment 102 may include a media system(s) 104. The media system(s) 104 can include one or more media systems, and each media system can include and/or represent a family room, a kitchen, a backyard, a home theater, a school classroom, a library, a car, a boat, a bus, a plane, a movie theater, a stadium, an auditorium, a park, a bar, a conference room, a home, an entertainment room, a restaurant, an office, or any other location or space where it is desired to receive and play media content, such as streaming content. A user(s) 140 may operate the media system(s) 104 to select and consume content. The user(s) 140 can include or represent one or more users in multimedia environment 102.

The media system(s) 104 may include a media device(s) 106, which can be coupled to a display device(s) 108. The media device(s) 106 can include one or more media devices, the display device(s) can include one or more media devices, and each media device can be coupled to a display device (or multiple display devices) from the one or more display devices. It is noted that terms such as "coupled," "connected to," "attached," "linked," "combined" and similar terms may refer to physical, electrical, magnetic, logical, etc., connections, unless otherwise specified herein.

The media device(s) 106 may be or include one or more streaming media devices, DVDs or BLU-RAY devices, audio/video playback devices, cable boxes, gaming systems, televisions, head-mounted display (HMD) devices, set-top boxes, video display devices, and/or digital video recording devices, to name just a few non-limiting examples. Display device(s) 108 may include or be part of one or more monitors, televisions (TVs), desktop computers, laptop computers, mobile phones (e.g., smartphones), tablet computers, wearable devices (e.g., a smartwatch, an HMD, smartglasses, etc.), screens, appliances, internet-of-things (IOT) devices, SBCs or SoCs, and/or projectors, to name just a few non-limiting examples. In some examples, the media device(s) 106 can be a part of, integrated with, operatively coupled to, and/or connected to one or more respective display devices, such as the display device(s) 108.

The media device(s) 106 may be configured to communicate with network 118 via a respective communication device 114. The communication device 114 may include, for example, a cable modem or satellite TV transceiver. The media device(s) 106 may communicate with the communication device 114 over a link 116. The link 116 may include wireless (such as WiFi) and/or wired connections. The network 118 can include, for example and without limitation, a wired and/or wireless network, intranet, extranet, Internet, cellular, Bluetooth, infrared, and/or any other short range, long range, local, regional, global communications mechanism, means, approach, protocol and/or network, as well as any combination(s) thereof.

Media system(s) 104 may include a remote control(s) 110. The remote control(s) 110 can be any component, part, apparatus and/or method for controlling the media device(s) 106 and/or display device(s) 108, such as a remote control, a tablet, laptop computer, mobile phone (e.g., smartphone), wearable, on-screen controls, integrated control buttons, audio controls, or any combination thereof, to name just a few examples. In some examples, the remote control(s) 110 can wirelessly communicate with the media device(s) 106 and/or display device(s) 108 using cellular, Bluetooth, infrared, WIFI, WIFI direct, etc., or any combination thereof. The remote control(s) 110 may include a microphone(s) 112, which is further described below.

The multimedia environment 102 may include content server(s) 120 (also called content provider(s), channel(s) or source(s)). Content server(s) 120 can represent one or more content servers. Although only one content server is shown in FIG. 1, in practice, the multimedia environment 102 may include any number of content servers. The content server(s) 120 may be configured to communicate with network 118.

The content server(s) 120 may store content 122 and metadata 124. Content 122 may include any combination of music, videos, movies, video games, television (TV) programs, multimedia, images, still pictures, text, graphics, gaming applications, advertisements, programming content, public service content, government content, local community content, targeted media content, software, and/or any other content or data objects in electronic form. In some examples, content 122 can include video frames, such as sequences of video frames representing videos; video markers used to provide smart video seek and playback (VSP) experiences as described herein; video packages (e.g., highlight videos, video reels, custom videos, etc.) as described herein; user preferences; audio content (e.g., audio assets or files, audio signals, etc.); text content (e.g., closed captions, subtitles, text transcriptions, intertitles, superimposed text, onscreen text, etc.); smart VSP cues; smart VSP settings; smart VSP triggers; context data; device data; historical data; and/or any other data described herein.

In some examples, metadata 124 can include data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index. In some cases, metadata 124 can include video markers, smart VSP cues, smart VSP metadata, metadata of video packages generated as described herein, metadata of audio assets, metadata of text assets, pointers to video markers and/or smart VSP metadata, and/or any other metadata.

The multimedia environment 102 may include system server(s) 126. The system server(s) 126 may operate to support the media device(s) 106 and/or the display device(s) 108 from a remote location and/or network, such as the cloud, a backend, a remote datacenter, etc. It is noted that the structural and functional aspects of the system server(s) 126 may wholly or partially exist in the same or different system servers. In some examples, the system server(s) 126 may include, host, operate, and/or implement audio command processing system(s) 128, data processing system 130, user interaction system 132, and/or crowdsource server(s) 134. The audio command processing system(s) 128 can process audio data such as speech/voice inputs and/or commands, audio/speech in videos, etc. For example, as noted above, the remote control(s) 110 may include a microphone(s) 112 that can receive audio data from user(s) 134 (as well as other sources, such as the display device(s) 108). In some examples, the media device(s) 106 may be audio responsive, and the audio data may represent verbal commands from the user(s) 134 to control the media device(s) 106 as well as other components in the media system(s) 104, such as the display device(s) 108.

In some examples, the audio data received by the microphone(s) 112 in the remote control(s) 110 can be transferred to the media device(s) 106, which can then be forwarded to the audio command processing system(s) 128 for processing. The audio command processing system(s) 128 may operate to process and analyze the received audio data to recognize the verbal commands of the user(s) 134. The audio command processing system(s) 128 may forward the verbal commands back to the media device(s) 106 for processing.

Figure 2:
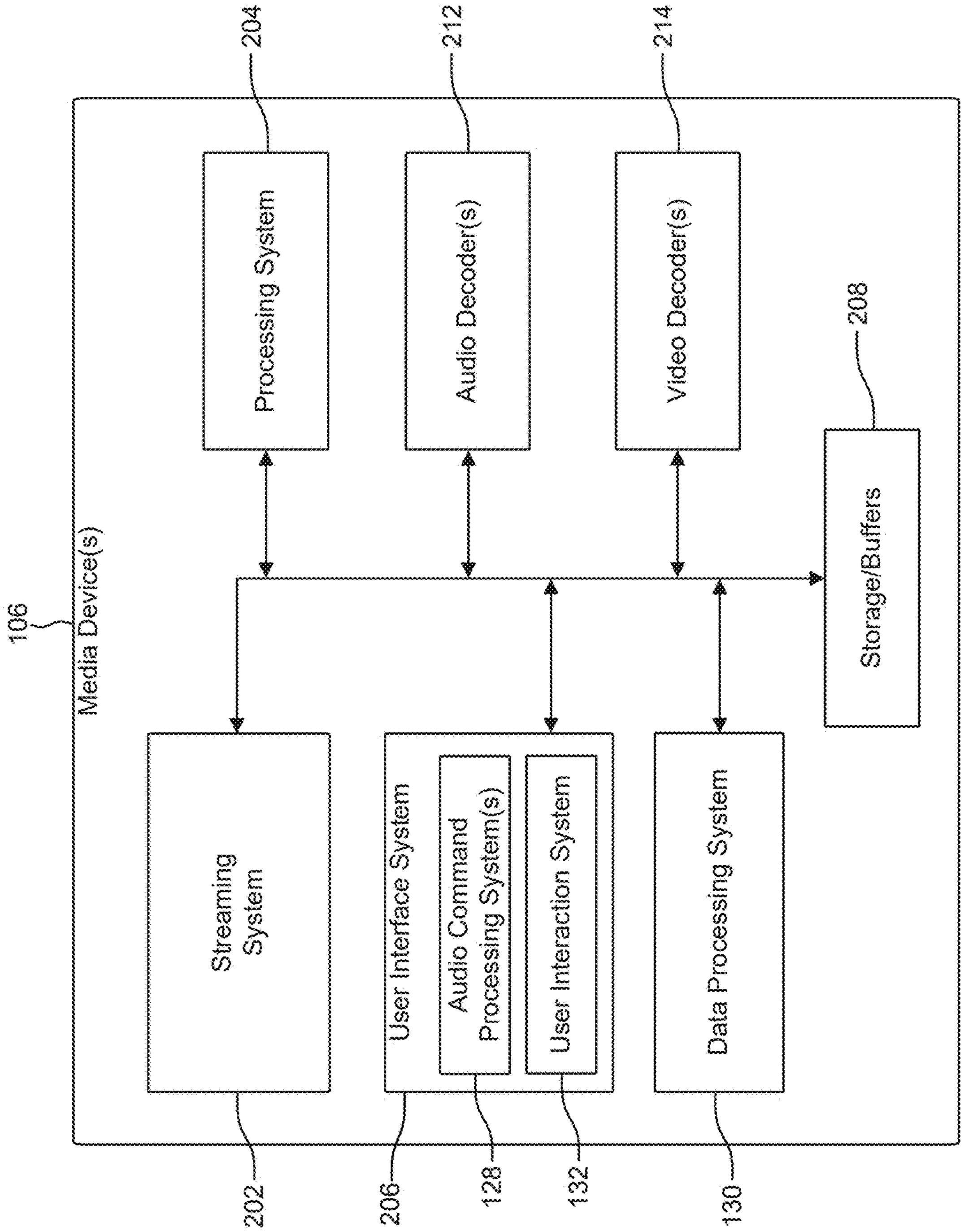
FIG. 2 is a block diagram illustrating an example streaming media device, according to some examples of the present disclosure.

In some examples, the audio data may be alternatively or additionally processed and analyzed by a copy or version of the audio command processing system(s) 128 in the media device(s) 106 (see FIG. 2). The media device(s) 106 and the system server(s) 126 may cooperate to pick any of the verbal commands to process (either the verbal command recognized by the audio command processing system(s) 128 in the system server(s) 126, or the verbal command recognized by the copy or version of audio command processing system(s) 128 in the media device(s) 106). In some cases, the audio command processing system(s) 128 can include, perform, or implement automatic speech recognition (ASR), natural language processing (NLP), natural language understanding (NLU), natural language generation (NLG), text-to-speech generation, etc.

In some examples, audio command processing system(s) 128 can obtain audio such as voice/speech inputs including speech/dialogue from the user(s) 140 and/or speech/dialogue from a video (e.g., a video played via media device(s) 106 or processed by system server(s) 126), and recognize the speech/dialogue in the audio using ASR. In some examples, audio command processing system(s) 128 can recognize speech from the user(s) 140 (e.g., provided by the user(s) 140 via a voice input device, such as the microphone(s) 112) included in an audio input, and generate a text transcript of the speech.

The audio command processing system(s) 128 can recognize speech or dialogue from a video and generate a text transcript of the speech or dialogue. The audio command processing system(s) 128 can provide the text transcript to data processing system 130, which can use the text transcript to detect things/features in the video and/or extract information from/about the video.

In some cases, the audio command processing system(s) 128, the data processing system 130, and/or the user interaction system 132 can be part of, hosted at, or implemented by a same system server (or a same set of system servers) from the system server(s) 126 or different/separate system servers from the system server(s) 126. In other cases, the data processing system 130 and the user interaction system 132 can be part of, hosted at, or implemented by a same system server (or a same set of system servers) that is (or are) separate from a system server(s) that includes, implements, and/or hosts the audio command processing system(s) 128. In other cases, the audio command processing system(s) 128, the data processing system 130, and the user interaction system 132 can be distributed across multiple and/or different system servers. In some examples, the media device(s) 106 can include, implement, and/or host respective copies or versions of the audio command processing system(s) 128, the data processing system 130, and/or the user interaction system 132 as shown in FIG. 2.

Moreover, the audio command processing system(s) 128, the data processing system 130, and the user interaction system 132 can each include, implement, and/or host one or more servers, computers, models and/or neural networks (e.g., artificial intelligence (AI) and/or machine learning (ML) models and/or neural networks, statistical models, etc.), algorithms, software applications, software engines, software modules, software services, software code/logic, software components, processors and/or processing circuitry (e.g., central processing units (CPUs), digital signal processors (DSPs), graphics processing units (GPUs), image signal processors (ISPs), microprocessors, processor cores, system-on-chip (SOC) devices, application-specific integrated circuits (ASICs), field-programmable gate arrays (FPGAs), integrated circuits, etc.), software and/or hardware elements, and/or any other hardware and/or software components.

The data processing system 130 can be configured to process video frames from videos to detect, classify, and/or recognize features (e.g., objects, scenes, events, activities, faces, users, shapes, moments, frames, conditions, attributes, patterns, colors, content, behaviors, information, and/or any other feature) used, identified, learned, and/or defined as candidate features for smart VSP experiences, as further described herein. The data processing system 130 can perform such detection, classification, and/or recognition tasks on video data associated with the videos (e.g., video frames), audio data associated with the videos, text data associated with the videos, and/or metadata associated with the videos. The data processing system 130 can use the detection, classification, and/or recognition results to generate video markers. The data processing system 130 can use the video markers to generate and/or configure smart VSP experiences, such as smart video controls, smart video playback, customized video packages, etc.

The user interaction system 132 can use the video markers and/or customized video packages from the data processing system 130 to provide, configure, package, trigger, support, send, and/or render smart VSP experiences and/or signals for client devices, such as the media device(s) 106. For example, the user interaction system 132 can use the data from the data processing system 130 to generate and/or provide smart VSP signals for/to the media device(s) 106. The media device(s) 106 can use the smart VSP signals to present/display, render, configure, execute, and/or provide smart VSP experiences associated with the smart VSP signals to/for the user(s) 140. In some cases, the user interaction system 132 can interact with the media device(s) 106 and/or the display device(s) 108 to trigger, schedule, configure, initiate, and/or coordinate smart VSP experiences as described herein. In some cases, the user interaction system 132 can include an interface, such as an application programming interface (API), to provide or communicate smart VSP data (e.g., smart VSP content, controls, commands, actions, triggers, cues, metadata, signals, parameters, requests, etc.) from the data processing system 130 to the media device(s) 106 and/or the display device(s) 108 associated with the media device(s) 106.

In some examples, the crowdsource server(s) 134 can cause closed captioning to be automatically turned on and/or off during streaming of a media content item, such as a movie. For example, using information received from the media device(s) 106 in the media system(s) 104 (e.g., in thousands or millions of media systems), the crowdsource server(s) 134 may identify similarities and overlaps between closed captioning requests issued by different users watching a particular movie. Based on such information, the crowdsource server(s) 134 may determine that turning closed captioning on may enhance the users' viewing experience at particular portions of the movie (for example, when the soundtrack of the movie is difficult to hear), and turning closed captioning off may enhance the users' viewing experience at other portions of the movie (for example, when displaying closed captioning obstructs important or relevant visual aspects of the movie). Accordingly, the crowdsource server(s) 134 may operate to cause closed captioning to be automatically turned on and/or off during future streamings of the movie.

FIG. 2 illustrates a block diagram of an example media device, according to some examples of the present disclosure. In FIG. 2, the media device(s) 106 represents a single media device. Moreover, the media device(s) 106 in FIG. 2 may include a streaming system 202, processing system 204, storage/buffers 208, user interface module 206, and optionally a copy or version of the data processing system 130. Also, the user interface module 206 may optionally include a respective copy or version of the audio command processing system(s) 128 and/or the user interaction system 132. The media device(s) 106 may optionally include a copy or version of the audio command processing system(s) 128, the data processing system 130, and/or the user interaction system 132 so media device(s) 106 can perform (e.g., locally) some or all of the operations/tasks/functions of the audio command processing system(s) 128, the data processing system 130, and/or the user interaction system 132 (e.g., via the audio command processing system(s) 128, the data processing system 130, and/or the user interaction system 132).

For example, the media device(s) 106 may optionally include a copy or version of audio command processing system(s) 128, data processing system 130, and user interaction system 132 to allow media device(s) 106 to locally perform any of the tasks, operations, functions, etc., described herein with respect to audio command processing system(s) 128, data processing system 130, and/or user interaction system 132 (e.g., in addition to or instead of any of such tasks, operations, functions, etc. (or portions thereof), performed by the audio command processing system(s) 128, data processing system 130, and/or user interaction system 132 in/from system server(s) 126 shown in FIG. 1). To illustrate, the media device(s) 106 may optionally include a copy or version of the audio command processing system(s) 128, the data processing system 130, and/or the user interaction system 132 for scenarios in which some or all of the operations/tasks/functions of the audio command processing system(s) 128, the data processing system 130, and/or the user interaction system 132 are performed locally at the media device(s) 106, and/or hybrid scenarios in which at least some operations/tasks/functions of the audio command processing system(s) 128, the data processing system 130, and/or the user interaction system 132 are performed locally at the media device(s) 106 and at least some operations/tasks/functions (e.g., the same and/or different ones than those performed locally) of the audio command processing system(s) 128, the data processing system 130, and/or the user interaction system 132 are performed or are also performed remotely at the system server(s) 126.

In some cases, the audio command processing system(s) 128 optionally included in the user interface module 206 in FIG. 2 can be the same as the audio command processing system(s) 128 in/from the system server(s) 126 in the multimedia environment 102 shown in FIG. 1. In other cases, the audio command processing system(s) 128 optionally included in the user interface module 206 in FIG. 2 can be a version of the audio command processing system(s) 128 in/from the system server(s) 126 in the multimedia environment 102 shown in FIG. 1, such as a local version, a client version, a standalone version, and/or a lighter version (e.g., a smaller version having a smaller data size; a version with less components, features, functions, modules, libraries, and/or capabilities; a version with less code or a smaller package of code; etc.) of the audio command processing system(s) 128 in/from system server(s) 126 in FIG. 1.

In some cases, the user interaction system 132 optionally included in the user interface module 206 in FIG. 2 can be the same as the user interaction system 132 in/from the system server(s) 126 shown in FIG. 1. In other cases, the user interaction system 132 optionally included in the user interface module 206 in FIG. 2 can be a version of the user interaction system 132 in/from the system server(s) 126 in the multimedia environment 102 shown in FIG. 1, such as a local version, a client version, a standalone version, and/or a lighter version (e.g., a smaller version having a smaller data size; a version with less components, features, functions, modules, libraries, and/or capabilities; a version with less code or a smaller package of code; etc.) of the user interaction system 132 in/from system server(s) 126 in FIG. 1.

Moreover, the data processing system 130 optionally included in the media device(s) 106 in FIG. 2 can be the same as the data processing system 130 in/from the system server(s) 126 in the multimedia environment 102 shown in FIG. 1. In other cases, the data processing system 130 optionally included in media device(s) 106 in FIG. 2 can be a version of the data processing system 130 in/from the system server(s) 126 in the multimedia environment 102 shown in FIG. 1, such as a local version, a client version, a standalone version, and/or a lighter version (e.g., a smaller version having a smaller data size; a version with less components, features, functions, modules, libraries, and/or capabilities; a version with less code or a smaller package of code; etc.) of the data processing system 130 in/from system server(s) 126 in FIG. 1.

The media device(s) 106 may also include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples. The media device 106 can implement other applicable decoders, such as a closed caption decoder. Similarly, each video decoder 214 may be configured to decode video of one or more video formats, such as but not limited to MP4 (mp4, m4a, m4v, f4v, f4a, m4b, m4r, f4b, mov), 3GP (3gp, 3gp, 3g, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to, H.263, H.264, H.265, VVC (also referred to as H.266), AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name some examples.

Now referring to both FIGS. 1 and 2, in some examples, the user(s) 140 may interact with the media device(s) 106 via, for example, the remote control(s) 110. For example, the user(s) 140 may use the remote control(s) 110 to interact with the user interface module 206 of the media device(s) 106 to select content, such as a movie, TV show, music, book, application, game, etc. The streaming system 202 of the media device(s) 106 may request the selected content from the content server(s) 120 over the network 118. The content server(s) 120 may transmit the requested content to the streaming system 202. The media device(s) 106 may transmit the received content to the display device(s) 108 for playback to the user(s) 140.

In streaming examples, the streaming system 202 may transmit the content to the display device(s) 108 in real time or near real time as it receives such content from the content server(s) 120. In non-streaming examples, the media device(s) 106 may store the content received from the content server(s) 120 in storage/buffers 208 for later playback on display device(s) 108.

Smart Video Seek and Playback (VSP) Experiences

Referring again to FIGS. 1 and 2, the data processing system 130 (e.g., at the system server(s) 126 and/or the media device(s) 106) can intelligently detect portions of videos that contain candidate smart VSP features detected by the data processing system 130 in the videos. The data processing system 130 and the user interaction system 132 can use the detected portions of the videos containing candidate smart VSP features to provide smart VSP experiences, such as customized video content, smart video seek and playback controls, smart content settings, smart content behavior, etc. The detected portions of the videos can include or depict candidate features detected in the portions of the videos for smart VSP. The detected portions of the videos and/or the candidate features can include or depict, for example and without limitation, certain (and/or certain types and/or levels of) events, scenes, activities, objects, faces, users, moments, segments, behaviors, content, conditions, attributes, shapes, qualities, motion, saliencies, characteristics, patterns, colors, information, and/or any other features.

In some examples, the features used to detect video portions for smart VSP experiences can include or depict certain content, activities, patterns, attributes, characteristics, information, etc., learned, determined, and/or predefined as candidate features for smart VSP experiences such as, for example and without limitation, certain content attributes, content estimated to have threshold saliency scores/values, content estimated to have threshold user interest scores, content estimated to have threshold user disinterest scores, content estimated to have threshold activity levels, content determined to have certain types of activities, content determined to have certain types of motion, content determined to have threshold motion levels, content determined to have certain types of anomalies, content determined to have certain anomalies identified based on anomality scores, content with certain uniqueness or distinctiveness scores, content estimated to have threshold importance scores, content estimated to have certain changes or change scores, certain objects, certain events, certain scenes, certain faces and/or users, certain patterns, certain information, content (and/or depicted items/information) determined to be of interest to a user(s), and/or any other features defined by a user(s), learned from user preferences and/or interactions, and/or determined by the data processing system 130.

For example, the features used to detect a portion(s) of a video(s) for smart VSP can include features predicted/estimated to be of interest to a user(s) (and/or have a threshold user interest score or likelihood), which can be used to detect content for inclusion in smart VSP experiences such as custom video experiences, smart video seek experiences, smart video playback experiences, smart video settings or adjustments, etc.; features predicted/estimated to be of disinterest to the user(s) (and/or have a threshold user disinterest score or likelihood), which can be used to determine associated content for exclusion from smart VSP experiences such as custom video experiences and/or smart video skip experiences; features predicted/estimated to have certain attributes, saliencies, activities, motion, characteristics, etc., which can be used to determine whether to select associated content for inclusion in or exclusion from smart VSP experiences such as custom video experiences, smart video seek experiences, smart video playback experiences, smart video settings or adjustments, etc. The portion(s) of a video(s) detected for smart VSP can include, for example and without limitation, a video portion (e.g., video frame, video chunk, etc.) predicted or estimated to be of interest to a user(s) (and/or have a threshold user interest score or likelihood), a video portion predicted or estimated to be of disinterest to the user(s) (and/or have a threshold user disinterest score or likelihood), a video portion determined to include or depict certain attributes, saliencies, activities, motion, characteristics, information, events, objects, patterns, users, faces, scenes, shapes, colors, details, behaviors, and/or other features detected and/or recognized by the data processing system 130 for smart VSP experiences.

The data processing system 130 and the user interaction system 132 can use the detected portion(s) of a video(s) to provide smart VSP experiences such as smart video seek and playback controls, options and/or settings, control or video behaviors, customized videos, etc. For example, the data processing system 130 and the user interaction system 132 can use a detected video portion(s) determined to have one or more candidate VSP features to configure smart VSP functions and/or content such as, for example and without limitation, smart skip or forward controls and/or functions, smart rewind controls and/or functions, smart record controls and/or functions, smart playback speed controls and/or functions (e.g., slow motion, faster motion), etc.

In some examples, the data processing system 130 can generate markers identifying positions within videos corresponding to detected video portions selected for smart VSP experiences based on candidate VSP features detected in such video portions. The data processing system 130 and the user interaction system 132 can use the markers in a video to implement smart VSP controls such as instant replays, skip functions, rewind functions, speed adjustment functions, etc. In other words, the markers associated with the videos can identify positions within the video used to respond to smart VSP signals and/or generate customized content (and/or associated notifications) for a user(s), such as a highlight video, a custom video, a play-by-play video reel, a year-in-review video, a favorites video reel, etc.

For example, when a user triggers a smart VSP control action (e.g., instant replay, video skip, video rewind, video forward, video playback, etc.) for/in a video accessed or played by the media device(s) 106, the media device(s) 106 can search for and identify a smart VSP control action marker associated with the video (e.g., embedded in the video, signaled with the video, linked or mapped to the video, included in the video, included in metadata of the video, included in a data structure referenced for markers associated with the video, etc.) and correlate the marker to the smart VSP control action. The media device(s) 106 can use the marker to implement the smart VSP control action.

To illustrate, the media device(s) 106 can use the marker to determine a seek position within the video associated with the marker (e.g., identified and/or defined by the marker or based on the marker), and move the playback position of the video to the seek position associated with the marker. The media device(s) 106 can then use the smart VSP control action to trigger playback of the video from the playback position corresponding to the seek position.

Figure 3A:
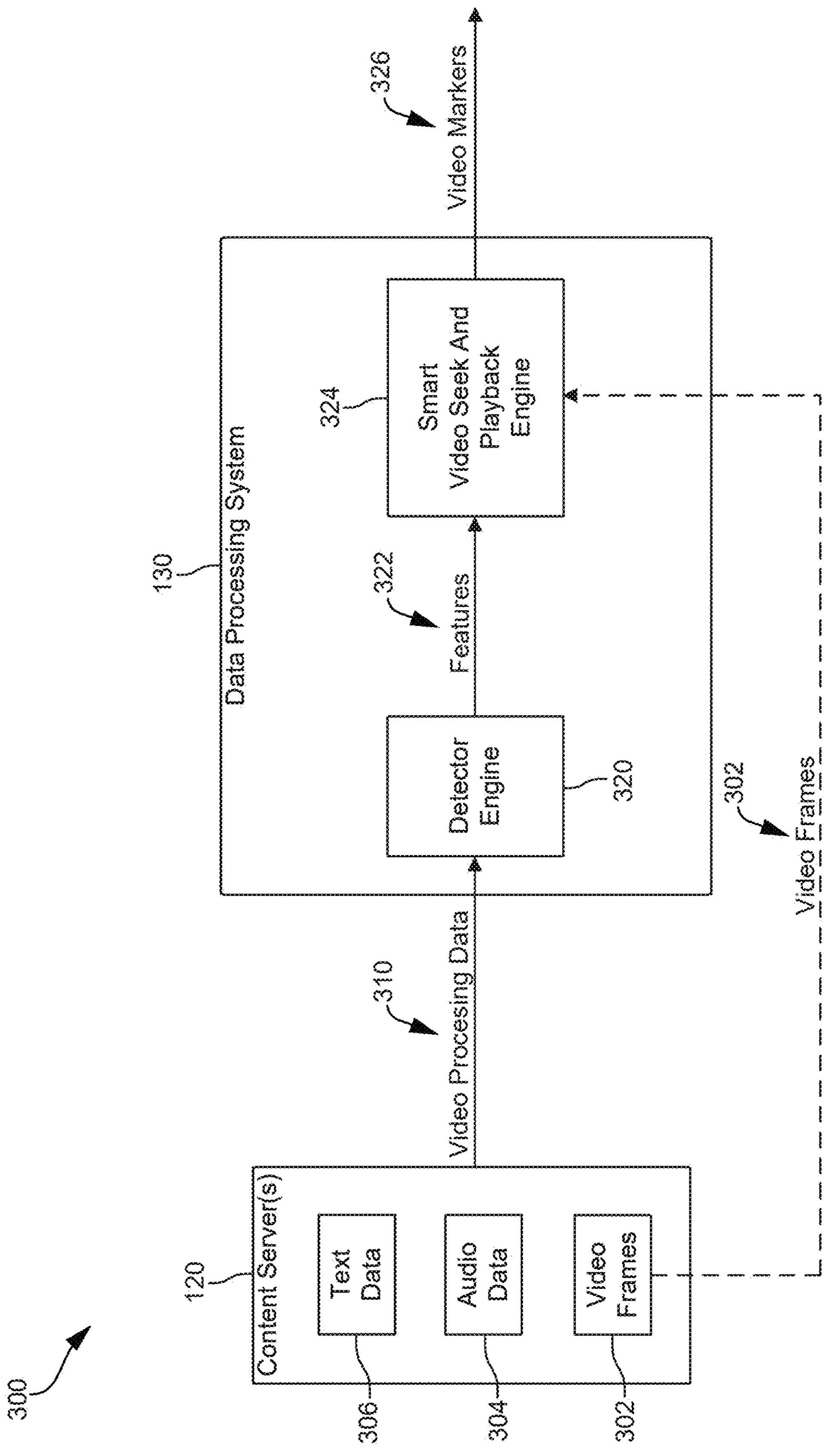
FIGS. 3A and 3B are diagrams illustrating example systems for generating video markers based on smart video seek and playback features in videos and using the video markers to provide smart video seek and playback experiences, according to some examples of the present disclosure.

FIG. 3A is a diagram illustrating an example system 300 for determining smart VSP features in videos and using the smart VSP features to generate video markers used to provide smart VSP experiences, according to some examples of the present disclosure. In this example, the data processing system 130 (e.g., on the system server(s) 126 and/or the media device(s) 106) can use video processing data 310 from the content server(s) 120 to generate video markers. In FIG. 3A, the data processing system 130 obtains the video processing data 310 from the content server(s) 120. However, in other examples, the data processing system 130 may obtain the video processing data 310 from one or more other sources such as, for example, a specific content provider(s) and/or platform(s), a different content server(s), a specific content repository, a specific content library, and/or any other content source(s). In some cases, the data processing system 130 can receive a portion or copy of the video processing data 310 from the content server(s) 120 and another portion or copy of the video processing data 310 from one or more other sources.

The video processing data 310 can include video frames 302 associated with one or more videos. For example, the video processing data 310 can include a sequence of video frames from a video (or multiple sequences of video frames from multiple videos), such as a movie, TV show, video broadcast, video stream, video upload, etc. In some cases, the video processing data 310 can optionally include other data such as audio data 304 and/or text data 306. The audio data 304 can include any audio of the video frames 302, such as audio components, portions, assets, and/or signals associated with the video frames 302. The text data 306 can include any text data associated with the video frames 302 and/or the audio data 304 such as, for example, closed captions, subtitles, onscreen text, text descriptions of the video frames 302, intertitles, superimposed text (also referred to as "supers"), text metadata of the video frames 302, a text transcription of speech and/or dialogue in an audio (e.g., audio data 304) associated with the video frames 302.

In some examples, the text data 306 can include a text transcription of speech and/or dialogue in an audio of the video frames 302 generated by recognizing the speech and/or dialogue in the audio and creating a transcript of the recognized speech and/or dialogue. In such examples, the text transcript in the text data 306 can be generated by an ASR model(s) implemented by the audio command processing system 128, the data processing system 130, and/or another system, such as a statistical ASR model, an AI/ML ASR model, or a hybrid statistical and AI/ML model. The text transcript in the text data 306 can help the data processing system 130 detect and/or recognize features in the video processing data 310, as further described herein.

The data processing system 130 can process the video processing data 310 using a detector engine 320. The detector engine 320 can be configured to process the video processing data 310 to detect, classify, and/or recognize features in the video processing data 310 used, identified, selected, and/or treated as candidate features for smart VSP experiences. The detector engine 320 can include one or more algorithms, models, and/or neural networks configured to detect and/or recognize such features in the video processing data 310. In some cases, the detector engine 320 can include one or more AI/ML and/or statistical models configured to perform detection tasks, recognition tasks, computer vision tasks, audio detection and/or recognition tasks, text detection and/or recognition tasks, and/or other signal processing tasks.

For example and without limitation, in some cases, the detector engine 320 can include an AI/ML model and/or a statistical model configured to perform object detection and/or recognition, scene detection and/or recognition, event detection and/or recognition, face detection and/or recognition, classification, bounding box detection, context detection and/or recognition, foreground detection, background detection, pattern detection and/or recognition, color detection, motion estimation, feature extraction, image processing (e.g., image understanding), activity detection and/or recognition, image segmentation, edge detection, semantic segmentation, image classification, text detection and/or recognition, speech recognition (e.g., ASR), natural language processing (NLP), natural language understanding (NLU), audio signal processing, feature matching, content detection and/or recognition, anomaly detection and/or recognition, shape detection and/or recognition, signal processing, attribute (e.g., visual attribute, audio/acoustic attribute, text attribute, etc.) detection and/or recognition, moment or key moment detection and/or recognition, saliency estimation, and/or any other processing, detection, classification, information extraction, learning, semantic analysis, and/or recognition tasks.

The detector engine 302 can use the video processing data 310 to extract features 322 from the video processing data 310. The detector engine 302 can extract the features 322 based on any signal processing tasks, detection tasks, image and/or video processing tasks, classification tasks (e.g., image classification, audio classification, text or string classification, etc.), image/video understanding tasks, segmentation tasks, feature extraction tasks, motion estimation tasks, saliency estimation tasks, recognition tasks, computer vision tasks, audio processing tasks, text processing tasks, feature matching tasks, speech processing tasks, natural language processing and/or understanding tasks, sentiment analysis tasks, etc., performed using the video processing data 310.

As used herein, references to something being extracted from something else (e.g., a video, a video frame, audio content, text content, etc.) can mean something is directly or indirectly extracted from something else. For example, references to extracting features or information from a content item (e.g., a video frame, a text transcript, a video, a data object, metadata, audio content, text content, etc.) can mean the features or information is/are extracted from the content item, determined based on the content item, and/or determined, estimated, or inferred based on data (e.g., features, data objects, information, keywords, metadata, etc.) in the content item, based on data determined from the content item, based on data extracted from the content item, and/or based on data inferred from the content item. In other words, references to features or information extracted from a video frame, signal, transcript, audio content, text, etc., can mean that features or information are extracted and/or obtained from the video frame, a signal, a text transcript, audio content, text content, etc.; determined based on the video frame, the signal, the text transcript, the audio content, the text content, etc.; and/or determined, estimated, and/or inferred from any data (e.g., information, features, objects, keywords, data objects, etc.) determined or extracted from the video frame, the signal, the text transcript, the audio content, the text content, etc.

Thus, the features 322 extracted from the video processing data 310 can include any features extracted or determined from the video processing data 310, determined from any information determined or extracted from the video processing data 310, and/or inferred from any information in or associated with the video processing data 310. For example, the features 322 can include, describe, represent, and/or correspond to (and/or can be extracted from content depicting, describing, including, representing, and/or corresponding to) one or more events, scenes, activities (e.g., visual activities, audio activities, speech/dialogue activities, text activities, etc.), objects, moments, patterns, behaviors, characters, faces, keyframes, content elements, shapes, speech and/or dialogues, conditions, information (e.g., visual information, text information, audio information, content information, object information, asset information, etc.), content attributes, estimated motion, saliency estimation data (e.g., saliency map, saliency scores, saliency regions, etc.), salient elements (e.g., salient objects, salient features, salient content, salient content regions, etc.), anomalies (e.g., learned anomalies, predetermined/predefined anomalies, anomalies associated with threshold anomaly scores, etc.), and/or characteristics detected, extracted, computed, obtained, classified, and/or recognized in/from the video processing data 310.

In some cases, the features 322 can include features identified, classified, and/or recognized as candidate features for smart VSP and can optionally exclude or filter any features in the video processing data 310 that are not classified, recognized, and/or identified as candidate features for smart VSP. In such cases, the detector engine 320 may be optionally configured to limit or filter the features 322 it obtains from the video processing data 310 to certain types of features and/or features that satisfy one or more factors, requirements, parameters, and/or criteria. In some examples, the types of features and/or the factors, requirements, parameters, and/or criteria used to identify features to include (and/or to extract other features) can be determined from (and/or defined/specified by) a user (e.g., from a user input, user preferences, user feedback, etc.), determined from (and/or defined/specified by) rules and/or criteria information, learned by a model (e.g., based on training data, ground truths, historical data, user preferences, previous user interactions, etc.), determined from (and/or defined/specified by) feature parameters, determined from historical data and/or previous user interactions, determined based on a feature definition dataset, and/or defined/specified by and/or determined from any other data.

For example, the detector engine 320 may be configured to extract features corresponding to (or ignore or filter out features that do not correspond to) specific types (e.g., from a set or range of types) of events, objects, scenes, activities, patterns, moments, information, attributes, anomalies, etc., and exclude or filter features corresponding to other types of events, objects, scenes, activities, patterns, moments, information, attributes, anomalies, etc. The detector engine 320 can extract such types of features, and optionally may not extract other types of features, ignore the other types of features, or filter out the other types of features from the features 322. To illustrate, if the user(s) 140 is interested in soccer but is not interested in other sports (e.g., as determined from or defined by user preferences, a user profile, user interactions, user feedback, historical data, etc.), the detector engine 320 can include in the features 322 any features associated with soccer events and exclude features associated with other sports events. In such cases, the detector engine 320 may be configured to not detect the features associated with other sports, ignore the features associated with other sports, or filter features associated with other sports.

As another example, the detector engine 320 may be configured to extract features corresponding to (or ignore or filter out features that do not correspond to) content having a threshold anomality score, a threshold user interest score (or threshold user interest likelihood), and/or a threshold saliency score. In such examples, the detector engine 320 may extract from the video processing data 310 (and include in the features 322) anomalies depicted or included in content estimated to have an anomality score that is equal to or greater than the threshold anomality score, features (and/or associated content) estimated to have a user interest score that is equal to or greater than the threshold user interest score (or having a user interest likelihood that equals to or exceeds the threshold user interest likelihood), and/or salient features (and/or associated content) estimated to have a saliency score that is equal to or greater than the threshold saliency score. In some cases, the detector engine 320 may ignore or filter out any features estimated to have an anomality score that is less than the threshold anomality score, estimated to have a user interest score that is less than the threshold user interest score (and/or the threshold user interest likelihood), and/or estimated to have a saliency score that is less than the threshold saliency score.

As described above, in some cases, the detector engine 320 can apply certain rules, thresholds, preferences, exclusions, filters, scores, weights, and/or other parameters to determine which features, feature categories, feature characteristics, and/or feature types to ignore, exclude from, and/or filter out from the features 322 determined by the detector engine 320. In some cases, the detector engine 320 can additionally or alternatively learn which features, feature categories, feature characteristics, feature scores, feature parameters, and/or feature types to ignore, exclude from, and/or filter out from the features 322. For example, the detector engine 320 can learn which features, feature categories, feature characteristics, feature scores, feature parameters, and/or feature types to include in the features 322 and which to ignore, exclude from, and/or filter out from the features 322 based on data used to train a model of the detector engine 320, based on weights and/or biases implemented by a model of the detector engine 320, based on user feedback, based on historical data from the user (and/or any other users), based on previous user interactions, based on ground truth data, and/or based on any other data used by the detector engine 320 to learn and/or improve its feature detection parameters, operations/tasks, and/or results.

Once the detector engine 320 determines or extracts the features 322, the detector engine 302 can provide the features 322 to a smart VSP engine 324 configured to generate video markers 326. The smart VSP engine 324 can include one or more algorithms, AI/ML models, statistical models, servers, applications, functions, and/or software logic configured to generate the video markers 326. The smart VSP engine 324 can generate the video markers 326 based on the features 322 from the detector engine 320 and (optionally) the video frames 302 (or one or more of the video frames 302). The video markers 326 can indicate which video frames 302 are associated with smart VSP, are candidates/options for smart VSP, and/or correlated with smart VSP (and/or particular smart VSP experiences or types of smart VSP experiences).

As further described below, the smart VSP engine 324 can use the features 322 to identify which video frames 302 correspond to which features 322 and, consequently, which video frames 302 correspond to which video markers 326 (or, alternatively stated, which video markers 326 correspond to or are correlated with which video frames 302). In some examples, the smart VSP engine 324 can use the features 322 to determine which video frame each video marker should be correlated with (e.g., embedded within, included with, point to, linked to, and/or otherwise associated with). For example, the smart VSP engine 324 can correlate each video marker from the video markers 326 with a respective video frame from the video frames 302 to identify the respective video frame as a candidate/option for smart VSP (and/or a particular or particular type(s) of smart VSP experience), indicate that the respective video frame is designated for smart VSP (and/or a particular or particular type(s) of smart VSP experience), and/or otherwise use (and/or determine whether to use) the respective video frame for any particular smart VSP experience.

Because the features 322 can include or represent features (or candidate features) for smart VSP, the smart VSP engine 324 can use the features 322 to determine which video frames should include the video markers 326 and/or should otherwise be associated with the video markers 326. This way, the smart VSP engine 324 can ensure that the video markers 326 are generated for and/or correlated with (e.g., are included with, embedded within, and/or otherwise associated with) the correct video frames and, as a result, each video frame associated with a video marker(s) is also associated with smart VSP (and/or a smart VSP experience(s) or type of experience(s)). This, in turn, allows each video marker and associated video frame to be used with or for a smart VSP experience(s) and/or allows those video frames associated with respective video markers to be identified and/or selected for smart VSP experiences. To this end, the smart VSP engine 324 can correlate each video marker from the video markers 326 with a respective video frame corresponding to the feature(s) (from the features 322) used to generate that video marker.

For example, when generating the video markers 326, the smart VSP engine 324 can determine which video frames 302 correspond to which features 322 used to generate the video markers 326. The smart VSP engine 324 can determine which video frames 302 correspond to which features 322 to determine which video frames 302 correspond to which video markers 326, since the video markers 326 are generated based on the features 322 and thus correspond to the content (e.g., the video frames and any other associated content) used to determine or extract the features 322. By determining which video frames 302 correspond to which features 322, the smart VSP engine 324 can thus determine which video markers 326 correspond to which video frames 302. In other words, since the video markers 326 are generated based on the features 322 (and therefore correspond to the content used to generate or extract the features 322), the smart VSP engine 324 can identify which video frame is associated with which feature(s) (e.g., which video frame was used to determine or extract such feature(s)) and correlate that video frame with the video marker associated with that feature(s).

In some cases, the detector engine 320 can track which video frames where used (with or without additional content such as audio from the audio data 304 and/or text from the text data 306) to generate which features, and provide such information to the smart VSP engine 324. The smart VSP engine 324 can use such information to correlate features with video frames in order to correlate video markers with video frames associated with the features used to determine or extract such video markers. The detector engine 320 can provide the smart VSP engine 324 information correlating the features 322 with specific video frames in/within a message(s) used by the detector engine 320 to provide the features 322 to the smart VSP engine 324 or in a separate message(s) sent to the smart VSP engine 324. In other examples, the features 322 can include information correlating the features 322 with specific video frames, which the smart VSP engine 324 can use to correlate the video markers 326 with specific video frames associated with the features 322.

Once the smart VSP engine 324 determines which video markers 326 correspond to which video frames 302, the smart VSP engine 324 can correlate the video markers 326 with corresponding video frames from the video frames 302 (e.g., by including the video markers 326 with their corresponding video frames, by embedding the video markers 326 within their corresponding video frames, by linking the video markers 326 to/with their corresponding video frames, or by otherwise associating the video markers 326 with their corresponding video frames) and/or configure the video markers 326 to identify which video frames they belong to (and thereby correlate the video markers 326 with corresponding video frames).

In some examples, the smart VSP engine 324 can obtain the video frames 302 as additional input (e.g., in addition to the features 322) and use the video frames 302 and features 322 to associate the video markers 326 with corresponding video frames from the video frames 302. The smart VSP engine 324 can embed each video marker within a corresponding video frame, include each video marker with a corresponding video frame (e.g., within a same package, container, signal, message, packet, etc.), signal each video marker with a corresponding video frame, include information in each video marker identifying or correlating the video marker with a corresponding video frame, or otherwise associating each video marker with a corresponding video frame.

In some cases, the smart VSP engine 324 can embed the video markers 326 within respective video frames or include the video markers 326 with the respective video frames. For example, the smart VSP engine 324 can include each video marker and a corresponding video frame within a package, message, container, signal, packet, or otherwise correlate them and/or include them together. In other cases, the smart VSP engine 324 can signal the video markers 326 with the respective video frames or include the video markers 326 (and/or associated information) within metadata associated with the respective video frames. In some examples, the smart VSP engine 324 can configure the video markers 326 to identify which video frames they correspond to so the video markers 326 can be associated with corresponding video frames when implementing smart VSP experiences. For example, the smart VSP engine 324 can include information in each video marker indicating which video frame corresponds to that video marker. In some cases, each video marker can include a pointer, address, identifier, indication, header, and/or other information that identifies a video frame associated with that video marker.

In some hybrid implementations, in addition to embedding video markers within corresponding video frames or including the video markers with corresponding video frames, the smart VSP engine 324 can configure the video markers 326 with information about the video frames they correspond to. In other hybrid implementations, the smart VSP engine 324 can embed some video markers within the video frame(s) correlated with such video markers and/or include such video markers with the video frame(s) correlated with such video markers, and can configure other video markers to identify the video frame(s) correlated with the other video markers, such that some video markers are correlated with respective video frames by embedding or including such video markers within/with their respective video frames and other video markers are instead (or in addition) correlated with their respective video frames by configuring such video markers with information identifying their respective video frames and/or correlating such video markers with their respective video frames.

The video markers 326 can signal, indicate, and/or be used to determine that those video frames 302 that are associated with the video markers 326 are candidates for (and/or identified for) smart VSP and/or specific smart VSP experiences. When a smart VSP experience is triggered/initiated, the video markers 326 can be used to determine which video frame(s) to use for the smart VSP experience and/or which video frame(s) to include as part of the smart VSP experience. For example, when a smart instant replay is triggered, the video markers 326 can be used to determine which video frame(s) to include in (e.g., play as part of) the smart instant replay and/or which video frame(s) (and/or position within a video frame) to start the smart instant replay from (e.g., to set the seek/playback position for the smart instant replay in order to start playback associated with the smart instant replay from the seek/playback position).

As another example, when a smart skip function is triggered, the video markers 326 can be used to determine which video frame(s) to skip for the smart skip function and/or which video frame(s) after a current video frame (e.g., the video frame playing when the smart skip function is triggered) to set the seek/playback position to in order to skip one or more video frames and resume or continue playback from the seek/playback position set for the smart skip function. As yet another example, to generate a smart video customized for the user(s) 140 (e.g., a highlight reel, a play-by-play reel, a tailored video, a year-in-review reel, a favorites video, etc.), the data processing system 130 or the user interaction system 132 can stitch together or otherwise combine a set of video frames associated with a set of video markers (and/or certain type(s) of video marker(s)) identified for the smart video.

In some cases, the video markers 326 can identify respective video frames associated with the video markers 326 and/or a location on the respective video frames, which can be used to determine which video frames to use for smart VSP experiences and/or where to initiate smart VSP experiences from. For example, the video frame and/or video frame location information identified in or specified by the video markers 326 can be used to determine specific locations (e.g., start and end locations or timestamps) within respective video frames to be used for smart VSP experiences, specific video segments (e.g., combination of video frames) to use for the smart VSP experiences, specific portions of video frames associated with smart VSP experiences, and/or seek positions within or corresponding to specific video frames to use for smart VSP experiences. For example, in some cases, the video markers 326 can include pointers identifying specific video frames designated for (e.g., identified as candidate for, configured for, selected for, available for, etc.) smart VSP (e.g., smart VSP experiences and/or types of smart VSP experiences), specific portions of video frames designated for smart VSP, locations (e.g., a start location, a start and end location, a beginning timestamp, a beginning and end timestamp, etc.) within video frames or sets of video frames designated for smart VSP, and/or seek positions within video frames or sets of video frames designated for smart VSP. This way, when a smart VSP experience is triggered, the video markers 326 can be used to determine what video frame(s) or set of video frames, what video frame location(s), what video frame portion(s), and/or what seek position(s) within a video frame(s) should be used for the smart VSP experience triggered.

The video markers 326 can include pointers with/to such information in cases where the video markers 326 are embedded within video frames (e.g., in which case the video frames or locations within the video frames where the video markers 326 are embedded can optionally, additionally, or alternatively be used to determine smart VSP locations and/or video frames by virtue of the video markers 326 being embedded within such locations and/or video frames) and/or cases where the video markers 326 are not embedded within video frames or video frame locations, such as when the video markers 326 are signaled with and/or separate from the video frames 302, stored in a video marker reference store/repository or location, and/or otherwise associated with video frames (and/or video frame locations) without embedding them in the video frames.

In some cases, the video markers 326 (some or all) can include information about smart VSP experiences (e.g., specific smart VSP experiences and/or types of smart VSP experiences) associated with the video markers 326 (and/or associated video frames), and/or can be configured according to (e.g., based on, depending on, in association with, to indicate, etc.) the smart VSP experiences associated with the video markers 326 (and/or associated video frames). For example, the smart VSP engine 324 can configure each video marker to identify which smart VSP experience(s) that video marker (and/or its associated video frame, video frame location, and/or seek position within an associated video frame and/or video frame location) corresponds to or should be used/selected for. In some cases, the smart VSP engine 324 can additionally or alternatively configure (e.g., format, structure, design, etc.) each video marker from the video markers 326 based on a smart VSP experience(s) (e.g., a particular smart VSP experience(s) and/or type of smart VSP experience(s)) designated, correlated, associated, and/or related to (and/or otherwise set as a candidate for) that video marker (and/or associated video frame).

To illustrate, if the smart VSP engine 324 generates a video marker for smart instant replays (and/or is a candidate for smart instant replays), the smart VSP engine 324 can configure the video marker to include information indicating that the video marker (and/or the video frame(s) associated with that video marker) is related to, a candidate for, or to be used for (or as an option for) smart instant replays. In some cases, the smart VSP engine 324 can include a pointer, identifier, tag, flag, indication, header, data portion, or cue that associates the video marker (and/or the video frame(s) associated with the video marker) with smart instant replays, references smart instant replays, and/or indicates that the video marker (and/or the video frame(s) associated with the video marker) is a candidate for (and/or may be used for) smart instant replays. As another example, if the smart VSP engine 324 generates a video marker for smart skip functions (and/or is a candidate for smart skip functions), the smart VSP engine 324 can configure the video marker to include information indicating that the video marker (and/or the video frame(s) associated with that video marker) is related to, a candidate for, or may be used for (or as an option for) smart skip functions. For example, the smart VSP engine 324 can include a pointer, identifier, tag, flag, indication, header, data portion, or cue that associates the video marker (and/or the video frame(s) associated with the video marker) with smart skip functions, references smart skip functions, and/or indicates that the video marker (and/or the video frame(s) associated with the video marker) is a candidate for (and/or should be used for) smart skip functions.

In some examples, the configurations of the video markers 326 or the types of markers of the video markers 326 can be based or depend on the smart VSP experiences (and/or types of experiences) that the video markers 326 (and/or associated video frames) are generated for and/or are candidates for. For example, the smart VSP engine 324 can use a specific type of video marker or specific video marker configuration for video markers that associated with a particular VSP experience(s) and a different type of video marker or video marker configuration for video markers associated with another smart VSP experience(s). To illustrate, the smart VSP engine 324 can use a specific type of video marker or video marker configuration for video markers (and associated video frames) for smart instant replays, and a different type of video marker or video marker configuration for video markers (and associated video frames) for smart skip functions.

In some cases, the smart VSP engine 324 can use certain types of video markers or video marker configurations for video markers used for or associated with smart video packages (e.g., smart VSP experiences including customized videos/reels, etc.), and/or include information in such video markers indicating that the video markers are designed for (or associated with) smart video packages. For example, assume that a user likes to watch plays from a particular player. To allow the data processing system 130 (or another system) to generate a custom video package(s) for the user that includes video content (e.g., video frames) depicting that particular player performing such plays, the smart VSP engine 324 can configure video markers corresponding to video frames that depict that particular player performing such plays (and/or that are part of a sequence(s) of video frames depicting that particular player performing such plays) to include information that indicates (and/or according to a configuration that indicates) that such video markers (and associated video frames) correspond to that particular player performing such plays and/or are associated with a smart VSP experience used to provide a smart video package for that user. This way, the video markers can be used to identify which video frames to include (e.g., combine, merge or stitch together) when generating a smart video package for that user that depicts the particular player performing such plays.

In some cases, the smart VSP engine 324 can use the features 322 to determine what smart VSP experience(s) and/or type of smart VSP experience(s) (e.g., what smart VSP actions, controls, functions, behaviors, outputs, etc.) correspond(s) to the video markers 326. For example, if a feature(s) from the features 322 correspond(s) to a specific person (e.g., a player) in particular scenes or events (e.g., games, plays within games, etc.), the smart VSP engine 324 can determine that the feature(s) correspond(s) to the specific person in the particular scenes or events, and use the feature(s) to generate video markers configured specifically for and/or identifying any smart VSP experiences involving that specific person in the particular scenes or events. This way, when a smart VSP experience is triggered to play/replay video (e.g., replays depicting that person in the particular scenes or events), the video markers associated with that person in the particular scenes or events can be used to identify video frames for such smart VSP experience. As another example, to generate a smart video (e.g., as part of a smart VSP experience) depicting that person in the particular scenes or events, the video markers associated with that person in the particular scenes or events can be used to identify video frames depicting that person in the particular scenes or events, which correspond to such video markers. The identified video frames can be used to generate the smart video depicting that person in the particular scenes or events.

In some cases, the features 322 can include or encode information that the smart VSP engine 324 can use or decode to determine what the features 322 relate to, describe, and/or are otherwise associated with. For example, in some cases, the features 322 can include representations, feature vectors, or embeddings (e.g., numerical embeddings such as vector embeddings, etc.) that encode information about a content (e.g., video frames, audio content, text content, etc.) associated with the features 322 such as, for example and without limitation, scenes, events, activities (e.g., visual activities, audio activities, speech/dialogue activities, etc.), faces, persons and/or characters, conditions, colors (e.g., depicted clothing colors such as uniforms, building colors, car colors, device colors, sign colors, etc.), objects, information (e.g., visual information, audio information, text information, content information, asset information, etc.), patterns, scenes, contexts, attributes, and/or any other information. Thus, the smart VSP engine 324 can decode such information from the representations, feature vectors, or embeddings to understand what the content associated with the features 322 relates to, includes, depicts, and/or is associated with. The smart VSP engine 324 can use such information about the content associated with the features 322 to correlate the video markers generated based on the features 322 to specific smart VSP experiences and/or types of smart VSP experiences.

For example, assume that an embedding representing a feature(s) associated with a video frame encodes information indicating that the content of the video frame associated with the embedding depicts a foul on a player during a game resulting in an injury. In this example, the smart VSP engine 324 can decode the embedding and determine that the content of the video frame associated with the embedding depicts a foul on a player during a game which resulted in an injury. The smart VSP engine 324 can configure the video marker generated based on the embedding to indicate, represent, and/or include information indicating that the video marker (and thus the video frame associated with the video marker) relates to a player foul and injury. Accordingly, when generating a smart VSP experience involving video frames depicting player fouls and injuries, the device generating such smart VSP experience can identify the video frame associated with that video marker (which was generated based on the embedding) as a candidate/option for use or inclusion in the smart VSP experience. The device can identify the video frame as such candidate/option based on the video marker (and/or associated information) associated with that video frame. Thus, when generating the smart VSP experience, the device can use the video frame associated with the video marker (or consider it as a candidate/option).

To illustrate, to implement a smart video skip function to skip over video frames depicting player fouls and injuries, the video marker associated with the smart video skip function can be used to detect an associated video frame that depicts a player injury and foul. The video frame can then be skipped as part of the smart video skip function. Here, the video marker is used to identify the video frame as a candidate/option for the smart video skip function. When generating a smart video customized for a user to include video frames depicting player fouls and injuries (e.g., a custom reel of player fouls and injuries), the video frames depicting player fouls and injuries can be identified based on any video markers matching a type/category of video marker associated with player fouls and injuries and/or configured to indicate that such video markers correspond to player fouls and injuries (and/or associated smart VSP experiences). The video frames identified can then be included in a smart video reel configured to depict player fouls and injuries.

In some cases, the smart VSP engine 324 can additionally or alternatively use the content associated with the video markers 326 to determine what specific smart VSP experiences (and/or types of smart VSP experiences) any given video marker relates to (if any). For example, the detector engine 320 can process/analyze the video frame associated with a video marker and any associated content (e.g., audio from the audio data 304, text from the text data 306, metadata, etc.) to extract information about the video frame and associated content, such as information that can be used to correlate an associated video marker with a particular smart VSP experience(s). The detector engine 320 can perform such processing/analysis as part of the process for determining/extracting the features 322 and/or as a separate process, step, operation, or iteration.

For example, since the detector engine 320 is already configured to perform one or more detection, classification, recognition, signal processing, feature extraction, feature matching, image/video processing, text processing, and/or other processing tasks/operations for determining/extracting the features 322, the detector engine 320 can be leveraged to extract any information that can be used to correlate the video markers 326 to specific smart VSP experiences (and/or types of experiences). Such information can include any information used to generate the features 322 (and/or extracted for or as part of the features 322) as well as any other relevant information. In this example, the feature engine 320 can provide such information to the smart VSP engine 324 (e.g., in addition to the features 322 or encoded in the features 322), which can use such information to configure the video markers 326 and/or correlate the video markers 326 to smart VSP experiences (and/or types of experiences).

In some cases, the smart VSP engine 324 can be configured to process/analyze the content associated with the video markers 326 to determine such information about the content (e.g., the video frames associated with the video markers 326 and any other corresponding content), which the smart VSP engine 324 can similarly use to configure the video markers 326 and/or correlate the video markers 326 to specific smart VSP experiences (and/or types of experiences). For example, the smart VSP engine 324 can be configured to perform one or more detection, classification, recognition, signal processing, feature extraction, feature matching, image/video processing, text processing, and/or other processing tasks/operations to extract such information from the content (e.g., video frames, etc.) associated with the features 322, and thus associated with the video markers 326 generated based on the features 322.

The smart VSP engine 324 can optionally configure the video markers 326 (or some of the video markers 326) based on a smart VSP experience(s) (and/or type of experience(s)) associated with the video markers 326 (or some of the video markers 326) and/or include information in the video markers 326 (or some of the video markers 326) about a smart VSP experience(s) and/or type of smart VSP experience(s) associated with the video markers 326 (or some of the video markers 326). In some examples, the smart VSP engine 324 can configure some or all of the video markers 326 to include one or more flags, descriptors, tags, cues, headers, hashes/fingerprints, strings, code, identifiers, indicators, signals, metadata portions, and/or data objects that provide information and/or indications of the smart VSP experience(s) that such video markers (and thus their associated video frames) are candidates for, selected for, associated with, and/or designed for. For example, when generating a video marker identified as a candidate for specific smart VSP experiences, the smart VSP engine 324 can determine that the video frame associated with the video marker is suitable for the specific smart VSP experiences. The smart VSP engine 324 can configure the video marker to indicate, include information indicating, and/or include information that can be used to identify the specific smart VSP experiences.

In some examples, the smart VSP engine 324 can configure the video marker to include a flag, descriptor, tag, cue, header, hash/fingerprint, string, code, identifier, indicator, signal, metadata portion, and/or data object that identifies the video marker (and the video frame associated with the video marker) as a candidate for the specific smart VSP experiences, as relating to the specific smart VSP experiences, and/or as correlated with the specific smart VSP experiences. This way, when searching for video markers (and associated video frames) for a smart VSP experience from the specific smart VSP experiences, a device can identify any of the video markers configured for the specific smart VSP experiences as potential candidates for the smart VSP experience, and use any of such markers to identify corresponding video frames.

In some cases, when configuring a video marker based on a smart VSP experience(s) associated with that video marker and/or including information in the video marker about a smart VSP experience(s) (e.g., to associate the video marker to the smart VSP experience(s) and/or type(s) of smart VSP experience(s)), the smart VSP engine 324 can determine what smart VSP experience(s) the video marker is a candidate for, should or may be considered or used for, and/or is associated with. In some examples, the smart VSP engine 324 can make such a determination based on the feature(s) used to generate that video marker, the video frame associated with the video marker, a content of the video frame associated with that video marker, and/or any other information about the feature(s) used to generate the video marker and/or the video frame associated with the video marker.

For example, the smart VSP engine 324 can determine that the video marker is suitable for, a candidate for, and/or associated with (and/or determine whether to associate the video marker with) a particular smart VSP experience(s) and/or type(s) of smart VSP experience(s) based on information about that video marker and/or its associated video frame extracted or determined from the feature(s) used to generate that video marker and/or a content of the video frame associated with that video marker. To illustrate, if a feature(s) used to create a video marker indicates, and/or a content of the video frame associated with that video marker indicates, that the video marker and/or the video frame associated with that video marker relate(s) to a scene depicting a player injury during a game, the smart VSP engine 324 can configure the video marker as a type of video marker used to identify scenes depicting player injuries and/or a type of video marker defined or used for smart VSP functions associated with scenes depicting player injuries.

Figure 3B:
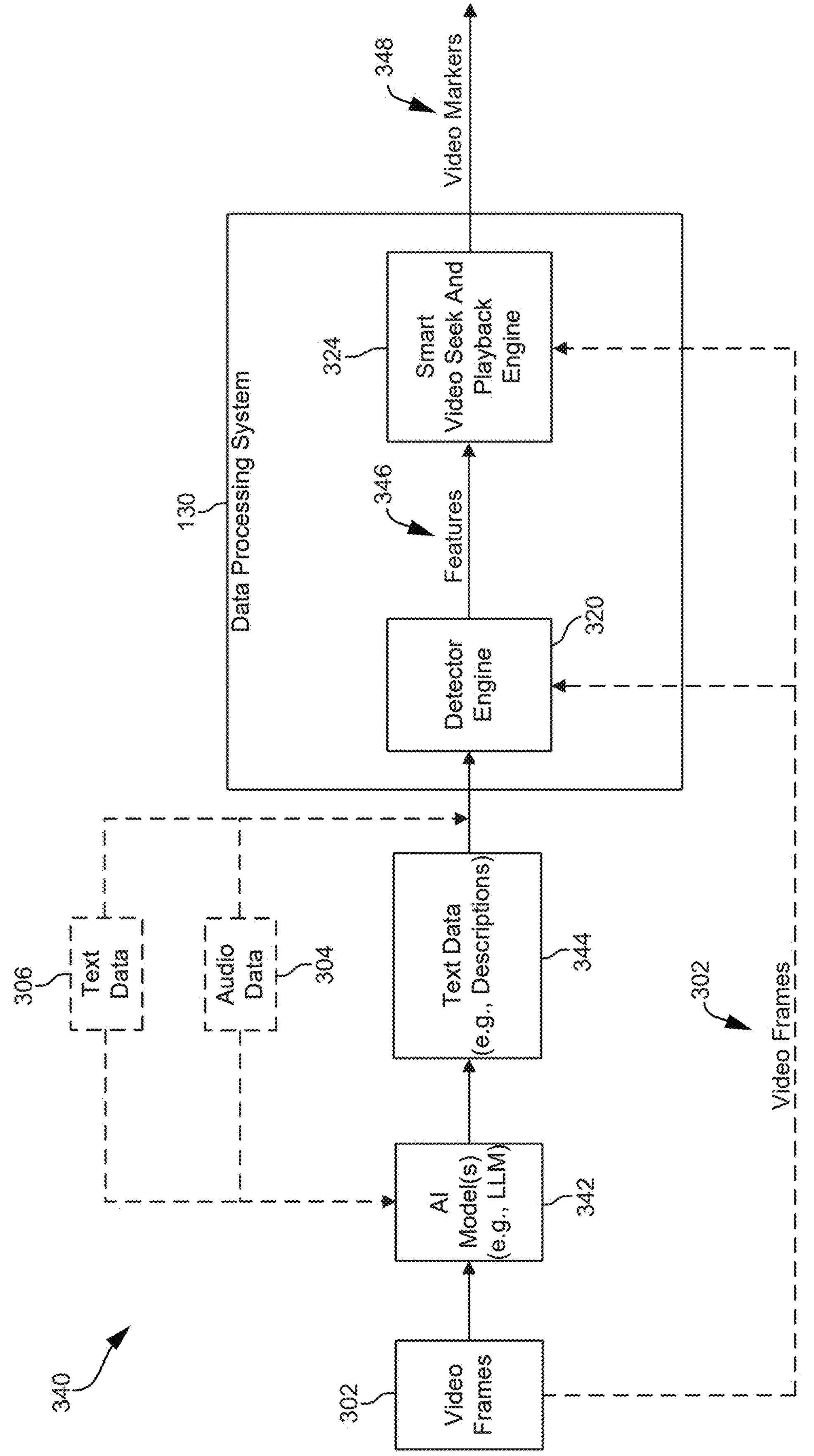

In some cases, the video markers and the features used to generate the video markers can be based on a text description of the video frames generated by an AI/ML model, as shown in FIG. 3B. The AI/ML model can process video frames to determine and/or extract information about the video frames and/or the content of the video frames. The AI/ML can use such information to generate text describing the video frames and/or the content of the video frames. In some examples, to determine and/or extract such information associated with the video frames, the AI/ML can process the video frames to detect, recognize, classify, and/or understand features of/in the video frames such as, for example and without limitation, events, activities, scenes, faces, persons and/or characters, objects, patterns, moments, conditions, scenarios, contextual details, text, dialogue, attributes, characters, colors, motion, and/or any other features associated with the video frames.

In some cases, the detector engine 320 can detect, classify, and/or recognize features from the text description of the video, which the detector engine 320 can use to determine the features used to generate the video markers, as shown in FIG. 3B. In some examples, the detector engine 320 can use natural language processing and/or understanding to recognize and/or understand text in the text description and/or extract, classify, detect, and/or recognize features from the text in the text description. In some examples, the text generated by the AI/ML model can include text recognized from a screen/display during a presentation/rendering of the video frames, such as closed captions, subtitles, intertitles, supers, and/or any other text or onscreen text. In some examples, the text generated by the AI/ML model can additionally or alternatively include text recognized from speech/dialogue in an audio portion of the video frames.

FIG. 3B is a diagram illustrating another example system 340 for determining smart VSP features in videos and using the smart VSP features to generate video markers used to provide smart VSP experiences, according to some examples of the present disclosure. As shown, AI model(s) 342 can process the video frames 302 to generate text data 344 about the video frames 302. In some examples, the text data 344 generated by the AI model(s) 342 can include a description of content in the video frames 302 such as, for example and without limitation, a description(s) of one or more events, scenes, activities, characters, faces, objects, moments, conditions, attributes, motion/movements, behaviors, and/or any other information about the video frames 302 and the content of the video frames 302.

The AI model(s) 342 can include one or more neural networks or deep learning networks (e.g., convolutional neural networks, recurrent neural networks, transformer networks, encoder-decoder networks, multilayer perceptrons, large language models, etc.) trained to process video frames and generate descriptions of the content in the video frames. For example, the AI model(s) 342 can include one or more deep learning networks trained to process video frames, extract features from the video frames, and use the features to generate a text description (e.g., included in the text data 344) of the content of (and/or the features from) the video frames. The features can include, for example, events, activities, scenes, faces, objects, characters, patterns, behaviors, attributes, motion/movement, conditions, colors, etc., and the text information generated by the AI model(s) 342 can include description of each of the features, a context associated with the features, and any other information associated with the features.

For example, the AI model(s) 342 can be trained to extract information about any activities, scenes, faces, objects, characters, patterns, behaviors, attributes, motion, conditions, and/or any other features in the video frames. The AI model(s) 342 can be trained to use the extracted information to generate a text description(s) of such activities, scenes, faces, objects, characters, patterns, behaviors, attributes, motion, conditions, and/or any other features. In some cases, the AI model(s) 342 can also be trained to additionally include other information about the features from the video frames, such as context information, semantic information, summaries, associated statistics, metrics, and/or any other information.

In some cases, to extract such information (e.g., features) from video frames and use the extracted information to generate text descriptions in the text data 344, the AI model(s) 342 can be trained to perform object detection and/or recognition, scene detection and/or recognition, event detection and/or recognition, face detection and/or recognition, classification, bounding box detection, context detection and/or recognition, foreground detection, background detection, pattern detection and/or recognition, color detection, motion estimation, feature extraction, feature matching, image processing (e.g., image understanding), activity detection and/or recognition, image segmentation, edge detection, semantic segmentation, image classification, text detection and/or recognition, ASR, NLP, NLU, audio signal processing, content detection and/or recognition, anomaly detection and/or recognition, shape detection and/or recognition, attribute (e.g., visual attribute, audio/acoustic attribute, text attribute, etc.) detection and/or recognition, moment or key moment detection and/or recognition, signal processing, saliency estimation, and/or any other processing, detection, classification, information extraction, learning, semantic analysis, and/or recognition tasks.

In some examples, the AI model(s) 342 can be trained using a dataset of video frames, which the AI model(s) 342 can watch (e.g., process) and learn to extract information from the video frames and generate descriptions of the extracted information. In some cases, the dataset used to train the AI model(s) 342 can also include ground truth data, labels, and/or any other information. The AI model(s) 342 can be trained using any training scheme such as, for example, supervised learning/training, self-supervised learning/training, unsupervised learning/training, semi-supervised learning/training, etc.

In one illustrative example, the AI model(s) 342 can include one or more large language models (LLMs) trained to watch (e.g., process) video frames, extract information/features from the video frames, and generate text descriptions using and/or about such information/features. The one or more LLMs can generate text information (e.g., the text data 344) that includes text descriptions generated by the one or more LLMs as previously described.

The AI model(s) 342 can optionally process audio data 304 (or a portion thereof) associated with the video frames 302 and/or text data 306 (or a portion thereof) associated with the video frames 302, and use such content (in addition to the video frames 302) to generate the text data 344 (or a portion thereof). For example, the AI model(s) 342 can process the audio data 304 (or a portion thereof), which can include an audio of (and/or associated with) the video frames 302 (e.g., speech, dialogue, noise, music, sounds, and/or any other audio from an audio portion of or corresponding to the video frames 302), to generate additional text to include in the text data 344. The AI model(s) 342 can recognize audio (e.g., speech, dialogue, utterances, music, sounds, and/or any other audio) in the audio data 304 and determine (e.g., understand, comprehend, extract, recognize, classify, interpret, etc.) information about and/or in the audio, such as a meaning, context, and/or sentiment of the audio in the audio data 304. The AI model(s) 342 can use such information to generate additional text to include in the text data 344.

The additional text included in the text data 344 can include any meaning, context, and/or sentiment determined from the audio data 304 and/or any other text information generated based on information extracted from (e.g., any meaning, context, and/or sentiment determined from) the audio data 304. In some examples, the additional text generated by the AI model(s) 342 based on the audio data 304 (and included in the text data 344) can include, for example and without limitation, additional information about any content of/in the video frames 302, any text descriptions in the text data 344 generated from the video frames 302 (e.g., additional details about any events, activities, scenes, faces, objects, characters, patterns, behaviors, attributes, motion, conditions, etc.), any/or text descriptions of new features (e.g., any features that were not included and/or described in a portion of the text data 344 generated from the video frames 302) such as, for example, any new (e.g., new meaning not included or described in a portion of the text data 344 generated from the video frames 302) events, activities, scenes, faces, objects, characters, patterns, behaviors, attributes, motion, conditions, etc.

In some examples, the AI model(s) 342 can be configured to perform ASR to recognize language (e.g., speech, dialogue, and/or utterances) in the audio data 304. In some cases, the AI model(s) 342 can perform NLP/NLU to recognize a text transcript generated from the audio data 304 using ASR, and/or determine the meaning, context, and/or sentiment of the text transcript. The AI model(s) 342 can then use this information to generate text descriptions included in the text data 344, which can describe any features, details, and/or context associated with the video frames 302, as determined from the audio data 304 associated with the video frames 302.

In addition to processing the video frames 302 to generate text descriptions of the video frames 302 to include in the text data 344, the AI model(s) 342 can optionally play the video frames 302 with the audio (e.g., from audio data 304) associated with the video frames 302, and recognize any language (e.g., speech, dialogue, utterances, etc.) in the audio using ASR. The AI model(s) 342 can generate a text transcript of the audio (e.g., based on the recognized language), and include the text transcript in the text data 344 and/or generate a text description of the text transcript, which the AI model(s) 342 can include in the text data 344. In some examples, the AI model(s) 342 can use NLP/NLU to recognize the text in the text transcript and/or determine a meaning, context, and/or sentiment of the text in the text transcript. The AI model(s) 342 can use such information to generate text descriptions of the content of the video frames 302 and include such text descriptions in the text data 344. The text descriptions can describe the text in the text transcript and/or the meaning, context, and/or sentiment of the text in the text transcript.

In addition to processing the video frames 302 to generate text descriptions of the video frames 302 to include in the text data 344, the AI model(s) 342 can optionally play the video frames 302 and recognize any text (e.g., from text data 306) displayed on the screen with or as part of the video frames 302 and/or determine a meaning, context, and/or sentiment of and/or conveyed by any portion of the text displayed on the screen. The text can include any onscreen text such as, for example, closed captions, subtitles, intertitles, supers, and/or any other text. The AI model(s) 342 can used the information recognized and/or determined from the text to generate text descriptions of the video frames 302. The AI model(s) 342 can include such text descriptions in the text data 344 (e.g., in addition to any text descriptions generated from the video frames 302 and, optionally, any text descriptions generated from the audio associated with the video frames 302).

The AI model(s) 342 can provide the text data 344 to the detector engine 320. The detector engine 320 can use the text data 344 to determine features 346 (e.g., similar to features 322) associated with the video frames 302. For example, since the text data 344 includes text descriptions of the video frames 302 and associated content (e.g., events, scenes, objects, activities, faces, characters, patterns, attributes, moments, movement, colors, behaviors, etc.), the detector engine 320 can use such text descriptions to understand the content of the video frames 302 and generate the features 346. In addition, the detector engine 320 can optionally use the video frames 302 to determine the features 346. For example, the detector engine 320 can use the text data 344 and optionally the video frames 302 to determine the features 346.

Optionally, in some cases, the detector engine 320 can also process and use the audio data 304 (or a portion thereof) and/or the text content (or a portion thereof) to determine the features 346. For example, the detector engine 320 can process the audio data 304 (or a portion thereof) and/or the text data 306 (or a portion thereof) in addition to the text data 344 (and, optionally, the video frames 302), to determine the features 346 based on the text data 344 and optionally the video frames 302, the audio data 304 (or a portion thereof), and/or the text data 306 (or a portion thereof). In some cases, in addition to using the text data 344 (and, optionally, the video frames 302) to determine the features 346, the detector engine 320 can also use the audio data 304 and/or the text data 306 to determine the features 346 even if the audio data 304 and/or the text data 306 was/were also used by the AI model(s) 342 to generate the text data 344.

In other cases, in addition to using the text data 344 (and, optionally, the video frames 302) to determine the features 346, the detector engine 320 may use the audio data 304 and/or the text data 306 to determine the features 346 if (e.g., in cases where) the audio data 304 and/or the text data 306 was/were not used by the AI model(s) 342 to generate the text data 344. For example, if the AI model(s) 342 used the audio data 304 (e.g., in addition to the video frames 302) to generate the text data 344, the detector engine 320 may use the text data 306 in addition to the text data 344 (and, optionally, the video frames 302) to determine the features 346 without also using the audio data 304 to determine the features 346. Similarly, if the AI model(s) 342 used the text data 306 (e.g., in addition to the video frames 302) to generate the text data 344, the detector engine 320 may use the audio data 304 in addition to the text data 344 (and, optionally, the video frames 302) to determine the features 346 without also using the text data 306 to determine the features 346. In some cases, if the AI model(s) 342 also used the audio data 304 and the text data 306 (e.g., in addition to the video frames 302) to generate the text data 344, the detector engine 320 may determine the features 346 from the text data 344 (and, optionally, the video frames 302) without also using the audio data 304 or the text data 306 to determine the features 346.

The features 346 in FIG. 3B can include (and exclude) any features and information previously described with respect to the features 322 shown in FIG. 3A. For example, the features 346 can include representations of any content, activity, attributes, and/or aspects of/in the video frames 302 deemed relevant for smart VSP such as, for example, one or more scenes, contexts (e.g., contexts of the one or more scenes, etc.), activities, characters, behaviors, events, objects, patterns, colors, attributes, motion/movements, faces, interactions, conditions, etc.

In some cases, the features 346 can include representations, feature vectors, or embeddings that encode information about the video frames 302. For example, in some cases, the features 346 can include vector embeddings that encode information about any scenes, contexts, activities, characters, behaviors, events, objects, patterns, colors, attributes, motion/movements, faces, interactions, conditions, and/or any other aspects of the video frames 302 (and associated content).

The smart VSP engine 324 can use the features 346 from the detector engine 320 to generate video markers 348 associated with the video frames 302. The video markers 348 can be the same as or similar to the video markers 326 shown in FIG. 3A and/or can include any of the information, attributes, and/or configurations described above with respect to the video markers 326 shown in FIG. 3A. Moreover, the smart VSP engine 324 can generate the video markers 348 as previously described with respect to the video markers 326 shown in FIG. 3A. In some cases, the smart VSP engine 324 can obtain the video frames 302 as additional input (e.g., in addition to the features 346) and use the video frames 302 and features 346 to associate the video markers 348 with corresponding video frames from the video frames 302. For example, in some cases, the smart VSP engine 324 can embed each video marker within a corresponding video frame, include each video marker with the corresponding video frame (e.g., within a same package, container, signal, message, packet, etc.). As another example, in some cases, the smart VSP engine 324 can include information in each video marker identifying its corresponding video frame. To illustrate, each video marker can include a pointer, address, indication, header, and/or identifier that identifies the corresponding video frame associated with that video marker.

Figure 4:
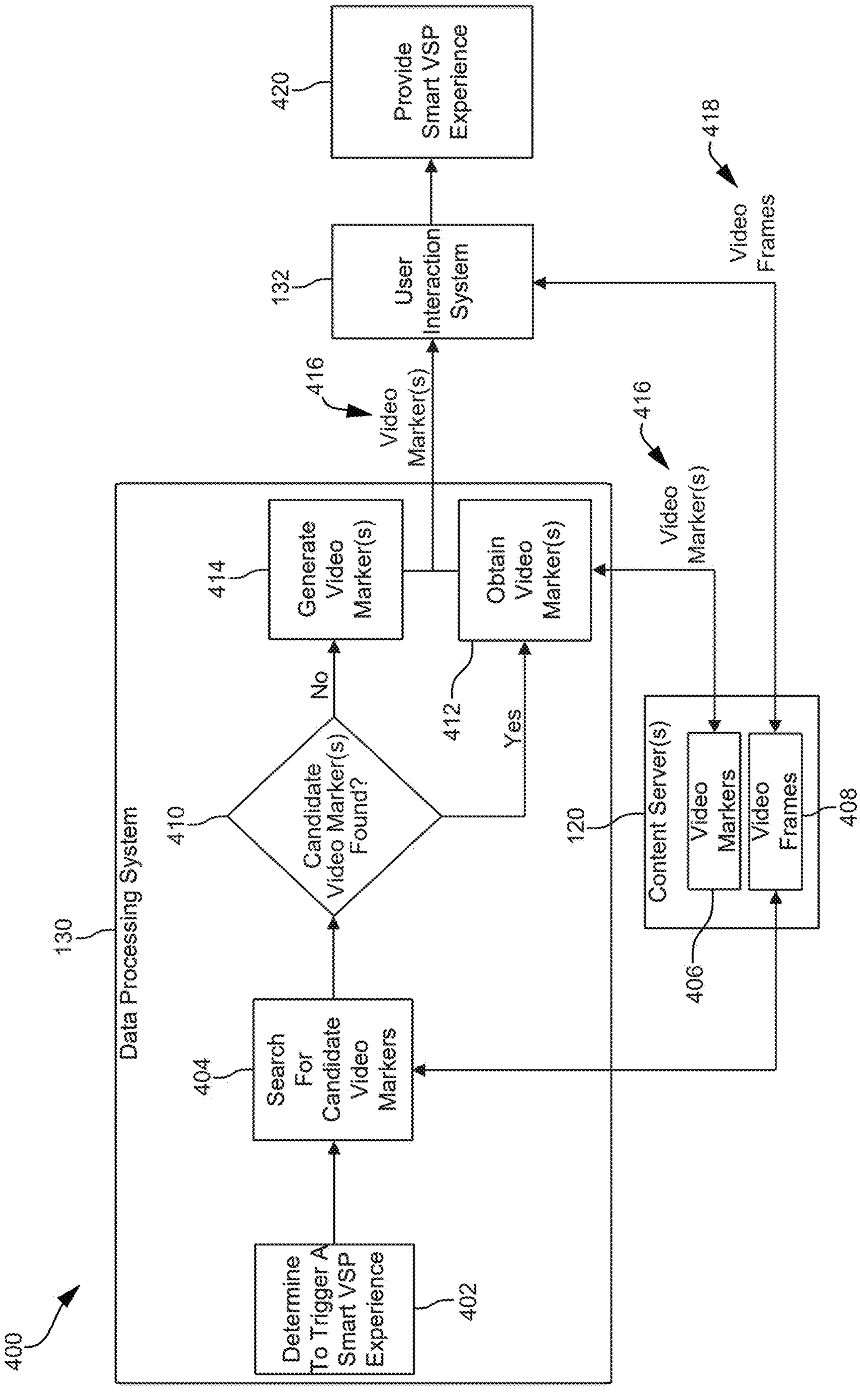
FIG. 4 is a block diagram illustrating an example system process for implementing smart video seek and playback experiences, according to some examples of the present disclosure.

FIG. 4 is a block diagram illustrating an example system process 400 for implementing smart VSP experiences, according to some examples of the present disclosure. At block 402, the data processing system 130 can determine to trigger a smart VSP experience. The smart VSP experience can include any smart VSP experiences described herein and/or any other custom video package, video seek/playback function, video seek/playback control, video playback setting, video playback option, etc. Non-limiting examples of smart VSP experiences include smart replay, smart skip (e.g., skip content), smart rewind, smart forward, smart playback speed adjustment (e.g., slow motion, fast motion, etc.), smart video reels or packages (e.g., custom video reels, custom video packages, custom video clips, etc.), smart video compilations, smart video rendering adjustments (e.g., resolution, frame rate, etc.), smart record, smart shuffle, smart video suggest (e.g., suggest videos), smart sleep timer settings, smart volume settings, and/or any other smart video customization, controls, settings, behaviors, and/or options.

A "smart" VSP experience can differ from a conventional video playback, seek, and/or content experience. For example, unlike a conventional video playback, seek, and/or content experience, a "smart" VSP experience may not be fixed or predefined for all users, devices, implementations, or contexts and/or at all times. Instead, a "smart" VSP experience can be customized (e.g., for a user (or set of users), a device (or set of devices), an environment (or set of environments), a context (or set of contexts), a condition (or set of conditions), a setting (or settings), and/or in any other way and/or can vary and/or depend on one or more factors such as, for example and without limitation, a context, a content, a user preference, a user profile, a user device characteristic (e.g., a capability, a configuration, a device type, etc.), a user characteristic (e.g., demographics, etc.), a user behavior, user feedback, user interactions, VSP statistics (e.g., user statistics, device statistics, geographic location statistics, language statistics, user interaction/behavior statistics, content statistics, content provider statistics, etc.), a date or time, a location, and/or any other factor.

In some cases, the data processing system 130 can to trigger the smart VSP experience based on a request for the smart VSP experience, a signal configured to trigger or request the smart VSP experience, and/or one or more triggers (e.g., a condition, a context, a setting, a rule, a preference, and/or any other cue). For example, the data processing system 130 can trigger the smart VSP experience based on a request or signal received by the data processing system 130 from the user interaction system 132 or a client device, such as media device(s) 106 or remote control(s) 110. In some examples, the data processing system 130 can receive a signal configured to trigger the smart VSP experience from the user interaction system 132. The user interaction system 132 can generate and send the signal to the data processing system 130 in response to a request or signal from the media device(s) 106, a signal from the remote control(s) 110, a signal from a remote server or network (e.g., a cloud network), and/or a signal from an application.

In some examples, the user(s) 140 can request the smart VSP experience from the media device(s) 106, which can generate and send a signal to the data processing system 130 configured to trigger or request the smart VSP experience. The user(s) 140 can request the smart VSP experience from the media device(s) 106 using an application (e.g., a web browser, a remote control application, a video application, a video service application or platform, etc.) on the media device(s) 106, a media player on the media device(s) 106, a control interface or element on the media device(s) 106, or any other control or application on the media device(s) 106. In other examples, the user(s) 140 can request the smart VSP experience using the remote control(s) 110. For example, the user(s) 140 can press a button on the remote control(s) 110 configured to generate a signal configured to trigger or request the smart VSP experience. In response to the user(s) 140 pressing the button on the remote control(s) 110, the remote control(s) 110 can generate the signal and send the signal to the data processing system 130 (or send the signal to the media device(s) 106, which can send the signal to the data processing system 130).

In order to generate such signals, the remote control(s) 110 can include a button configured to generate signals to trigger the smart VSP experience or may include multiple buttons configured to generate different signals to trigger different smart VSP experiences. In some cases, the remote control(s) 110 can include a button configured to generate different signals for different smart VSP experiences, which can depend on how the button is pressed/triggered. For example, the button can be configured to generate a signal for a particular smart VSP experience when the button is activated through a short press (e.g., when the button is pressed for less than a certain amount of time), a different signal for a different smart VSP experience when the button is activated through a long press (e.g., when the button is pressed for more than a certain amount of time), another different signal for another different smart VSP experience when the button is pressed multiple times, etc. In this way, the same button on the remote control(s) 110 can be configured to generate different signals for different smart VSP experiences depending on how the button is pressed (e.g., an amount of time the button is pressed and/or any other button press pattern) and/or how many times the button is pressed within a time interval (e.g., a time interval between button presses and/or between a first button press and a last button press).

In some cases, the data processing system 130 can determine to trigger the smart VSP experience in response to detecting a request for the smart VSP experience from sensor data captured by one or more sensors. For example, the user interaction system 132 (or the data processing system 130) can obtain image data captured by a camera sensor(s) that depicts a user gesture. The user interaction system 132 (or the data processing system 130) can process the image data to perform gesture detection/recognition and detect the user gesture depicted in the image data and, based on the user gesture, generate a signal configured to trigger the smart VSP experience. In this way, the data processing system 130 can trigger smart VSP experiences based on user gestures detected/recognized from image data. As another example, the user(s) 140 may provide a touch input through the media device(s) 106 (or another device) that can be interpreted as and converted into a signal configured to trigger a particular smart VSP experience, which the data processing system 130 can use to trigger the particular smart VSP experience.

In some cases, the data processing system 130 can determine to trigger the smart VSP experience based on one or more factors such as, for example and without limitation, a cue (e.g., a cue detected from something depicted in a content playing at the media device(s) 106 such as an event, an activity, a condition, a pattern, a scene, an object, a face, a character, a moment, a behavior, a replay or highlight, a sentiment, etc.), a context, a content (or type of content) playing at the media device(s) 106, a user interaction with such content and/or the media device(s) 106, a condition, a user engagement with content (and/or lack thereof), user feedback, user preferences, VSP statistics, and/or any other factors or cues.

In response to determining to trigger the smart VSP experience, at block 404, the data processing system 130 can search for candidate video markers for the smart VSP experience. The video markers can identify video frames or locations within video frames for a smart VSP experience. For example, a video marker can identify a video frame or location within a video frame as a starting location for a smart VSP experience, such as a starting location for smart replay or a smart record. As another example, a video marker can identify a video frame or location within a video frame as an end location for a smart VSP experience, such as an end location for a smart replay, a smart skip, a smart record, a smart rewind, etc. Thus, a video marker can indicate where to start a smart VSP experience, where to end a smart VSP experience, what content to include from a smart VSP experience, and/or what content to exclude from a smart VSP experience. In some cases, a smart VSP experience may be implemented using multiple video markers. For example, a smart record experience can be associated with a video marker that indicates a video frame or location within a video frame to start recording, and another video marker that indicates a video frame or location within a video frame to stop recording. As another example, a smart custom reel may be associated with multiple video markers which can identify which video frames (from a same video or multiple videos) to include in the smart custom reel.

Thus, when a smart VSP experience is triggered, the data processing system 130 can search for one or more video markers to select for the smart VSP experience, which can be used to identify one or more video frames (or one or more locations within one or more video frames) to use for the smart VSP experience (e.g., to identify a starting point for the smart VSP experience, an ending point for the smart VSP experience, any video frames to include in the smart VSP experience, and/or any video frames to exclude from the smart VSP experience.

As shown in FIG. 4, to identify a video marker(s) for the smart VSP experience, the data processing system 130 can search for candidate video markers from existing video markers 406 in storage (e.g., previously generated video markers) and/or existing video markers included with or embedded in a video (e.g., provided with the video) playing at the media device(s) 106. If there are no video markers (or the data processing system 130 does not identify any candidate video markers) in storage, included with the video playing at the media device(s) 106, or embedded in the video, the data processing system 130 can generate one or more video markers for the smart VSP experience. The data processing system 130 can generate the one or more video markers in response to determining to trigger the smart VSP experience (e.g., if there are no existing video markers or no video markers are identified/selected for the smart VSP experience), during playback of the video (e.g., while streaming the video, while playing the video from storage, live or in real time during playback of the video live or in real time, etc.), when the video is prepared for use (e.g., for streaming, for playback, for broadcast, etc.), and/or at any other time.

For example, the data processing system 130 can check if a video playing at the media device(s) 106 is associated with any video markers, such as video markers embedded in video frames of the video, video markers signaled with the video, video markers in storage that are correlated with video frames of the video, and/or video markers included with the video. If the video includes video markers (e.g., has video markers embedded, is included with video markers, is signaled with video markers, etc.), the data processing system 130 can check such video markers for any candidate video markers that the data processing system 130 can select for the smart VSP experience, which the data processing system 130 can use to determine which video frames to use (e.g., include, exclude, adjust, customize, etc.) for the smart VSP experience.

If the video does not have or include any video markers (or relevant/candidate video markers), the data processing system 130 can check any video markers available in storage (if any). For example, the data processing system 130 can check a storage, such as content server(s) 120 and/or any other storage, for any existing video markers. In FIG. 4, the content server(s) 120 includes video markers 406 that the data processing system 130 can check to determine whether any of the video markers 406 can be selected as a candidate video marker for the smart VSP experience. The video markers 406 in the content server(s) 120 can include video markers previously generated for one or more videos. Video markers from the video markers 406 can be generated by the data processing system 130 and/or provided by one or more content providers and/or owners of the one or more videos associated with the video markers 406.

If the data processing system 130 determines that there are video markers 406 in storage (e.g., content server(s) 120), the data processing system 130 can check the video markers 406 to determine if any are candidates for the smart VSP experience. For example, the data processing system 130 can determine that the content server(s) 120 includes video markers 406, and check the video markers 406 in the content server(s) 120 to determine whether to select any of the video markers 406 as a candidate video marker for the smart VSP experience. A candidate video marker can include a video marker selected and/or identified for a smart VSP experience, correlated with a smart VSP experience, and/or considered for use in a smart VSP experience.

In some examples, the data processing system 130 can determine whether any video markers (e.g., video markers 406 and/or video markers embedded in or included with a video such as a video playing at the media device(s) 106) are candidates for the smart VSP experience triggered based on a type of smart VSP experience of the smart VSP experience triggered, a video associated with the smart VSP experience (e.g., a video playing at the media device(s) 106 when the smart VSP experience is/was triggered), a video frame or playback location associated with the smart VSP experience (e.g., a playback location within a video playing at the media device(s) 106 when the smart VSP experience is/was triggered, a video frame playing at the media device(s) 106 when the smart VSP experience is/was triggered, etc.), a content of a video or video frame playing at the media device(s) 106 (e.g., playing when the smart VSP experience is/was triggered), and/or a trigger of the smart VSP experience (e.g., a signal, a request, a cue, etc.).

In some cases, to determine whether any existing video markers (e.g., any of the video markers 406, any video markers included with or embedded in the video playing at the media device(s) 106, etc.) is/are a candidate for the smart VSP experience, the data processing system 130 can compare the video markers (e.g., video markers 406) and associated video frames (e.g., video frames 408) with a trigger of the smart VSP experience (e.g., a cue, a signal, a request, a parameter, a condition, a context, etc.), the video frame(s) (e.g., a content of the video frame(s)) playing at the media device(s) 106 (e.g., currently playing or playing when the smart VSP experience is/was triggered), and/or a playback position within a video when the smart VSP experience is/was triggered. In some cases, when determining to trigger the smart VSP experience, the data processing system 130 can determine the type of smart VSP experience of the smart VSP experience triggered. The data processing system 130 can determine the type of smart VSP experience based on a trigger of the smart VSP experience such as, for example and without limitation, a signal, request, rule, preference, context, condition, cue, instruction, parameter, event, action, schedule, content feature, video control, and/or any other trigger.

The information about the type of smart VSP experience can help the data processing system 130 determine what type(s) of video markers and/or associated content (e.g., video frames) match, are correlated with, or may be candidates for the smart VSP experience. For example, if the smart VSP experience is a smart instant replay, the data processing system 130 can search for video markers associated with (e.g., configured for, designated for, indicated for, etc.) use in smart instant replays, if the smart VSP experience is a smart skip function, the data processing system 130 can search for video markers associated with smart skip functions, if the smart VSP experience is a smart highlight reel, the data processing system 130 can search for video markers associated with smart highlight reels, etc.

As previously explained, in some cases, video markers can be associated with smart VSP experiences (e.g., specific smart VSP experiences and/or types of smart VSP experiences) based on a configuration of the video markers (e.g., different video markers can have different structures, settings, data, objects, attributes, variables, and/or characteristics corresponding to or correlated with different smart VSP experiences) and/or information in/of the video markers such as, for example, labels, tags, headers, titles, names, metadata, identifiers, flags, objects, cues, and/or any other information identifying or associating smart VSP experiences (or types of experiences) with the video markers. Thus, the data processing system 130 can determine whether a video marker is associated with a smart VSP experience and, if so, the data processing system 130 can compare the smart VSP experience associated with the video marker with the smart VSP experience triggered to determine whether the video marker is a candidate for the smart VSP experience triggered. If the data processing system 130 determines that the smart VSP experience triggered matches, is relevant to, or has a threshold similarity to a smart VSP experience (or type of experience) associated with a video marker (if any), the data processing system 130 can identify that video marker as a candidate.

In another example, the data processing system 130 can compare a current video frame playing at the media device (s) 106 (e.g., playing when the smart VSP experience is/was triggered or playing when the data processing system 130 searches for an associated video marker) or a playback location of a current video playing at the media device(s) 106 (e.g., playing when the smart VSP experience is/was triggered or when the data processing system 130 searches for an associated video marker), with existing video markers (e.g., video markers 406 and any video markers associated with the current video, if any) and/or video frames (e.g., video frames 408, video frames of the current video) associated with the existing video markers, to determine whether any video markers 406 is/are a candidate for the smart VSP experience. For example, the data processing system 130 can determine if a video frame associated with a video marker from the video markers 406 is within a playback proximity to a current video frame playing at the media device(s) 106, which can indicate or suggest that the video frame associated with the video marker (and thus the video marker) is part of, related to, and/or within a threshold proximity to (e.g., adjacent, etc.) a relevant feature (e.g., a scene, event, object, character, activity, condition, scenario, action, movement, pattern, etc.) depicted in the current video frame playing at the media device(s) 106. If the video frame associated with the video marker is within a playback proximity to the current video frame, the data processing system 130 may determine that the video marker associated with the video frame is a candidate for the smart VSP experience.

In some cases, if any of the video markers 406 (and/or any video markers included with or embedded in a current video playing) is associated with a video frame that matches the current video frame playing at the media device(s) 106 or is within a threshold playback distance (e.g., the video frame is adjacent to the current video frame within a video sequence, there are no more than a threshold number of video frames between the video frame and the current video frame in the video sequence, the playback duration between the video frame and the current video frame is within a threshold, etc.) from the current video frame (and/or the current playback location of the current video playing at the media device(s) 106), the data processing system 130 may determine that such video marker(s) is a candidate for the smart VSP experience.

For example, if the video markers 406 include a video marker associated with a video frame that is part of a video sequence that includes a current video frame playing at the media device(s) 106 and the data processing system 130 determines that there are n number of video frames between the video frame associated with that video marker and the current video frame within the video sequence, the data processing system 130 may determine that the video maker associated with that video frame is a candidate for the smart VSP experience if the n number of video frames is equal to or less than a threshold number of frames defined by a video frame proximity parameter, which can represent a parameter defining a threshold proximity for determining whether two video frames, such as the current video frame and the video frame associated with the video marker, are related or relevant to each other based on their proximity within a video sequence. As another example, if the data processing system 130 determines that the playback duration from the video frame associated with the video marker and the current video frame is within a threshold playback duration, the data processing system 130 may determine that such video marker is a candidate for the smart VSP experience based on a proximity of the video frame associated with that video marker to the current video frame or playback position.

To illustrate, if the smart VSP experience corresponds to a smart instant replay triggered or requested during playback of a current video frame and the video markers 406 include a video marker associated with a previous video frame that is adjacent to (within a video sequence) that video frame or within a threshold number of video frames from the current video frame, the data processing system 130 may determine that the previous video frame is relevant to the smart instant replay because the previous video frame may be part of or relevant to a same scene, event, activity, condition, character, content, and/or any other feature of the current video frame or because the previous video frame would likely be part of a content that was recently played and/or included in the instant replay or used as the start of the smart instant replay. Since the previous frame is determined to be relevant to the smart instant replay, the data processing system 130 can determine that the video marker associated with the previous video frame is relevant to the smart instant replay and thus a candidate for that smart VSP experience.

In some cases, the data processing system 130 can determine what video markers are relevant to or candidates for the smart VSP experience based on the content and/or characteristics of a current video playing at the media device(s) 106 (e.g., a current video playing when the smart VSP experience was triggered or the data processing system 130 starts searching for video marker candidates). For example, the data processing system 130 can identify one or more current video frames, which can include a video frame playing at the media device(s) 106 (e.g., playing when the smart VSP experience is/was triggered, playing when searching for video marker candidates, and/or the last one or more video frames that have played from a current video) and/or the last n number of video frames played at the media device(s) 106, where n represents a number/amount of video frames. The data processing system 130 can determine one or more characteristics of the one or more current video frames such as, for example, a depicted event, character, activity, scene, object, content and/or type of content, face, interaction, moment, context, genre, type of frame (e.g., key frame, etc.), and/or any other characteristic. The data processing system 130 can determine the type of smart VSP experience triggered and use the one or more characteristics of the one or more current video frames and the type of smart VSP experience to determine whether to select/identify any of the video markers 406 as candidates for the smart VSP experience.

In some examples, the data processing system 130 can compare the smart VSP experiences (and/or type of experiences) associated with the video markers 406 (and any other existing video markers) and/or the video frames (and associated content) corresponding to the video markers 406 with the one or more characteristics of the one or more current video frames and/or the type of smart VSP experience triggered, to determine whether to select/identify any of the video markers 406 as a candidate video marker for the smart VSP experience. For example, the data processing system 130 can use the comparison described above to determine relevance scores for the video markers 406 and determine whether any video marker has a relevance score above a threshold (or equal to the threshold). If a video marker has a relevance score above the threshold (or equal to the threshold), the data processing system 130 can select/identify that video marker as a candidate video marker for the smart VSP experience requested.

In some examples, the data processing system 130 can increase the relevance score of a video marker as a match (and/or similarity) between the smart VSP experience (or type of experience) associated with the video marker and the smart VSP experience triggered increases, and reduce the relevance score for the video marker as the match (and/or similarity) between the smart VSP experience (or type of experience) associated with the video marker and the smart VSP experience triggered decreases. The data processing system 130 can additionally or alternatively increase the relevance score of the video marker as a match (and/or similarity) increases between the video frame associated with the video marker and the one or more characteristics of the one or more current video frames, and decrease the relevance score of the video marker as the match (and/or similarity) decreases between the video frame associated with the video marker and the one or more characteristics of the one or more current video frames.

In some cases, the data processing system 130 can use other information to determine whether to select/identify any of the video markers 406 (and any other existing video markers) as a candidate video marker for the smart VSP experience, such as user information, user feedback, historical information, statistics, etc. For example, assume that the user(s) 140 has user preferences or a user profile specifying a preference for selecting a first type of content (e.g., content depicting a type of event, activity, scene, genre, character, etc.) as a candidate for smart skip functions (e.g., the user(s) 140 indicates an interest in skipping the first type of content when smart skip functions are triggered) and specifying a preference for selecting a second type of content as a candidate for smart replay functions (e.g., the user(s) 140 indicates an interest in replaying the second type of content when smart replays are triggered).

In this example, if the data processing system 130 determines that the smart VSP experience triggered is/includes a smart skip function, the data processing system 130 can identify, based on the user preferences or profile, a preference for selecting the first type of content as a candidate for smart skip functions. The data processing system 130 can then determine whether the content (e.g., video frames) associated with any of the video markers 406 includes or matches (or has a threshold match or similarity to) the first type of content. If the data processing system 130 determines that the content (e.g., a video frame) associated with a video marker includes or matches (or has a threshold match or similarity to) the first type of content, the data processing system 130 can select that video marker as a candidate for the smart VSP experience. The data processing system 130 can then use that video marker to implement the smart VSP experience triggered (e.g., by skipping the video frame associated with that video marker).

If the data processing system 130 instead determines that the smart VSP experience requested is/includes a smart replay function, the data processing system 130 can identify, based on the user preferences or profile, a preference for selecting the second type of content as a candidate for smart replay functions. The data processing system 130 can then determine whether the content (e.g., video frames) associated with any of the video markers 406 includes or matches (or has a threshold match or similarity to) the second type of content. If the data processing system 130 determines that the content (e.g., a video frame) associated with a video marker includes or matches (or has a threshold match or similarity to) the second type of content, the data processing system 130 can select that video marker as a candidate for the smart VSP experience. The data processing system 130 can then use that video marker to implement the smart VSP experience triggered (e.g., by replaying the video frame associated with that video marker).

In some examples, the data processing system 130 can analyze prior user interactions with videos (e.g., interactions by the user(s) 140 and/or a group of users) and/or the media device(s) 106, to identify or infer user preferences for viewing/playing certain content or types of content, skipping/forwarding certain content or types of content, replaying/rewinding certain content or types of content, adjusting playback settings of certain content or types of content, interacting with certain content or types of content, preferences for any other interactions with certain content or types of content, and/or preferences for any other settings for content or types of content. The data processing system 130 can use the user preferences identified/inferred from prior user interactions to correlate content (and/or types of content) with respective smart VSP experiences. The data processing system 130 can use such correlations between content (and/or types of content) and user preferences to determine whether the video frames associated with the video markers 406 are a match for or are relevant to the smart VSP experience triggered. If the data processing system 130 determines that a video frame associated with one of the video markers 406 is a match for or is relevant to the smart VSP experience triggered, the data processing system 130 can select the video marker associated with that video frame as a candidate for the smart VSP experience, which the data processing system 130 can use to implement the smart VSP experience.

In some cases, the data processing system 130 can determine whether any of the video frames associated with the video markers 406 is/are a match for or relevant to the smart VSP experience based on a respective match (or matching score), similarity (or similarity score), and/or relevance (or relevance score) between the smart VSP experience and each video frame. For example, if the smart VSP experience includes generating or playing a smart highlight reel for the user(s) 140 and a set of video frames associated with a set of video markers from the video markers 406 include highlight content (e.g., highlight events, plays, scenes, characters, players, conditions, activities, etc.), the data processing system 130 can determine that the video frames in the set of video frames are a match (e.g., have a similarity to, have a relevance to, have a matching score to, etc.) the smart highlight reel. The data processing system 130 can then select the video markers associated with the set of video frames as candidates for the smart VSP experience.

As previously explained, the data processing system 130 can first search for video marker candidates from existing video markers (if any), such as any video markers available (if any) in storage (e.g., video markers 406 in content server(s) 120) and any video markers included or embedded in (if any) a video such as a video associated with the smart VSP experience (if any). If the data processing system 130 does not identify any candidate video markers from existing video markers (e.g., because there are no existing video markers or the data processing system 130 failed to identify a candidate video marker(s) within any existing video markers), the data processing system 130 can generate one or more video markers for the smart VSP experience.

At block 410, the data processing system 130 can determine whether the data processing system 130 found (or selected) a video marker(s) for the smart VSP experience from any existing video markers (if any). If the data processing system 130 determines at block 410 that it found (or selected) a video marker(s) for the smart VSP experience from existing video markers, the data processing system 130 can proceed to block 412. At block 412, the data processing system 130 can obtain a video marker(s) 416 found (or selected) for the smart VSP experience from existing video markers and provide the video marker(s) 416 to the user interaction system 132. The data processing system 130 can obtain the video marker(s) 416 from storage (e.g., content server(s) 120) and/or from a video associated with the smart VSP experience (if any). For example, as shown in FIG. 4, the data processing system 130 can obtain the video marker(s) 416 from the video markers 406 stored at the content server(s) 120, if the video marker(s) 416 is/are included in the video markers 406 at the content server(s) 120. If the data processing system 130 found (or selected) the video marker(s) 416 from a video associated with the smart VSP experience (e.g., embedded in or included with the smart VSP experience), the data processing system 130 can obtain the video marker(s) 416 from the video.

The marker(s) 416 can identify one or more video frames (or one or more locations within one or more video frames), which can be used to implement the smart VSP experience. In some examples, the marker(s) 416 can include one or more pointers, flags, tags, identifiers, and/or other indicators identifying one or more video frames or video frame locations, which can be used to identify the one or more video frames or video frame locations for use for the smart VSP experience. In some cases, the data processing system 130 can embed the video marker(s) 416 within one or more corresponding video frames or otherwise correlate the video marker(s) 416 with one or more corresponding video frames.

If the data processing system 130 instead determines at block 410 that it did not find (or select) a video marker(s) for the smart VSP experience from existing video markers (if any), the data processing system 130 can proceed to block 414. At block 414, the data processing system 130 can generate the video marker(s) 416 for the smart VSP experience and provide the video marker(s) 416 to the user interaction system 132. To generate the video marker(s) 416, the data processing system 130 can use any criteria (and/or similar criteria) described above with respect to searching for a candidate video marker from existing video markers. For example, the data processing system 130 can determine the video marker(s) 416 for the smart VSP experience based on the type of smart VSP experience triggered, a content of any videos or frames associated with the smart VSP experience, user preferences, user interactions, content statistics, user and/or device characteristics, content characteristics, context information, historical information, and/or any other information described above with respect to searching for candidate video markers.

In some examples, the data processing system 130 can determine a type of smart VSP experience triggered to determine a type of content suitable for the smart VSP experience (e.g., suitable for including in or excluding from the smart VSP experience). To illustrate, if the smart VSP experience includes a smart replay, the data processing system 130 can identify content suitable for the smart replay, such as content that includes highlights, anomalies, specific features (e.g., specific events, activities, objects, characters, conditions, etc.), previous video frames (e.g., recently played video frames, previous video frames within a distance of a current video frame or playback location, etc.), recaps, previews, and/or video frame replays. If the data processing system 130 identifies content for the smart VSP experience, the data processing system 130 can generate the marker(s) 416 based on the identified content. The marker(s) 416 can identify a video frame(s) associated with that content and/or a playback location associated with that content. This way, the marker(s) 416 can identify content locations for implementing the smart VSP experience.

In some examples, the data processing system 130 can compare the type of smart VSP experience with any user information (e.g., user preferences, user characteristics, previous user interactions, user statistics, etc.) to determine what video content (e.g., from a current video playing, a specific video available, a set or collection of videos, etc.) is relevant to the smart VSP experience. For example, if the data processing system 130 identifies user preferences indicating that a user associated with the smart VSP experience is interested in using content showing scoring in sports events for smart replays and smart highlight reels, and the data processing system 130 determines that the smart VSP experience is a smart replay or smart highlight reel, the data processing system 130 can determine that the content suitable for the smart VSP experience can include content showing scoring in sports events. The data processing system 130 can identify a video frame (e.g., in a current video playing, within a playback proximity to a current video playing, within a set of videos, etc.) that shows such content, and generate the video marker(s) 416 identifying such video frame for the smart VSP experience.

In some cases, the data processing system 130 can use other cues to generate the video marker(s) 416, such as context, specific conditions, content genre, content characteristics, device characteristics, etc. For example, if the smart VSP experience includes a smart skip function and the smart skip function was triggered during a portion of a video depicting content for mature audiences and the user associated with the smart VSP experience is a minor, the data processing system 130 can determine that the smart skip function pertains to any video frames depicting the content for mature audiences. The data processing system 130 can identify the video frames in the video with such content as being relevant to the skip function, and generate the video marker(s) 416 including a video marker identifying a video frame where the skip function should skip to.

As another example, if the smart VSP experience includes a smart skip function triggered during a portion of a video depicting violent content, the data processing system 130 can determine that the smart skip function likely pertains to any video frames depicting the violent content. The data processing system 130 can identify the video frames in the video with such content as being relevant to the smart skip function, and generate the video marker(s) 416 including a video marker identifying a video frame where the skip function should skip to.

As another example, if the smart VSP experience includes a smart instant replay, the data processing system 130 can determine that the smart instant replay likely pertains to video frames depicting certain content such as a scene or event playing or finished playing when the smart instant replay was triggered. The data processing system 130 can identify the video frames with such content as relevant to the smart instant replay, and generate the video marker(s) 416 including a video marker identifying a video frame where the smart instant replay should begin.

As yet another example, if the smart VSP experience includes a smart instant replay that was triggered during or after a keyframe or a video content depicting a scene showing something important to a plot (or estimated to have an importance score by the data processing system 130) of an associated video, the data processing system 130 can determine that the smart instant replay likely pertains to one or more video frames leading up to the keyframe and/or depicting that scene. The data processing system 130 can identify the one or more video frames as being relevant to the smart instant replay, and generate the video marker(s) 416 including a video marker identifying a video frame from the one or more video frames where the smart instant replay should begin.

In some cases, the data processing system 130 can buffer a portion of a video played or streamed by the media device(s) 106, to process the buffered portion for potential video markers. The media device(s) 106 can play the video with a delay as it waits to receive the buffered portion when the data processing system 130 completes processing such content for potential video markers. For example, if the smart VSP experience pertains to a live video, the data processing system 130 can store a portion of the live video in a buffer and provide the live video to the media device(s) 106 with a delay as the data processing system 130 processes the live video portion in the buffer. The data processing system 130 can process each portion of the live video in the buffer to determine whether to generate or correlate any video markers with that portion, and provide the portion of the live video for the media device(s) 106 (e.g., provide it to the media device(s) 106 or the user interaction system 132, which can then provide it to the media device(s) 106) once the data processing system 130 completes processing that portion of the live video. As the data processing system 130 finishes processing a portion of the live video it buffers a next portion of the live video for processing, and iteratively buffers, processes, and forwards portions of the live video. The media device(s) 106 can receive and/or play portions of the live video with a delay as the data processing system 130 continuously buffers a portion of the live video for processing.

At block 420, the user interaction system 132 can receive the video marker(s) 416 from the data processing system

130 and provide the smart VSP experience to a target device, such as a consumer device for the smart VSP experience (e.g., the media device(s) 106), the content server(s) 120, a content provider, and/or any other device. The user interaction system 132 can provide the smart VSP experience by providing the video marker(s) 416 associated with the smart VSP experience to the target device, and/or use the video marker(s) 416 to trigger the smart VSP experience at the target device. In some cases, the user interaction system 132 can provide to the target device the video marker(s) 416 with an associated video frame(s), which can be used for the smart VSP experience. In some examples, the user interaction system 132 can provide the video marker(s) 416 and an associated video frame(s) as a package representing or implementing the smart VSP experience, or signal the video marker(s) 416 with the associated video frame(s) for use with the smart VSP experience. In other examples, the user interaction system 132 can use the video marker(s) 416 to trigger the smart VSP experience at the target device, or can send a signal to the target device including the video marker(s) 416 for the smart VSP experience (and, optionally, any associated video frames and/or instructions).

In some cases, the user interaction system 132 can optionally obtain the video frame(s) associated with the video marker(s) 416 from the data processing system 130 or the content server(s) 120, and optionally provide the video frame(s) to the target device along with the video marker(s) 416. For example, when the data processing system 130 provides the video marker(s) 416 to the user interaction system 132, the data processing system 130 can optionally provide the video frame(s) associated with the video marker(s) 416, which the user interaction system 132 can optionally provide with the video marker(s) 416 as part of the smart VSP experience.

In some cases, instead of or in addition to providing the video marker(s) 416 to the target device, the user interaction system 132 can use the video marker(s) 416 to generate one or more signals with instructions for implementing the smart VSP experience. The user interaction system 132 can provide the one or more signals to the target device, which can use the one or more signals to implement the smart VSP experience. For example, if the smart VSP experience includes a smart instant replay, the user interaction system 132 can use the video marker(s) 416 to generate one or more signals with instructions to replay one or more video frames identified for the smart VSP experience based on the video marker(s) 416. The user interaction system 132 can provide the one or more signals to the target device, which can trigger the target device to play the one or more video frames as part of the smart instant replay.

Figure 5:
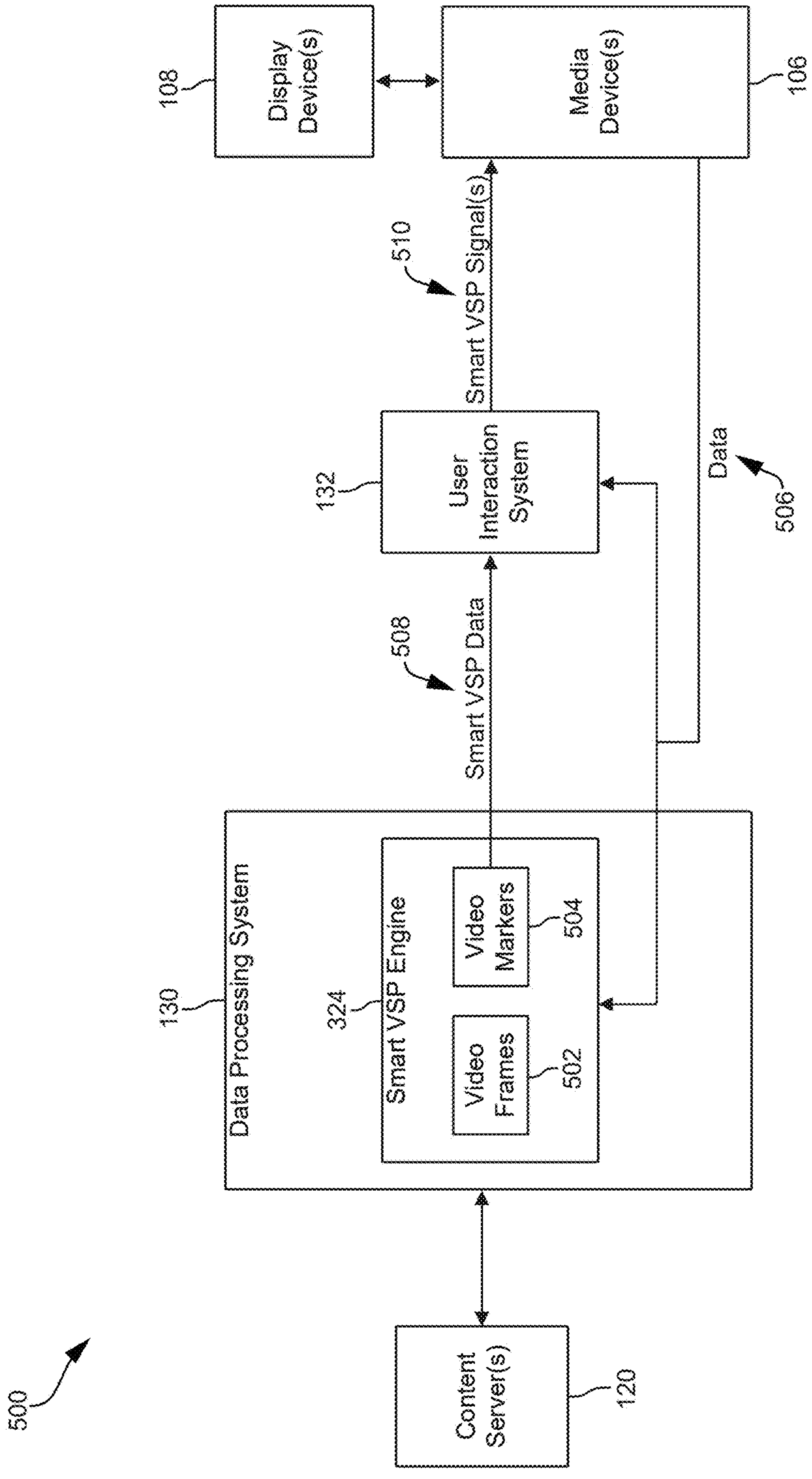
FIG. 5 is a block diagram illustrating another example system process for implementing smart video seek and playback experiences, according to some examples of the present disclosure.

FIG. 5 is a block diagram illustrating another example system process 500 for implementing smart VSP experiences, according to some examples of the present disclosure. In this example, the smart VSP engine 324 of the data processing system 130 includes video frames 502 associated with one or more smart VSP experiences and video markers 504 associated with the video frames 502. The video markers 504 can be generated and/or obtained by the data processing system 130 as previously described with respect to the system 300 shown in FIG. 3A, the system 340 shown in FIG. 3B, or the process 400 shown in FIG. 4. For example, the video markers 504 can include video markers generated by the smart VSP engine 324 of the data processing system 130 and/or video markers obtained by the smart VSP engine 324 from another source, such as content server(s) 120, a provider (e.g., a content provider) of the video frames 502 (e.g., if different from content server(s) 120), a video service(s) or channel(s) associated with the video frames 502, and/or any other source.

In some cases, the video markers 504 can include data (e.g., pointers, flags, headers, tags, metadata, objects, identifiers, etc.) correlating the video markers 504 with the video frames 502 (e.g., correlating each video marker to one or more corresponding video frames) and/or identifying the video markers 504. The video markers 504 can be embedded with the video frames 502 (e.g., each video marker embedded within a corresponding video frame) and/or otherwise included with the video frames 502 (e.g., included within one or more smart VSP packages or containers including one or more video markers and one or more corresponding video frames).

The smart VSP engine 324 can use the video markers 504 and optionally the video frames 502 to generate smart VSP data 508 which the user interaction system 132 can use to generate a smart VSP signal(s) 510 for the media device(s) 106. the smart VSP data 508 can include the video markers 504 and optionally the video frames 502. In some cases, the smart VSP data 508 can include the video markers 504 and instructions for using the video markers 504 to implement a particular smart VSP experience or various smart VSP experiences. For example, the smart VSP data 508 can include the video markers 504 and information correlating the video markers 504 with corresponding video frames from the video frames 502 and specifying how to use the video markers 504 to implement one or more smart VSP experiences associated with the video frames 502. In some examples, the information specifying how to use the video markers 504 can correlate each of the video markers 504 with a particular smart VSP experience that can be implemented using such video marker. In some cases, the information specifying how to use the video markers 504 can correlate each video marker from the video markers 504 (or each video marker of a subset of video markers from the video markers 504) with multiple respective smart VSP experiences that can be implemented using that video marker.

In some cases, the information specifying how to use the video markers 504 can additionally or alternatively provide instructions on what smart VSP functionalities are supported by the video markers 504 and the role of the video markers 504 in relation to such smart VSP functionalities. For example, the information can specify that a particular video marker can be used to identify a starting video frame (or an associated playback position) for a smart VSP experience, such as a smart instant replay, a smart record, a smart skip, etc. As another example, the information can specify that another video marker can be used to identify a last video frame (or an end playback position) for the smart VSP experience (or a different smart VSP experience).

In some examples, the smart VSP data 508 can include a package containing the video frames 502 stitched together according to the video markers 504. For example, the smart VSP data 508 can include a custom video package (e.g., a smart video package or reel) generated for a user (e.g., user(s) 140) of the media device(s) 106. The custom video package can include the video frames 502 stitched together into the custom video package. The video frames 502 can be stitched together in an order specified by or determined based on the video markers 504.

In some aspects, the smart VSP engine 324 can obtain data 506 associated with a smart VSP experience from the media device(s) 106. The smart VSP engine 324 can use the data 506 to identify a smart VSP experience triggered at the media device(s) 106 and/or help the smart VSP engine 324 generate the video markers 504 and/or smart VSP data 508 for the smart VSP experience. In some cases, the data 506 can include a signal or message requesting, triggering, and/or identifying a smart VSP experience to be implemented by the media device(s) 106 (e.g., a smart VSP experience requested or triggered by the media device(s) 106 or a smart VSP experience request/signal received by the media device(s) 106 to trigger the smart VSP experience). In such cases, the smart VSP engine 324 can use the data 506 to initiate one or more actions, operations, procedures, and/or processes associated with the smart VSP experience.

In some cases, the data 506 can additionally or alternatively include data for (or associated with) the smart VSP experience and/or any other data from the media device(s) 106 such as, for example and without limitation, context information (e.g., a context associated with the media device(s) 106), device information (e.g., capabilities, network information, type of device, device name, device model, device software, device settings, etc.), user information (e.g., user preferences, user settings, user profiles, user inputs, etc.), log data, state data, and/or any other information. For example, the data 506 can include context information and the context information can indicate what content (e.g., video, audio, text, etc.) is being presented (e.g., is playing, is rendering, etc.) by the media device(s) 106 on the display device(s) 108, a current video frame playing/displayed via the media device(s) 106, a current playback position of the video or video frame, a status or state of the media device(s) 106, any applications running at the media device(s) 106, any inputs or requests generated and/or received by the media device(s) 106, an operational context of the media device(s) 106, etc.

In some cases, the media device(s) 106 can send different portions of the data 506 at different times during a media session, before one or more smart VSP experiences triggered for the media device(s) 106, and/or during such one or more smart VSP experiences, to provide relevant information to the data processing system 130 for one or more smart VSP experiences. In some aspects, the data 506 can optionally include one or more inputs obtained by the media device(s) 106 (e.g., from a user associated with the media device(s) 106, from the remote control(s) 110, from one or more input devices, from another device, etc.). In some cases, the one or more inputs can include user feedback relating to one or more smart VSP experiences and/or one or more media sessions associated with the one or more smart VSP experiences. In other cases, the one or more inputs can additionally or alternatively include other user inputs such as, for example, an input used to trigger a smart VSP experience(s), an input used to control (e.g., start, stop, pause, rewind, forward, etc.) a media session at the media device(s) 106, an input adjusting one or more settings, an input providing preferences (e.g., preferences for one or more smart VSP experiences, media sessions, etc.), and/or any other inputs.

The smart VSP engine 324 can use the data 506 to determine information about the media device(s) 106, the content playing via the media device(s) 106, preferences, settings, capabilities, context information, user feedback, inputs (e.g., smart VSP inputs or requests, etc.), and/or any other relevant information, which can help the smart VSP engine 324 to generate the video markers 504 and/or the smart VSP data 508. For example, if the data 506 includes an indication of a smart VSP experience triggered or requested by the media device(s) 106, the smart VSP engine 324 can use such information to determine what video markers 504 and/or video frames 502 are relevant to the smart VSP experience. The smart VSP engine 324 can use that information to generate the smart VSP data 508 for implementing the smart VSP experience. For example, the smart VSP engine 324 can use that information to select one or more specific video markers and/or video frames to include and/or identify in the smart VSP data 508 for the smart VSP experience.

As another example, assume that the data 506 includes information about a media session at the media device(s) 106. In this example, the information about the media session may indicate what video the media device(s) 106 is playing on the display device(s) 108 and/or a current video frame or playback position of the video that the media device(s) 106 is playing on the display device(s) 108. The smart VSP engine 324 can use such information to determine what video marker(s) and/or video frame(s) is/are relevant to a smart VSP experience triggered or requested for the media session at media device(s) 106. For example, the smart VSP engine 324 can use information identifying a current video playing as part of the media session, a current video frame (from the current video) playing as part of the media session, and/or a current playback position, in order to determine what video marker(s) and/or video frame(s) is/are relevant to a particular smart VSP experience triggered for the media session at the media device(s) 106, since the content relevant to the particular smart VSP experience may depend on what is the current video playing, the current video frame playing, or the current playback position of the current video playing.

To illustrate, content that has recently played may be more relevant to an instant replay than content that has not played or played earlier within a video sequence associated with the current video, content that has not played may be more relevant to a skip function than content that has was already played, content associated with a scene that is part of a movie or TV show may be more relevant to a replay than content depicting credits or other information that is not part of a plot of the movie or TV show, etc. Since the most relevant video marker(s) and associated video frame(s) for a particular smart VSP experience may depend on the type of smart VSP experience and the current state of the media session (e.g., what is the current video playing, what is the current video frame playing, what is the current playback position, what video frame(s) have already played, what video frame(s) have not played, etc.), the smart VSP engine 324 can use such information to determine what video marker(s) and/or video frame(s) is/are relevant to a smart VSP experience for the media session at media device(s) 106.

The user interaction system 132 can use the smart VSP data 508 to generate a smart VSP signal(s) 510 for the media device(s) 106. The smart VSP signal(s) 510 can include a signal(s) and/or associated data that can trigger or implement the smart VSP experience at the media device(s) 106, and/or that the media device(s) 106 can use to implement the smart VSP experience. For example, in some cases, the smart VSP signal(s) 510 can include one or more video markers that the media device(s) 106 can use to implement the smart VSP experience. The media device(s) 106 can use the one or more video markers to identify which video frame(s) in the current video to use for the smart VSP experience.

For example, if the smart VSP experience includes a smart skip function, the media device(s) 106 can use the one or more video markers to identify which video frame(s) in the current video to skip for the smart skip function, if the smart VSP experience includes a smart replay, the media device(s)

106 can use the one or more video markers to identify which video frame(s) in the current video to replay for the smart replay, if the smart VSP experience includes a smart record function, the media device(s) 106 can use the one or more video markers to identify which video frame(s) in the current video to record for the smart record function, etc.

In some cases, the smart VSP signal(s) 510 can additionally include instructions to the media device(s) 106 for using any video markers in (or identified in) the smart VSP signal(s) 510 to implement the smart VSP experience. For example, the smart VSP signal(s) 510 can identify a smart VSP action or setting to implement for the smart VSP experience using one or more video markers in (or identified in) the smart VSP signal(s) 510 and one or more commands or operations that the media device(s) 106 can use to implement (or that can trigger) the smart VSP action or setting using the one or more video markers. As another example, the smart VSP signal(s) 510 can signal one or more video markers selected for a smart VSP experience, information correlating the smart VSP signal(s) 510 to a smart VSP experience triggered by the media device(s) 106 or a signal/request sent by the media device(s) 106 to trigger/request the smart VSP experience, and/or information correlating the one or more video markers with the smart VSP experience triggered.

While FIG. 5 illustrates data processing system 130 and user interaction system 132 separate from media device(s) 106, data processing system 130 and/or user interaction system 132 can be implemented by media device(s) 106 or a separate system, such as system server(s) 126. For example, the system server(s) 126 can implement the data processing system 130 and user interaction system 132, in which cases the media device(s) 106 may communicate and/or interact with the system server(s) 126 during the system process 500. In other cases, the data processing system 130 and user interaction system 132 can be implemented by the media device(s) 106, in which cases the system process 500 can be implemented by the media device(s) 106.

Figure 6:
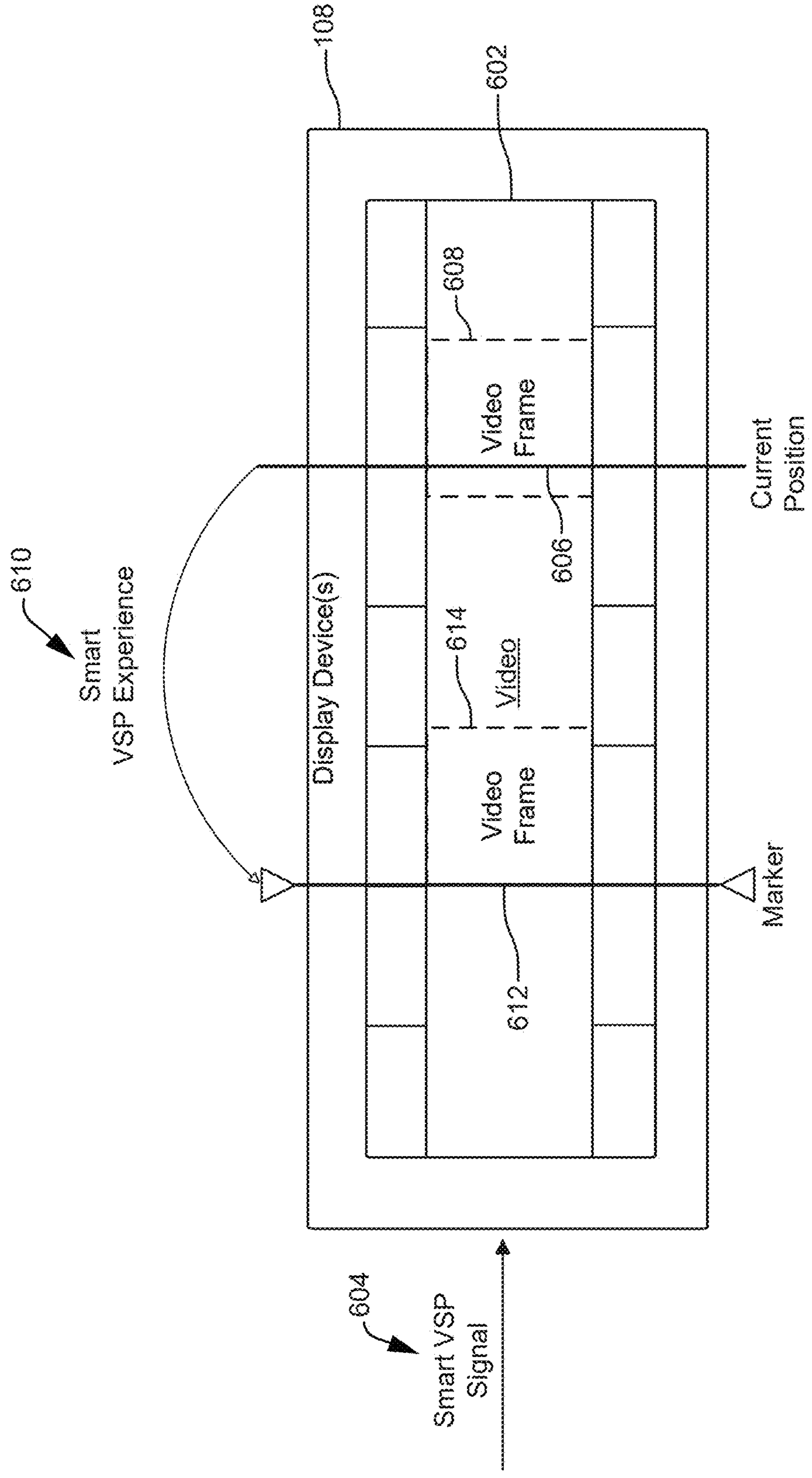
FIG. 6 is a diagram illustrating an example smart video seek and playback experience implemented during a video, according to some examples of the present disclosure.

FIG. 6 is a diagram illustrating an example smart VSP experience 610 implemented during a video 602, according to some examples of the present disclosure. In this example, the display device(s) 108 is displaying a video 602 that is playing as part of a video playback session. As the video 602 plays, the display device(s) 108 (and/or the media device(s) 106 coupled to the display device(s) 106) can obtain a smart VSP signal 604 configured to trigger the smart VSP experience 610 associated with the video 602.

In this example, the smart VSP experience 610 represents a smart replay that moves the current playback position 606 within a current video frame 608 to a previous video frame 614 identified by the video marker 612 for the smart replay. The previous video frame 614 can represent the beginning of the smart replay. In some examples, the video marker 612 can identify the previous video frame 614 as the first video frame to play for the smart replay (e.g., the beginning of the smart replay). In some cases, the video marker 612 can identify the previous video frame 614 as the start of the instant replay and/or a playback position for the smart replay corresponding to the beginning of the previous video frame 614. In some cases, the video marker 612 can identify a specific position/location within the previous video frame 614 to start the instant replay. For example, if the smart replay should start from a portion of the previous video frame 614 other than the beginning of the previous video frame 614, the video marker 612 can identify the position/location corresponding to that portion of the previous video frame 614.

The display device(s) 108 (and/or the media device(s) 106) can use the video marker 612 to identify the seek position for the smart replay. For example, the display device(s) 108 (and/or the media device(s) 106) can use the video marker 612 to determine where to move the seek position of the video 602 to start the smart replay from that seek position. Here, the seek position can be the video frame 614 (or a portion of the video frame 614 such as the beginning of the video frame 614. To implement the smart replay from the smart VSP experience 610, the playback position of the video 602 can be moved from the current playback position 606 to the position identified by the video marker 612, which corresponds to the previous video frame 614.

The video marker 612 used to identify the starting playback location for the smart VSP experience 610 can be determined based on various factors, as previously described, rather than using a fixed or predetermined interval (e.g., playback interval or video frame interval) for all replay scenarios. For example, the video marker 612 and the previous video frame 614 identified by the video marker 612 can be selected for the smart VSP experience 610 based on the current playback position 606 of the video 602; the current video frame 608 of the video 602 playing; content (e.g., an event, activity, dialogue, utterance, character, object, pattern, scene, face, behavior, condition, attribute, closed captions, subtitles, audio content, text content, and/or any other feature depicted and/or included in/with the content) associated with the video 602, the current video frame 608, and/or one or more other video frames of the video 602 (e.g., including the previous video frame 614; a device context (e.g., capabilities, running application, running service, running media session, etc.), user preferences, previous user interactions, content statistics, and/or any other information as described herein.

To illustrate, in some examples, the video marker 612 and the previous video frame 614 identified by the video marker 612 can be selected for the smart VSP experience 610 based on the current playback position 606 of the video 602, the current video frame 608 of the video 602 playing, and the content associated with the video 602, the current video frame 608, and/or one or more other video frames of the video 602 (e.g., including the previous video frame 614). Such content can include, for example and without limitation, audio content (e.g., dialogue, speech, music, noise, etc.), text content (e.g., closed captions, subtitles, supers, metadata, etc.), and/or visual content such as a depicted event, activity, character, object, pattern, scene, face, behavior, condition, attribute, and/or any other feature.

The current playback position 606 of the video 602 can be relevant to determining the video marker 612 and associated video frame 614 for the smart VSP experience 610 because, depending on the type of smart VSP experience, the relevant video frame(s) for the smart VSP experience 610 may include one or more video frames after the current playback position 606 (and/or current video frame 608) or one or more video frames before the current playback position 606 (and/or current video frame 608). Moreover, if there are multiple potential video frames or candidates that may be used for the start or end of the smart VSP experience 610, the location within the video 602 of each of the potential video frames or candidates relative to the current playback position 606 of the video 602 can be used to determine which potential video frame or candidate to select for the start or end of the smart VSP experience 610.

For example, if the candidate video frames identified for a smart replay include a first video frame that starts 50 seconds prior to the current playback position 606 and a second video frame that starts 10 minutes prior to the current playback position 606, the first video frame may be more relevant to the smart replay than the second video frame, as the second video frame may be too far from the current playback position 606 for the smart replay. The video marker generated or selected for the smart replay can thus correspond to the first video frame. On the other hand, if the candidate video frames identified for a smart replay include a first video frame that starts 30 seconds prior to the current playback position 606 and a second video frame that starts 60 seconds prior to the current playback position 606 and it is unclear which video frame may be more relevant (or a better candidate for) the smart replay, the second video frame may be selected for the smart replay instead of the first video frame if the preference is to err on the side of being overinclusive of the content selected for the smart replay (e.g., in order to avoid mistakenly excluding a portion of the content that should have instead been included in the smart replay). Here, the video marker generated or selected for the smart replay can correspond to the second video frame.

However, if the content (and/or associated features) depicted in the first and second video frames is fast-moving content (e.g., a brief scene, a brief event, a brief activity, etc.), then the first video frame may be selected for the smart replay instead of the second video frame, based on a determination that the relevant content for the smart replay is likely included within a shorter time interval (or from the video frame that is closer to the current playback position 606). Thus, in such scenario, the video marker selected for the smart replay may correspond to the first video frame, which can therefore trigger the smart replay to begin at/with the first video frame.

Figure 7A:
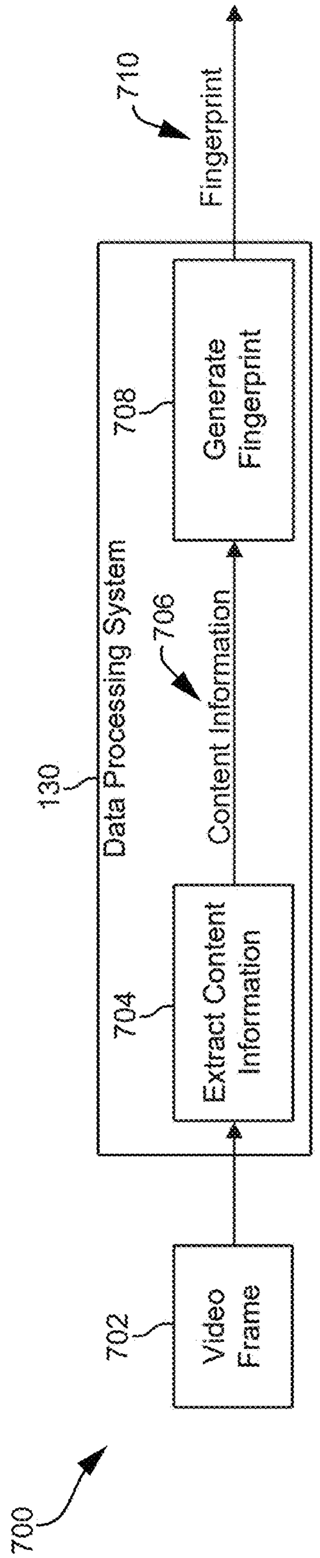
FIGS. 7A through 7C are diagrams illustrating example processes for generating a fingerprint to identify a video frame, according to some examples of the present disclosure.
Figure 7B:
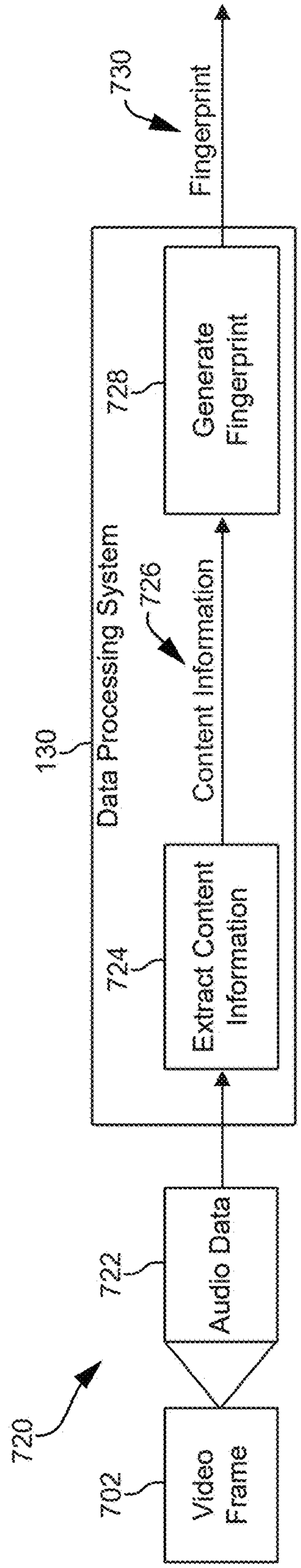
Figure 7C:
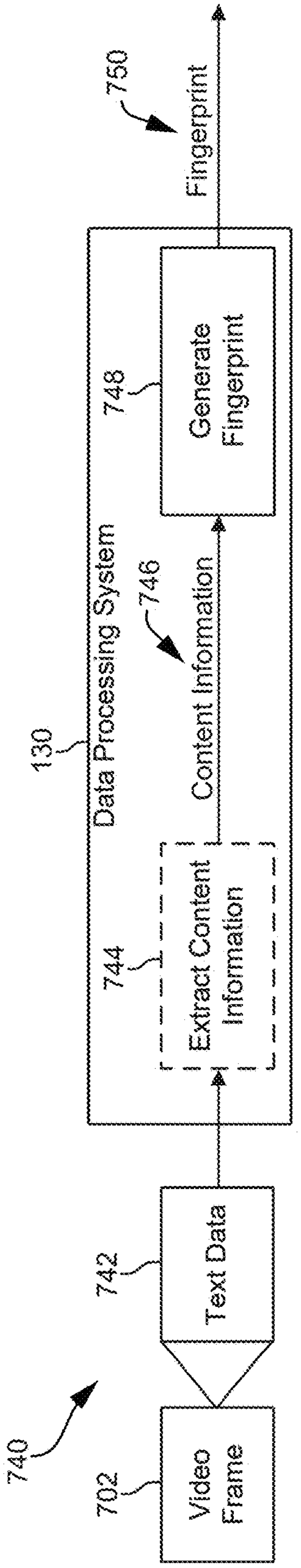

FIGS. 7A through 7C are diagrams illustrating example processes for generating fingerprints from different types of content, which can be used to identify video frames, match video frames, and/or determine similarity scores or distances for sets of video frames in order to identify video frames for certain smart VSP experiences and/or correlate or assess different video frames for certain smart VSP experiences such as, for example and without limitation, replays, previews, highlights, recaps, skip or forward functions, etc. In some examples, the data processing system 130 can implement some or all of the processes in FIGS. 7A through 7C.

For example, in some cases, the data processing system 130 may implement the process 700 in FIG. 7A, the process 720 in FIG. 7B, and the process 740 in FIG. 7C in order to use video frames, audio content, and text data for generating fingerprints for content. In other cases, the data processing system 130 may only implement the process 700 in FIG. 7A, the process 720 in FIG. 7B, or the process 740 in FIG. 7C in order to use video frames, audio content, or text data for generating fingerprints for content. In yet other cases, the data processing system 130 may implement two of the process 700 in FIG. 7A, the process 720 in FIG. 7B, and the process 740 in FIG. 7C in order to use two types of content (e.g., two from the video frames, audio content, and text data) for generating fingerprints for content, instead of using all three types of content or only a single type of content. In some cases, the data processing system 130 may implement all of, or two of, the process 700 in FIG. 7A, the process 720 in FIG. 7B, and the process 740 in FIG. 7C individually/separately or as a combined process. The disclosure shall now turn to FIG. 7A.

FIG. 7A is a diagram illustrating an example process 700 for using a video frame 702 to generate a fingerprint 710 of/for the video frame 702, according to some examples of the present disclosure. In this example, the data processing system 130 can use the actual video frame 702 to generate the fingerprint 710 of/for the video frame 702. The fingerprint 710 is a representation of the video frame 702 and can be used to identify (or uniquely identify) the video frame 702, match the video frame 702 with another video frame(s) (e.g., based on a respective fingerprint(s) associated with the other video frame(s)), and/or compare the video frame 702 with another video frame(s) (e.g., based on a respective fingerprint(s) associated with the other video frame(s)) to determine a matching or similarity score for the video frame 702 and the other video frame(s).

At block 704, the data processing system 130 can process video frame 702 to extract content information 706 from video frame 702. The content information 706 can include information extracted from the video frame 702, such as information about and/or from the video frame 702 (and/or a content thereof). For example, the content information 706 can include one or more features extracted from the video frame 702. The one or more features can include, be the same as, or be similar to any of the features 322 described above with respect to FIG. 3A, the features 346 described above with respect to FIG. 3B, and/or any other features described herein.

In some examples, the content information 706 can include information about (and/or a representation of) anything depicted in the video frame 702 such as, for example and without limitation, one or more scenes, events, faces, activities, characters, text, patterns, objects, colors, conditions, clothing, buildings, structures, backgrounds, foregrounds, contexts, attributes, and/or anything depicted in the video frame 702. For example, the content information 706 can include a representation of a scene such as a sports event depicted in the video frame 702, one or more characters in the scene such as players in the sports event, context information (e.g., a team of the players, a score in the sports event, a characteristic(s) of a uniform worn by the players such as uniform colors, uniform numbers, types of uniforms, etc.), movement in the scene (e.g., a direction and/or pattern of movement of players in the scene, etc.), activity in the scene (e.g., a particular play, a foul, an injury, a celebration, a change in score, a referee action or ruling, etc.), text depicted in the video frame 702 (e.g., a score, statistics, betting information, player information, an advertisement, etc.), a move performed by one or more players, a condition depicted in the video frame 702 (e.g., an accident, an injury, a weather, a foul, a condition of a field or street, etc.), a condition of the video frame 702, and/or any other information in the video frame 702.

To extract the content information 706, the data processing system 130 can perform one or more data processing tasks using the video frame 702 as an input. For example, to extract the content information 706 from the video frame 702, the data processing system 130 can use object detection and/or recognition, scene detection and/or recognition, activity detection and/or recognition, face detection and/or recognition, text recognition, motion estimation, feature extraction, background detection, foreground detection, segmentation, image/video processing, feature matching, signal processing, computer vision, saliency estimation, AI/ML, pattern recognition, classification, and/or any other detection, recognition, and/or data processing tasks.

At block 708, the data processing system 130 can use the content information 706 to generate the fingerprint 710 for the video frame 702. The fingerprint 710 can identify and/or represent the video frame 702. In some examples, the fingerprint 710 can identify the video frame 702 based on the content information 706 extracted from the video frame 702.

In some cases, the fingerprint 710 can include a representation of the content information 706 extracted from the video frame 702. The representation can encode the content information 706. For example, in some cases, the fingerprint 710 can include one or more representations, feature vectors, or embeddings (e.g., vector embeddings, etc.) generated based on the content information 706. The representation(s), feature vector(s), or embedding(s) can encode any of the content information 706 extracted from the video frame 702.

In some examples, the fingerprint 710 can include a hash generated based on the content information 706. For example, the data processing system 130 can apply a hash function to the content information 706 to generate a hash of the content information 706. The hash can be used as the fingerprint 710 associated with that video frame 702.

The data processing system 130 can generate a fingerprint as described in the example process 700 for any video frame of any video. For example, the data processing system 130 can perform the process 700 to generate a fingerprint for each video frame in a video, each video frame in multiple videos or a video library, a subset of video frames in a video (or multiple videos), each keyframe in a video (or multiple videos), and/or any video frames that may need to be uniquely identified, matched with other video frames, and/or compared with other video frames to calculate a respective matching or similarity score.

The data processing system 130 can additionally or alternatively generate a fingerprint for a video frame (e.g., video frame 702) based on other content associated with the video frame, such as audio content associated with the video frame and/or text data associated with the video frame.

FIG. 7B is a diagram illustrating an example process 720 for using audio data 722 associated with a video frame 702 to generate a fingerprint 730 of/for the video frame 702, according to some examples of the present disclosure. The data processing system 130 can use the audio data 722 to generate the fingerprint 730 with or without the video frame 702 and/or any other data associated with the video frame 702. The fingerprint 730 is a representation of the video frame 702 and can be used to identify (or uniquely identify) the video frame 702, match the video frame 702 with another video frame(s) (e.g., based on a respective fingerprint(s) associated with the other video frame(s)), and/or compare the video frame 702 with another video frame(s) (e.g., based on a respective fingerprint(s) associated with the other video frame(s)) to determine a matching or similarity score for the video frame 702 and the other video frame(s).

At block 724, the data processing system 130 can extract content information 726 from the audio data 722 associated with the video frame 702. The audio data 722 can include any audio associated with the video frame 702. For example, the video frame 702 can include a video portion, a text portion that includes any related text and/or metadata, and an audio portion that includes the audio data 722. In some cases, the audio data 722 can include an audio signal, an audio file or asset, an audio component, an audio stream, and/or any audio content or data associated with the video frame 702. In some examples, the audio data 722 can be included or merged with the video frame 702. For example, the audio data 722 can be included in a container or wrapper that also includes the video frame 702 and any other related data. As another example, the audio data 722 can include a separate signal, file/asset, container, stream, and/or message provided with or in addition to the video frame 702.

To extract content information 726 from audio data 722, the data processing system 130 can use audio signal processing, ASR, NLP, NLU, audio feature extraction, classification, acoustic detection, speech processing, pattern recognition, sound recognition, text recognition (e.g., based on a text transcript of the audio data 722), AI/ML, and/or any other data processing task or technique. The content information 726 can include information extracted from the audio data 722 and/or determined based on information from the audio data 722, such as one or more features extracted from the audio data 722 and/or any information determined based on the audio data 722.

For example, the content information 726 determined from the audio data 722 can include, without limitation, any characteristics and/or perception characteristics of the audio data 722 and/or an associated audio signal(s) (e.g., tempo, spectrum information such as average spectrum, spectral flatness, tones and/or prominent tones across frequency bands, bandwidth, average zero crossing rate, frequency/frequencies, audio amplitude/amplitudes, audio spectrogram, energy content, Mel Frequency Cepstral Coefficients, jitter features, meta features, pitch, time-domain features, frequency-domain features, instrumentation, mood, rhythm, spectral centroid, genre, etc.), speech in the audio data 722 (and/or a description or representation thereof), a description or indication of any content related to the audio data 722 determined based on information/features extracted from the audio data 722 (e.g., information and/or descriptions generated based on speech in the audio data 722, text generated from speech recognized from the audio data 722, other audio data extracted from the audio data 722, etc.), and/or any other information.

In some cases, the content information 726 can include a description or indication of one or more content features determined based on speech in the audio data 722 and/or text generated based on speech recognized in the audio data 722. Non-limiting examples of such content features include one or more events, activities, actors, conditions, attributes, characters, scenes, objects, speakers, contexts, genres, moods, sentiments, keywords, and/or any other information. For example, the data processing system 130 can recognize speech, utterances, and/or dialogue in the audio data 722, and use the recognized speech, utterances, and/or dialogue to identify any events, activities, characters, scenes, objects, speakers, conditions, contexts, genres, moods, sentiments, keywords, actors, and/or other information associated with the audio data 722. The data processing system 130 can include the information identified from the speech, utterances, and/or dialogue (e.g., any identified events, activities, characters, scenes, objects, speakers, conditions, contexts, genres, moods, sentiments, keywords, actors, etc.) in the content information 726.

In some cases, the data processing system 130 can additionally or alternatively recognize any speech, utterances, and/or dialogue in the audio data 722, and generate a text transcript of the recognized speech, utterances, and/or dialogue. The data processing system 130 can optionally use the text transcript to identify any events, activities, characters, scenes, objects, speakers, conditions, contexts, genres, moods, sentiments, keywords, actors, and/or other information associated with the audio data 722. The data processing system 130 can also optionally include the text transcript (or a portion or representation thereof) and/or any of the information identified from the text transcript (e.g., any identified events, activities, characters, scenes, objects, speakers, conditions, contexts, genres, moods, sentiments, keywords, actors, etc.) in the content information 726.

Since the audio data 722 corresponds to the video frame 702, the data processing system 130 can use the content information 726 extracted from the audio data 722 as described above to generate a fingerprint 730 that can be used to identify or represent the video frame 702 associated with the audio data 722.

At block 728, the data processing system 130 can generate a fingerprint 730 based on the content information 726 extracted from the audio data 722. Since the audio data 722 corresponds to the video frame 702, the fingerprint 730 generated based on the content information 726 extracted from the audio data 722 can be used to identify or represent the video frame 702 associated with the audio data 722. In some cases, the data processing system 130 can use an acoustic fingerprint algorithm or a hash function to generate the fingerprint 730. In some cases, the data processing system 130 can use the content information 726 to generate a spectrogram, which can represent the fingerprint 730 or be used to generate the fingerprint 730.

In some examples, the fingerprint 730 can include one or more representations, feature vectors, or embeddings that encode or are used to encode the content information 726 (or a portion thereof). In other examples, the fingerprint 730 can include one or more hashes generated based on the content information 726 (or a portion thereof). For example, the data processing system 130 can apply one or more hash functions to the content information 726 (or a portion thereof) to generate a hash used as or representing the fingerprint 730.

FIG. 7C is a diagram illustrating an example process 740 for using text data 742 associated with a video frame 702 to generate a fingerprint 750 of/for the video frame 702, according to some examples of the present disclosure. The data processing system 130 can use the text data 742 to generate the fingerprint 750 with or without the video frame 702 and/or any other data associated with the video frame 702, such as the audio data 722. The fingerprint 750 is a representation of the video frame 702 and can be used to identify (or uniquely identify) the video frame 702, match the video frame 702 with another video frame(s) (e.g., based on a respective fingerprint(s) associated with the other video frame(s)), and/or compare the video frame 702 with another video frame(s) (e.g., based on a respective fingerprint(s) associated with the other video frame(s)) to determine a matching or similarity score for the video frame 702 and the other video frame(s).

The example process 740 shown in FIG. 7C can generate a fingerprint 750 based on the text data 742 itself or based on content information 746 extracted from the text data 742 (and optionally with the text data 742 itself) as described with respect to block 744. The text data 742 can include any text associated with the video frame 702 and/or the audio data 722 associated with the video frame 702. For example, the text data 742 can include, without limitation, closed captions, subtitles, a text transcript generated based on the audio data 722 associated with the video frame 702, intertitles, superimposed text, metadata, and/or any other data associated with the video frame 702 and/or the audio data 722 associated with the video frame 702. In some cases, the text data 742 can be included or merged with the video frame 702 (and, optionally, the audio data 722) in a container, wrapper, file, stream, signal, and/or message. In other cases, the text data 742 can be included separately from the video frame 702 and/or the audio data 722, such as in a separate signal, file/asset, container, stream, message, etc.

At block 744, data processing system 130 can optionally extract content information 746 from the text data 742. The text data 742 can include data recognized from audio associated with video frame 702. To extract content information 746 from text data 742, the data processing system 130 can use NLP, NLU, text feature extraction, text or string classification, text processing and/or recognition, pattern recognition, semantic analysis, dialogue management, intent classification, lexical analysis, syntactic analysis, AI/ML, signal processing, and/or any other text processing task or technique. The content information 746 can include information extracted from text data 742 and/or determined based on information from text data 742, such as features extracted from text data 742 and/or information determined from text data 742.

For example, the content information 746 determined from text data 742 can include, without limitation, one or more keywords and/or strings in text data 742, any speech/utterance and/or dialogue included or conveyed in text data 742, any features in and/or conveyed/represented in text data 742 (e.g., any events, scenes, characters, objects, activities, interactions, genres, moods, sentiments, conditions, actors, contexts, speakers, etc.), a description and/or indication of any features in and/or determined from text data 742, and/or any other information.

The content information 746 can include a description or indication of features determined based on text data 742 such as, for example and without limitation, one or more events, activities, actors, conditions, attributes, characters, scenes, objects, speakers, contexts, genres, moods, sentiments, keywords, and/or any other information. For example, the data processing system 130 can recognize any text in text data 742, and use the recognized text to identify any events, activities, characters, scenes, objects, speakers, conditions, contexts, genres, moods, sentiments, keywords, actors, and/or other information associated with text data 742. The data processing system 130 can include the information (and/or a description or indication thereof) identified from the text (e.g., any identified events, activities, characters, scenes, objects, speakers, conditions, contexts, genres, moods, sentiments, keywords, actors, etc.) in content information 746.

At block 748, the data processing system 130 can generate a fingerprint 750 based on the content information 746 extracted from the text data 742. Here, since the text data 742 corresponds to the video frame 702, the fingerprint 750 generated based on the content information 746 extracted from the text data 742 can be used to identify or represent the video frame 702 associated with the text data 742. In some cases, the data processing system 130 can use a text fingerprint algorithm and/or a hash function/algorithm to generate the fingerprint 750. In some cases, the data processing system 130 can use the actual text data 742 (or a portion thereof) with the content information 746 to generate the fingerprint 750. In other cases, the data processing system 130 can skip the step at block 744 and use the actual text data 742 (or a portion thereof) to generate the fingerprint 750 (e.g., without the content information 746).

In some examples, the fingerprint 750 can include one or more representations, feature vectors, or embeddings that encode or are used to encode the content information 746 (or a portion thereof) and/or the text data 742 (or a portion thereof), such as one or more feature vectors/embeddings or any other embeddings. In some cases, the fingerprint 750 can include one or more hashes generated based on the content information 746 (or a portion thereof) and/or the text data 742 (or a portion thereof). For example, the data processing system 130 can apply one or more hash functions to the content information 746 (or a portion thereof) and/or the text data 742 (or a portion thereof) to generate a hash used as or representing the fingerprint 750.

In some cases, rather than generating the fingerprint 710 based on the video frame 702, the fingerprint 730 based on the audio data 722, or the fingerprint 750 based on the text data 742, the data processing system 130 can combine the content information 706 (or a portion thereof) generated from the video frame 702, the content information 726 (or a portion thereof) generated from the audio data 722, and the content information 746 (or a portion thereof) generated from the text data 742 to generate a fingerprint for the video frame 702 based on all of the video frame 702, the audio data 722, and the text data 742. In other cases, the data processing system 130 can combine two of the content information 706 (or a portion thereof), the content information 726 (or a portion thereof), and the content information 746 (or a portion thereof) to generate a fingerprint for the video frame 702 based on two types of data associated with the video frame 702, such as two types of data from the video frame 702, the audio data 722, and the text data 742.

The data processing system 130 can generate fingerprints for multiple video frames as described in process 700, process 720, process 740, or any of the combined approaches described above (e.g., based on a combination of content types including video frames, associated audio data, and associated text data), and use the fingerprints associated with video frames to identify matching video frames (e.g., exact matches) and/or video frames that have variations but relate to a same portion of content, such as a same scene, event, etc. For example, a set of video frames may depict a same portion of content, such as a same scene or event, but may not be exact matches because they may have variations such as different camera angles, different views, different perspectives, etc., because the video frames may relate to different versions (e.g., original version, extended version, bonus content version, theater version, etc.), different applications (e.g., a video frame depicting a scene and another video frame providing a recap that includes the scene, etc.), content variations (e.g., with and without bonus content, with and without advertisements, different subtitles, different closed captions, different languages, etc.), and/or any other variations.

The data processing system 130 can use the fingerprints of video frames to identify matching video frames or similar video frames that may be used for certain smart VSP experiences and/or taken into account when generating smart VSP experiences. For example, a sports play may be depicted in different video frames using different camera angles. Using fingerprints, the data processing system 130 can determine that a set of video frames depict the same sports play so the data processing system 130 can determine how or whether to use any of the set of video frames. For example, the data processing system 130 can use one of the video frames depicting the same sports play for a smart skip function, a smart replay, or a smart recap function even though the video frame is not an exact match, as it nevertheless depicts the same sports play. As another example, the data processing system 130 can use the video frames depicting the same sports play with variations (e.g., different camera angles) to generate a smart highlight reel or a smart review reel intended to depict different views of the same sports play.

As another example, if a smart VSP experience is triggered and the data processing system 130 determines that the smart VSP experience is to skip over video frames depicting a recap, the data processing system 130 can identify the video frames depicting the recap based on a match or similarity score calculated using respective fingerprints. In another illustrative example, if a smart VSP experience is triggered for a smart instant replay, the data processing system 130 can use fingerprints to detect that a set of video frames that are not exact matches but are nevertheless relevant to the scene associated with the smart instant replay as they depict the same scene in different camera angles. This way, the data processing system 130 can decide whether to include the video frames that depict the same scene because of a relevance score, even though they may not be an exact match to other video frames identified for the instant replay and may otherwise have been excluded from the instant replay for failure to detect their relevance.

Figure 8:
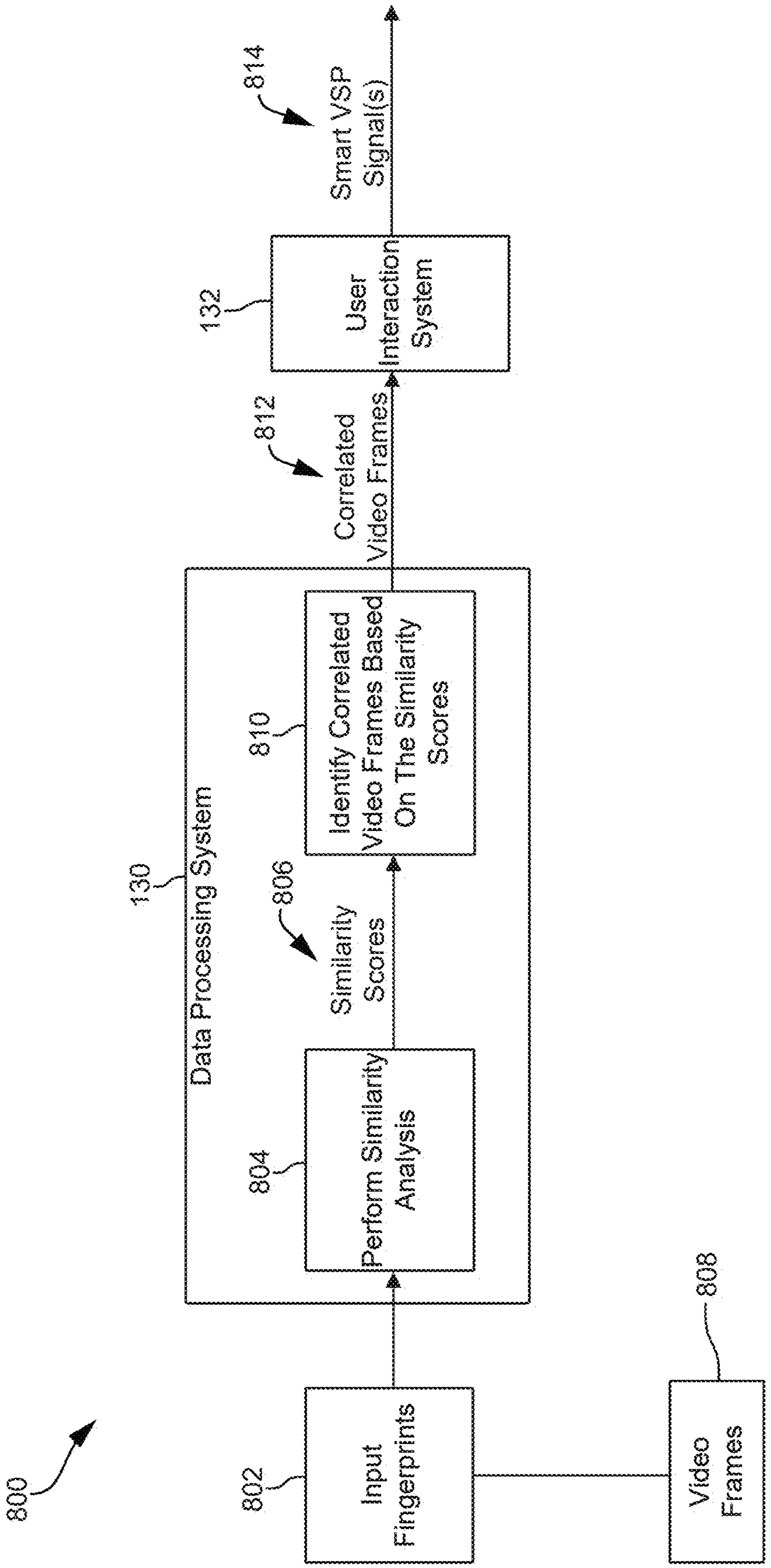
FIG. 8 is a diagram illustrating an example system process for using fingerprints to correlate video frames for use in a smart video seek and playback experience, according to some examples of the present disclosure.

FIG. 8 is a diagram illustrating an example system process 800 for using fingerprints to correlate video frames for use in a smart VSP experience, according to some examples of the present disclosure. At block 804, the data processing system 130 can perform a similarity analysis based on input fingerprints 802 associated with a set of video frames. As previously explained, each of the input fingerprints 802 can identify a respective video frame from the set of video frames. In some examples, each of the input fingerprints 802 can be generated as previously described with respect to FIGS. 7A, 7B, and/or 7C.

For example, in some cases, an input fingerprint from the input fingerprints 802 can be generated by encoding information about one or more features extracted from an associated video frame, an audio portion associated with the video frame, and/or a text portion associated with the video frame. The one or more features can include, for example, a scene in the video frame, a character in the video frame, a movement of the character in the video frame, a clothing of the character in the video frame, an activity in the video frame, a context of or depicted in the video frame, an utterance(s) recognized from an audio portion and/or a text portion associated with the video frame, and/or any other characteristics and/or content attributes associated with the video frame, the audio portion, and/or the text portion. In some cases, the input fingerprint can include a feature vector(s) or embedding(s) encoding the information about the one or more features.

The data processing system 130 can perform the similarity analysis to determine a similarity scores 806 for video frames associated with the input fingerprints 802. In some examples, the data processing system 130 can determine the similarity scores between video frames by comparing the input fingerprints associated with the video frames. For example, the data processing system 130 can determine a similarity score for a set of video frames indicating a match between the set of video frames by determining that the input fingerprints associated with the set of video frames match (e.g., by determining that the data in the input fingerprints matches). Here, if the input fingerprints match, the data processing system 130 can determine that the set of video frames match (e.g., are the same/identical).

In some cases, the data processing system 130 can determine similarity scores 806 based on similarities (and/or dissimilarities) of numbers in input fingerprints 802, and/or based on similarities (and/or dissimilarities) and/or distances between data in the input fingerprints 802. For example, if input fingerprints 802 include vector embeddings encoding information extracted from video frames (and/or associated audio and/or text data), the data processing system 130 can determine distance metrics of the vector embeddings using a vector distance function(s). The distance metrics can measure vector distances in vector space, which can be used to determine (and/or can represent) the similarity scores 806 for associated video frames. The similarity scores 806 can represent the similarities (and/or dissimilarities) between the input fingerprints 802, and thus the similarities (and/or dissimilarities) of the video frames associated with the input fingerprints 802. Non-limiting examples of distances metrics for measuring vector distances (and similarity scores) can include Euclidean distance or Euclidean squared distance, Cosine similarity, Dot Product similarity, Manhattan distance, Hamming similarity, and Minkowski distance, among others. In some cases, to determine similarity scores 806, data processing system 130 can compare distances and/or directions of vectors in the vector embeddings.

The similarity scores 806 can indicate or can be used to determine whether any video frames associated with input fingerprints 802 match or have a threshold match/similarity such that the those video frames may be correlated. A determination that video frames are correlated can indicate or represent a determination that such video frames are related, have a threshold similarity, and/or depict or relate to the same scene, content, and/or context with or without any variations such as variations in camera angles, audio, text, visualization effects, and/or any other variations. The data processing system 130 can compute similarity scores for any set of video frames based on their associated fingerprints. For example, the data processing system 130 can compute similarity scores for a plurality of video frames within a video (e.g., video frames within a segment of the video, video frames within an episode associated with the video, video frames within a chapter associated with the video, video frames from different locations within the video, or any other video frames within the video) and/or video frames within different videos.

For example, to identify video frames depicting plays by a particular sports player across videos in order to generate a smart video reel depicting such plays by that player, the data processing system 130 compare fingerprints from video frames across videos. In this example, the fingerprints may be generated based on features extracted from video frames depicting such plays by that player, which can be used to identify video frames depicting such plays by that player. To illustrate, the fingerprints may be generated based on features extracted from video frames corresponding to content depicting that player, content depicting that play, content depicting that players uniform and number, content depicting that player's team(s), audio and/or text content identifying/describing that player performing any of such plays, audio and/or text content identifying that player, and/or any content depicting or identifying characteristics of that player performing any of such plays. Such fingerprints can then be used to identify video frames depicting that player performing such plays. Accordingly, in this example, the data processing system 130 can use such fingerprints to identify video frames depicting that player performing such plays based on the similarity scores of such fingerprints (and thus the video frames).

As another example, to identify video frames depicting replays from a play depicted in another video frame, the fingerprint associated with the video frame depicting that play can be compared to other video frames to determine similarity scores used to identify video frame replays. The data processing system 130 can determine that one or more video frames depict one or more replays of that play based on a threshold similarity score between a respective fingerprint of each of the one or more video frames and the fingerprint of the video frame depicting the play. The data processing system 130 can then use the one or more video frames identified as depicting replays of that play in a smart VSP experience, such as a smart replay or a smart video reel, for example.

At block 810, the data processing system 130 can identify correlated video frames 812 based on similarity scores 806. For example, the data processing system 130 can correlate video frames if the data processing system 130 determines that the similarity scores of the fingerprints associated with the video frames have a threshold similarity. The data processing system 130 can set the threshold similarity according to any similarity magnitude, tolerance, range, distance, and/or result desired. A determination that video frames are correlated can indicate that such video frames match (e.g., are the same), are related, have a threshold similarity, and/or depict (or are relevant to) a same scene, content, and/or context (with or without any variations).

The correlated video frames 812 can include video frames determined (e.g., based on similarity scores of associated fingerprints) to match (e.g., be the same), be related, have a threshold similarity, and/or depict or be relevant to a same scene, content, and/or context (with or without any variations). In some examples, to identify the correlated video frames 812, the data processing system 130 can identify the video frames corresponding to the input fingerprints having the threshold similarity scores used to correlate the video frames. The data processing system 130 can identify such video frames from the video frames 808 associated with the input fingerprints 802. For example, each of the input fingerprints 802 can include information correlating that input fingerprint with a video frame from the video frames 808, and/or each of the video frames 808 can include information correlating that video frame with a fingerprint from the input fingerprints 802. Additionally or alternatively, the data processing system 130 can perform a lookup in reference data correlating the input fingerprints 802 with respective video frames from the video frames 808, in order to correlate any input fingerprint with a corresponding video frame.

The correlated video frames 812 can be used for any smart VSP experience, such as a smart video (e.g., a custom video package or reel), a smart replay, a smart skip, a smart rewind, a smart forward, a smart recap, a smart playback, a smart record, a smart seek, a smart setting, etc.

In some examples, the data processing system 130 can provide the correlated video frames 812 to the user interaction system 132, which can use the correlated video frames 812 to generate a smart VSP signal(s) 814 for the media device(s) 106. In other examples, the data processing system 130 can store the correlated video frames 812 for future use and/or can use the correlated video frames 812 to generate the smart VSP signal(s) 814.

In some examples, the smart VSP signal(s) 814 can include the correlated video frames 812, video markers associated with the correlated video frames 812, data correlating the correlated video frames 812 (e.g., data in the video markers associated with the correlated video frames 812 or data separate from such video markers), an instruction(s) for a smart VSP experience(s) associated with the smart VSP signal(s) 814, a command(s) and/or operation(s) for implementing or triggering the smart VSP experience, and/or any other information for implementing a smart VSP experience(s) based on the correlated video frames 812 and/or associated video markers.

In some cases, the similarity scores 806 and the correlated video frames 812 can be used to notify a user (e.g., the user(s) 140) when content of interest to the user is playing or the user may have missed such content. For example, the data processing system 130 can determine what content and/or type of content may be of interest to the user based on user preferences and/or historical data (e.g., previous user interactions with content, previous user feedback regarding content, etc.). The data processing system 130 can generate fingerprints for identifying such content based on features of such content, as previously described. The data processing system 130 can use the fingerprints associated with such content and/or types of content to identify content that the user may have missed and/or content playing that may be of interest to the user. Here, the data processing system 130 can use the fingerprints associated with the content of interest to the user and fingerprints of other content playing or available to perform a similarity analysis and determine similarity scores. The data processing system 130 can use the similarity scores determined between the content of interest to the user and the content playing or available for the user to identify any content playing or available that may be of interest to the user.

When the data processing system 130 identifies content playing or available that may be of interest to the user, the data processing system 130 can notify the user of such content. In some cases, the notification to the user can include a link to that content or an option for the user to view that content. The notification can additionally or alternatively include a natural language description of the content (and/or anything associated with the content such as an event, activity, character, player, score, scene, etc.) generated by the data processing system 130.

In some cases, the data processing system 130 can provide such a notification to another device, such as an IoT device, which can output the notification for the user. In some examples, the content of interest detected by the data processing system 130 can include something of interest to the user depicted in the content, such as an event, a scene, a character, an activity, a condition, betting information, etc. In some aspects, the data processing system 130 can determine an attention level of the user based on sensor data such as image data from a camera sensor. The data processing system 130 can use the attention level of the user to determine if the user may have missed something of interest to the user depicted in a video, and generate the notification for the user informing the user about such content.

Figure 9:
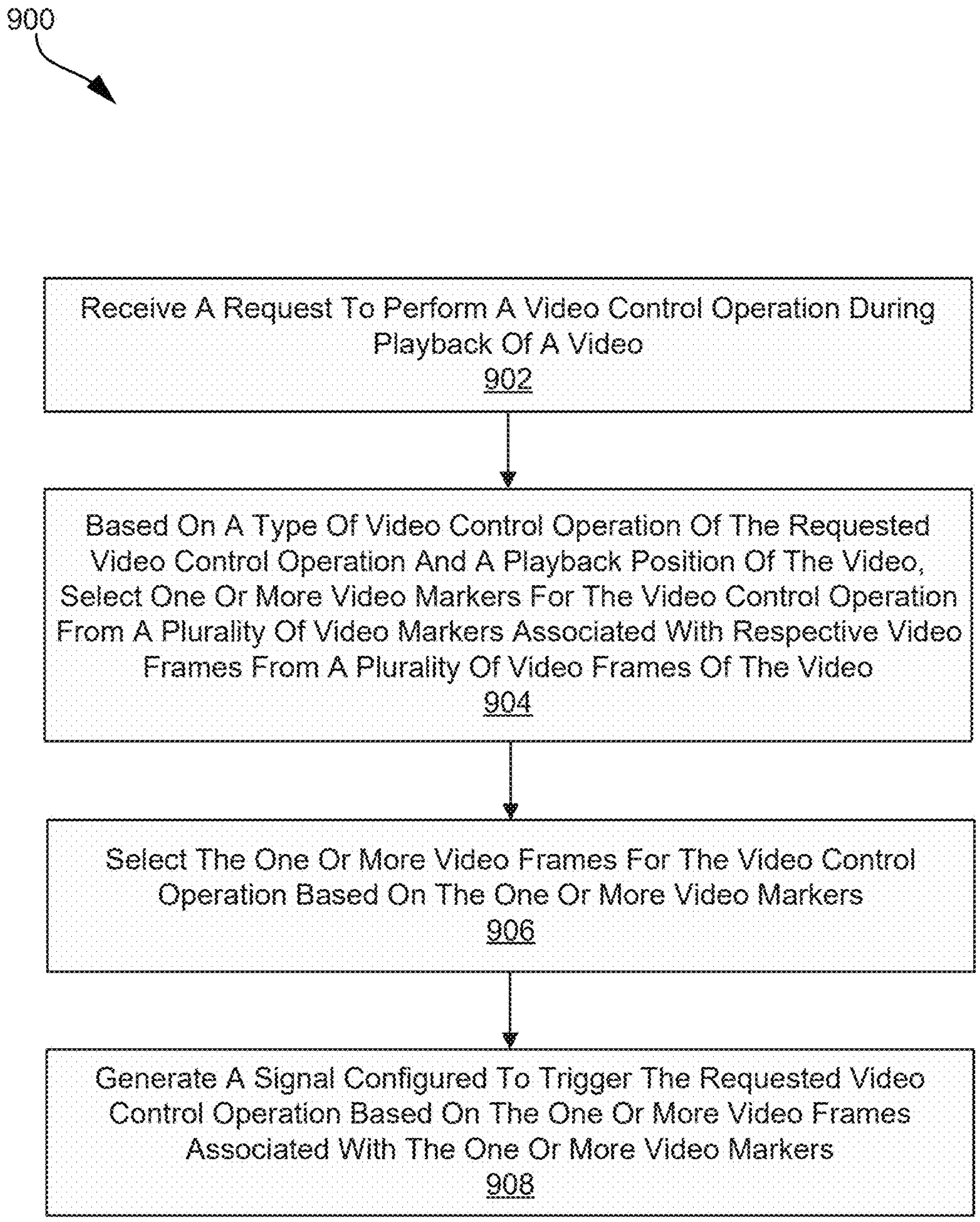
FIGS. 9 through 11 are flowcharts illustrating example methods for implementing smart video seek and playback experiences, according to some examples of the present disclosure.

FIG. 9 is a flowchart illustrating an example method 900 for implementing smart VSP experiences, according to some examples of the present disclosure. The method 900 can be performed by processing logic that can include hardware (e.g., circuitry, dedicated logic, programmable logic, microcode, etc.) and/or software (e.g., instructions executing on a processing device). It is to be appreciated that not all steps may be needed to perform the method 900. Further, some of the steps may be performed simultaneously, or in a different order than shown in FIG. 9, as will be understood by a person of ordinary skill in the art. Method 900 shall be described with reference to FIGS. 1 and 2. However, method 900 is not limited to those examples.

In this example, the method 900 for implementing smart VSP experiences corresponds to implementations from a backend system, such as a remote server(s), a cloud network, etc. In other examples, the method 900 for implementing smart VSP experiences can be implemented locally at the client device, as further described below with respect to FIG. 10.

At step 902, the data processing system 130 on the system server(s) 126 can receive a request to perform a video control operation during playback of a video at the media device(s) 106. In some cases, the request can include or represent a signal generated by the media device(s) 106 or the remote control(s) 110 based on a user input. Moreover, the video control operation can include a smart VSP operation for implementing a smart VSP experience as described herein.

For example, in some cases, the requested video control operation can include a smart replay operation, a smart skip operation, a smart rewind operation, a smart forward operation, a smart record operation, or a custom highlight video reel operation.

At step 904, the data processing system 130 on the system server(s) 126 can select, based on a type of video control operation of the requested video control operation and a playback position of the video, one or more video markers for the requested video control operation from video markers associated with video frames of the video. The one or more video markers can be associated with and/or identify one or more video frames of the video.

In some examples, to select the one or more video markers for the video control operation, the data processing system 130 on the system server(s) 126 can determine features associated with a video frame corresponding to the playback position of the video, determine one or more types of video frames for the video control operation based on the type of video control operation of the video control operation, and select the one or more video markers from the video markers based on the one or more types of video frames determined for the video control operation and a correlation between the one or more features associated with the video frame and one or more features associated with the one or more video frames associated with the one or more video markers. In some aspects, the one or more types of video frames can include a previous video frame relative to a location of the video frame within a sequence of the video and/or a future video frame relative to the location of the video frame within the sequence of the video.

In some examples, to select the one or more video markers for the requested video control operation, the data processing system 130 on the system server(s) 126 can determine one or more types of video frames for the requested video control operation based on the type of video control operation of the requested video control operation; based on the plurality of video markers, identify a set of video markers associated with a set of video frames matching at least one of the one or more types of video frames; based on a sequence of video frames of the video, determine a respective number of video frames within the sequence of video frames between a video frame corresponding to the playback position and each video frame from the set of video frames associated with the identified set of video markers; select the one or more video markers based on the respective number of video frames between the video frame corresponding to the playback position and each video frame from the set of video frames associated with the identified set of video markers. The one or more types of video frames can include a previous video frame relative to a location of the video frame within a sequence of the video and/or a future video frame relative to the location of the video frame within the sequence of the video.

In some examples, to select the one or more video markers for the video control operation, the data processing system 130 on the system server(s) 126 can also determine one or more features associated with the video frame corresponding to the playback position of the video; and select the one or more video markers further based on a correlation between the one or more features associated with the video frame corresponding to the playback position of the video and respective features associated with the set of video frames associated with the identified set of video markers.

At step 906, the data processing system 130 on the system server(s) 126 can select, for the requested video control operation, the one or more video frames based on the one or more video markers. The data processing system 130 on the system server(s) 126 can use the one or more video markers to identify the one or more video frames selected.

At step 908, the data processing system 130 (or the user interaction system 132) on the system server(s) 126 can generate a signal configured to trigger the requested video control operation at the media device(s) 106 based on the one or more video frames associated with the one or more video markers. For example, the one or more video frames can represent one or more video frames from which to start the video control operation, from which to end the video control operation, and/or to include in the video control operation. The data processing system 130 on the system server(s) 126 can thus use the one or more video frames to determine where to start the video control operation, what video frames to include in the video control operation, and/or which video frame corresponds to an end of the video control operation.

For example, the one or more video frames can include a video frame from which to start a replay or to play as part of the replay, a video frame to skip to, video frames to record, etc. Thus, the one or more video frames can be used to determine how to implement the replay, skip operation, or record operation.

In some examples, the signal can be configured to move the playback position of the video to a different position within the one or more video frames and continue playback of the video from the different position within the one or more video frames. In some cases, the signal can be configured to move the playback position to a first position within a video frame from the one or more video frames, initiate the requested video control operation from the first position within the video frame, and end the requested video control operation when playback of the video reaches a second position within a different video frame from the one or more video frames.

In some cases, the data processing system 130 on the system server(s) 126 can determine respective fingerprints for the video frames where each fingerprint from the respective fingerprints identifies a respective video frame from the plurality of video frames. The data processing system 130 on the system server(s) 126 can then determine similarity scores between the respective fingerprints determined for the plurality of video frames and select the one or more video markers based on a threshold similarity between one or more respective fingerprints of the one or more video frames associated with the one or more video markers and a respective fingerprint of a video frame corresponding to the playback position.

In some cases, the data processing system 130 on the system server(s) 126 can determine one or more features associated with content selected for a customized video package, determine, based on the one or more features, a fingerprint for a video frame comprising the content associated the one or more features, identify, based on the fingerprint determined for the video and respective fingerprints associated with video frames from one or more videos, a set of video frames from the video frames including content having a threshold similarity to the content associated with the video frame, and generate the customized video package based on the set of video frames.

Figure 10:
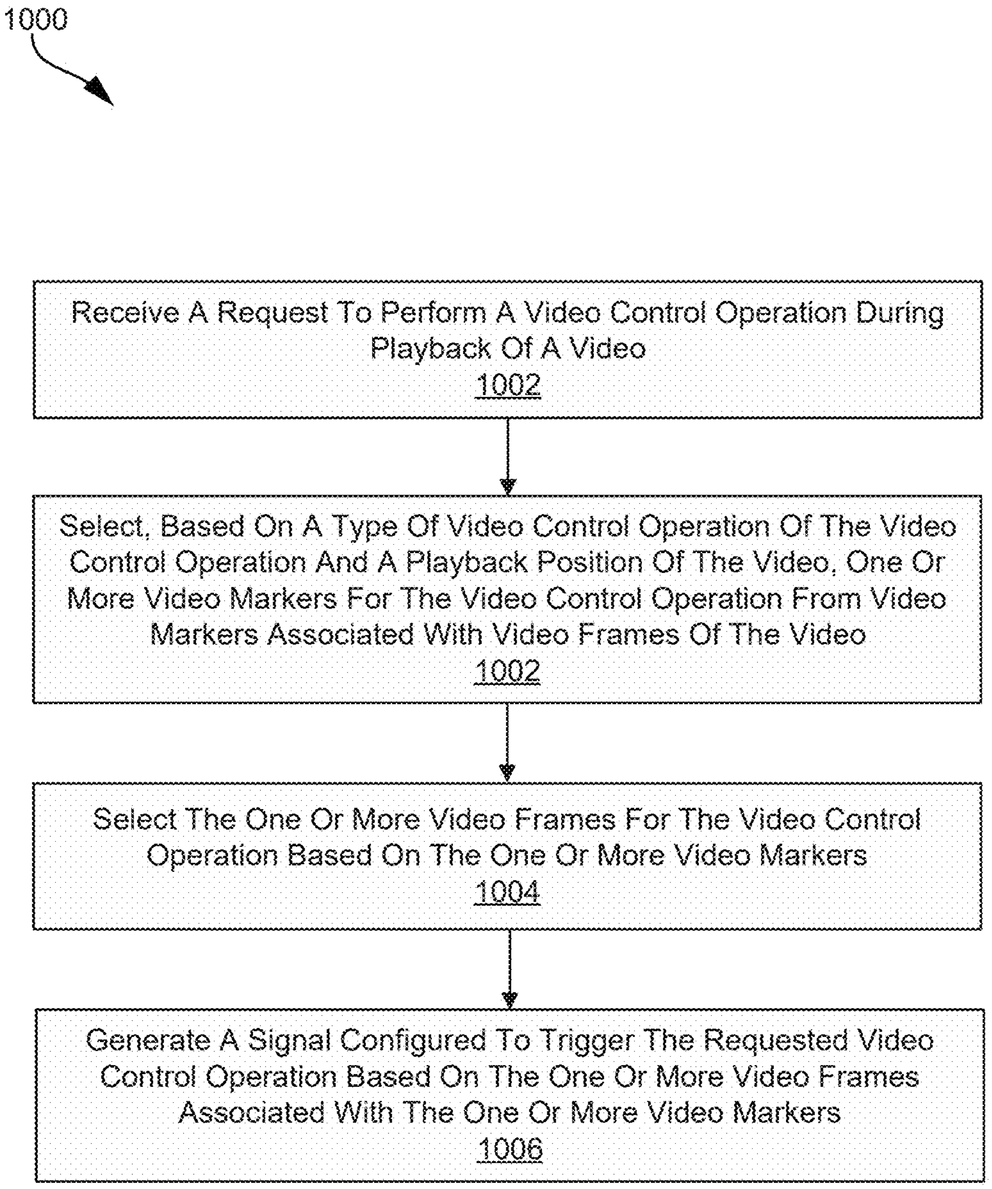

FIG. 10 is a flowchart illustrating an example method 1000 for implementing smart VSP experiences from a client device, according to some examples of the present disclosure. The method 1000 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the method 1000. Further, some of the steps may be performed simultaneously, or in a different order than shown in FIG. 10, as will be understood by a person of ordinary skill in the art. Method 1000 shall be described with reference to FIGS. 1 and 2. However, method 1000 is not limited to those examples.

At step 1002, the media device(s) 106 can receive a request to perform a video control operation during playback of a video at the media device(s) 106. The media device(s) 106 can receive the request from another device, such as the remote control(s) 110, or an application on the media device(s) 106, such as a media application, a web browser, or any other application.

For example, the remote control(s) 110 can include a button that, when pressed, causes the remote control(s) 110 to generate a signal to trigger a smart VSP experience, such as the video control operation, or may include multiple buttons that, when pressed, cause the remote control(s) 110 to generate different signals for triggering different smart VSP experiences. In some cases, the remote control(s) 110 can include a button configured to generate different signals for different smart VSP experiences which can depend on how the button is pressed/triggered. For example, the button can be configured to generate a signal for a particular smart VSP experience when the button is activated through a short press (e.g., when the button is pressed for less than a certain amount of time), a different signal for a different smart VSP experience when the button is activated through a long press (e.g., when the button is pressed for more than a certain amount of time), another different signal for another different smart VSP experience when the button is pressed multiple times, etc. In this way, the same button on the remote control(s) 110 can be configured to generate different signals for different smart VSP experiences depending on how the button is pressed (e.g., an amount of time the button is pressed and/or any other button press pattern) and/or how many times the button is pressed within a time interval (e.g., a time interval between button presses and/or between a first button press and a last button press).

In some cases, the request can include or represent a signal generated by media device(s) 106 or remote control(s) 110 based on a user input, such as a user input via an application on the media device(s) 106 or a user input including pressing a button on the remote control(s) 110.

The video control operation can include a smart VSP operation for implementing a smart VSP experience as described herein. For example, in some cases, the requested video control operation can include a smart replay operation, a smart skip operation, a smart rewind operation, a smart forward operation, a smart record operation, or a custom highlight video reel operation.

At step 1004, the data processing system 130 on the media device(s) 106 can select, based on a type of video control operation of the requested video control operation and a playback position of the video, one or more video markers for the requested video control operation from video markers associated with video frames of the video. In some cases, the data processing system 130 on the media device(s) 106 can receive the request, determine the type of video control operation requested and a playback position of the video, and select the one or more video markers for the requested video control operation. The one or more video markers can be associated with and/or identify one or more video frames of the video.

In some examples, to select the one or more video markers for the requested video control operation, the data processing system 130 on the media device(s) 106 can determine one or more features associated with a video frame corresponding to the playback position of the video, determine one or more types of video frames for the requested video control operation based on the type of video control operation of the requested video control operation, and select the one or more video markers from the video markers based on the one or more types of video frames determined for the requested video control operation and a correlation between the one or more features associated with the video frame and one or more features associated with the one or more video frames associated with the one or more video markers. In some aspects, the one or more types of video frames can include a previous video frame relative to a location of the video frame within a sequence of the video and/or a future video frame relative to the location of the video frame within the sequence of the video.

The one or more features can include any feature extracted from a content of the one or more video frames (e.g., from the one or more video frames, an audio of the one or more video frames, and/or a text portion of the one or more video frames), such as one or more events, activities, scenes, characters, patterns, conditions, movements, content attributes, contexts, objects, and/or characteristics depicted in the one or more video frames, described and/or identified in an audio portion of the one or more video frames, and/or described and/or identified in a text portion of the one or more video frames (e.g., closed captions, subtitles, supers, intertitles, metadata, etc.).

In some examples, to select the one or more video markers for the requested video control operation, the data processing system 130 on the media device(s) 106 can determine one or more types of video frames for the requested video control operation based on the type of video control operation of the requested video control operation; based on the plurality of video markers, identify a set of video markers associated with a set of video frames matching at least one of the one or more types of video frames; based on a sequence of video frames of the video, determine a respective number of video frames within the sequence of video frames between a video frame corresponding to the playback position and each video frame from the set of video frames associated with the identified set of video markers; select the one or more video markers based on the respective number of video frames between the video frame corresponding to the playback position and each video frame from the set of video frames associated with the identified set of video markers. The one or more types of video frames can include a previous video frame relative to a location of the video frame within a sequence of the video and/or a future video frame relative to the location of the video frame within the sequence of the video.

In some examples, to select the one or more video markers for the requested video control operation, the data processing system 130 on the media device(s) 106 can determine one or more features associated with the video frame corresponding to the playback position of the video; and select the one or more video markers further based on a correlation between the one or more features associated with the video frame corresponding to the playback position of the video and respective features associated with the set of video frames associated with the set of video markers.

In some cases, if the video includes a live feed, stream, or broadcast, the media device(s) 106 can buffer a portion of the video as the media device(s) 106 receives the portion of the video, and process the buffered portion of the video according to step 1004, 1006, and/or 1008, before processing the next buffered portion of the video.

At step 1006, the data processing system 130 on the media device(s) 106 can select, for the requested video control operation, the one or more video frames based on the one or more video markers. The data processing system 130 on the media device(s) 106 can use the one or more video markers to identify the one or more video frames.

At step 1008, the data processing system 130 (or the user interaction system 132) on the media device(s) 106 can generate a signal configured to trigger the media device(s) 106 (or an application on the media device(s) 106) to implement the requested video control operation based on the one or more video frames associated with the one or more video markers. For example, the one or more video frames can represent one or more video frames from which to start the video control operation, from which to end the video control operation, and/or to include in the video control operation. The media device(s) 106 can thus use the one or more video frames to determine where to start the video control operation, which video frames to include in the video control operation, and/or which video frame corresponds to the end of the video control operation.

For example, the one or more video frames can include a video frame from which to start a replay or to play as part of the replay, a video frame to skip to, video frames to record, etc. The media device(s) 106 can thus use the one or more video frames to perform the replay, skip operation, or record operation.

In some examples, the signal can be configured to move the playback position of the video to a different position within the one or more video frames and continue playback of the video from the different position within the one or more video frames. In some cases, the signal can be configured to move the playback position to a first position within a video frame from the one or more video frames, initiate the requested video control operation from the first position within the video frame, and end the requested video control operation when playback of the video reaches a second position within a different video frame from the one or more video frames.

In some cases, the data processing system 130 on the media device(s) 106 can determine respective fingerprints for the video frames where each fingerprint from the respective fingerprints identifies a respective video frame from the plurality of video frames. The data processing system 130 on the media device(s) 106 can then determine similarity scores between the respective fingerprints determined for the plurality of video frames and select the one or more video markers based on a threshold similarity between one or more respective fingerprints of the one or more video frames associated with the one or more video markers and a respective fingerprint of a video frame corresponding to the playback position.

In some cases, the data processing system 130 on the media device(s) 106 can determine one or more features associated with content selected for a customized video package, determine, based on the one or more features, a fingerprint for a video frame comprising the content associated the one or more features, identify, based on the fingerprint determined for the video and respective fingerprints associated with video frames from one or more videos, a set of video frames from the video frames including content having a threshold similarity to the content associated with the video frame, and generate the customized video package based on the set of video frames.

Figure 11:
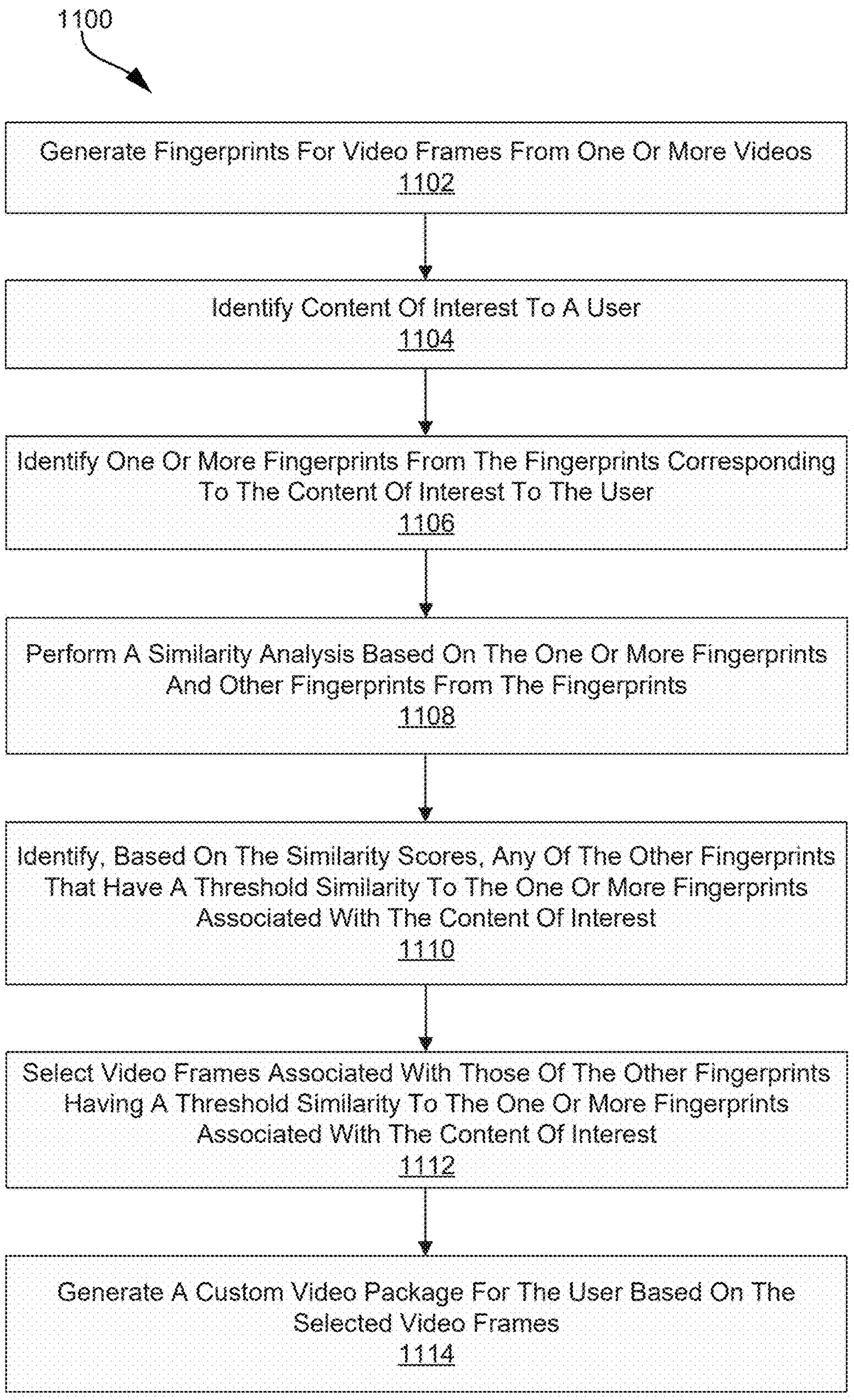

FIG. 11 is a flowchart illustrating another example method 1100 for implementing smart VSP experiences, according to some examples of the present disclosure. The method 1100 can be performed by processing logic that can include hardware (e.g., circuitry, dedicated logic, programmable logic, microcode, etc.) and/or software (e.g., instructions executing on a processing device). It is to be appreciated that not all steps may be needed to perform the method 1100. Further, some of the steps may be performed simultaneously, or in a different order than shown in FIG. 11, as will be understood by a person of ordinary skill in the art. Method 1000 shall be described with reference to FIG. 8. However, method 1100 is not limited to that example.

At step 1102, the data processing system 130 (on the media device(s) 106 and/or the system server(s) 126) can generate fingerprints 802 for video frames 808 from one or more videos. To generate the fingerprints 802, the data processing system 130 can extract respective features from the video frames 808 and use the respective features to generate the fingerprints 802 using, for example, a fingerprint algorithm and/or a hash function.

At step 1104, the data processing system 130 can identify content of interest to the user(s) 140. The content of interest to the user(s) 140 can include, for example, content including certain events, activities, scenes, characters, objects, betting information and/or conditions, attributes, patterns, movements, contexts, conditions, and/or any other characteristic. The data processing system 130 can identify the content (and/or content features) based on information associated with the user(s) 140 such as, for example, user preferences, user statistics, user interactions with content, previous content consumed by the user(s) 140, user feedback, and/or any other information.

At step 1106, the data processing system 130 can identify one or more fingerprints from the fingerprints 802 corresponding to the content of interest to the user(s) 140. The data processing system 130 can use the one or more fingerprints corresponding to content of interest to the user(s) 140 to provide customized video content for the user(s) 140.

At step 1108, the data processing system 130 can perform a similarity analysis based on the one or more fingerprints and any other fingerprints. The data processing system 130 can compare the one or more fingerprints corresponding to the content of interest with other fingerprints from the fingerprints 802 of video frames 808 to determine similarity scores between the one or more fingerprints corresponding to the content of interest and the other fingerprints.

At step 1110, the data processing system 130 can identify, based on the similarity scores, any of the other fingerprints that have a threshold similarity to the one or more fingerprints associated with the content of interest.

At step 1112, the data processing system 130 can select video frames associated with those of the other fingerprints having a threshold similarity to the one or more fingerprints associated with the content of interest. The selected video frames can represent video frames predicted to be of interest to the user(s) 140 based on the threshold similarity between fingerprints of those video frames and the one or more fingerprints associated with the content of interest to the user(s) 140.

At step 1114, the data processing system 130 can generate a custom video package for the user(s) 140 based on the selected video frames. For example, the data processing system 130 can combine or stitch together the video frames to generate the custom video package. The custom video package can include a customized video reel, a customized highlight video, a play-by-pay video reel, a video depicting favorite moments (or moments of interest) for the user(s) 140, and/or any other video package for the user(s) 140.

In some cases, the data processing system 130 can generate a notification indicating that a custom video package is available for the user(s) 140, providing the user(s) 140 an option to play the custom video package, and/or providing the user(s) 140 a link to play the video package.

In some cases, the video frames 802 associated with the fingerprints 802 can include video frames from multiple videos. In some examples, the video frames 802 can be part of a live video (e.g., a live video feed, broadcast, stream, etc.). In such cases, the data processing system 130 can select the video frames for the video package as they are received, or can buffer the video frames as they are received to process and select the video frames while they are stored in the buffer.

Example Neural Network Architectures

Figure 12:
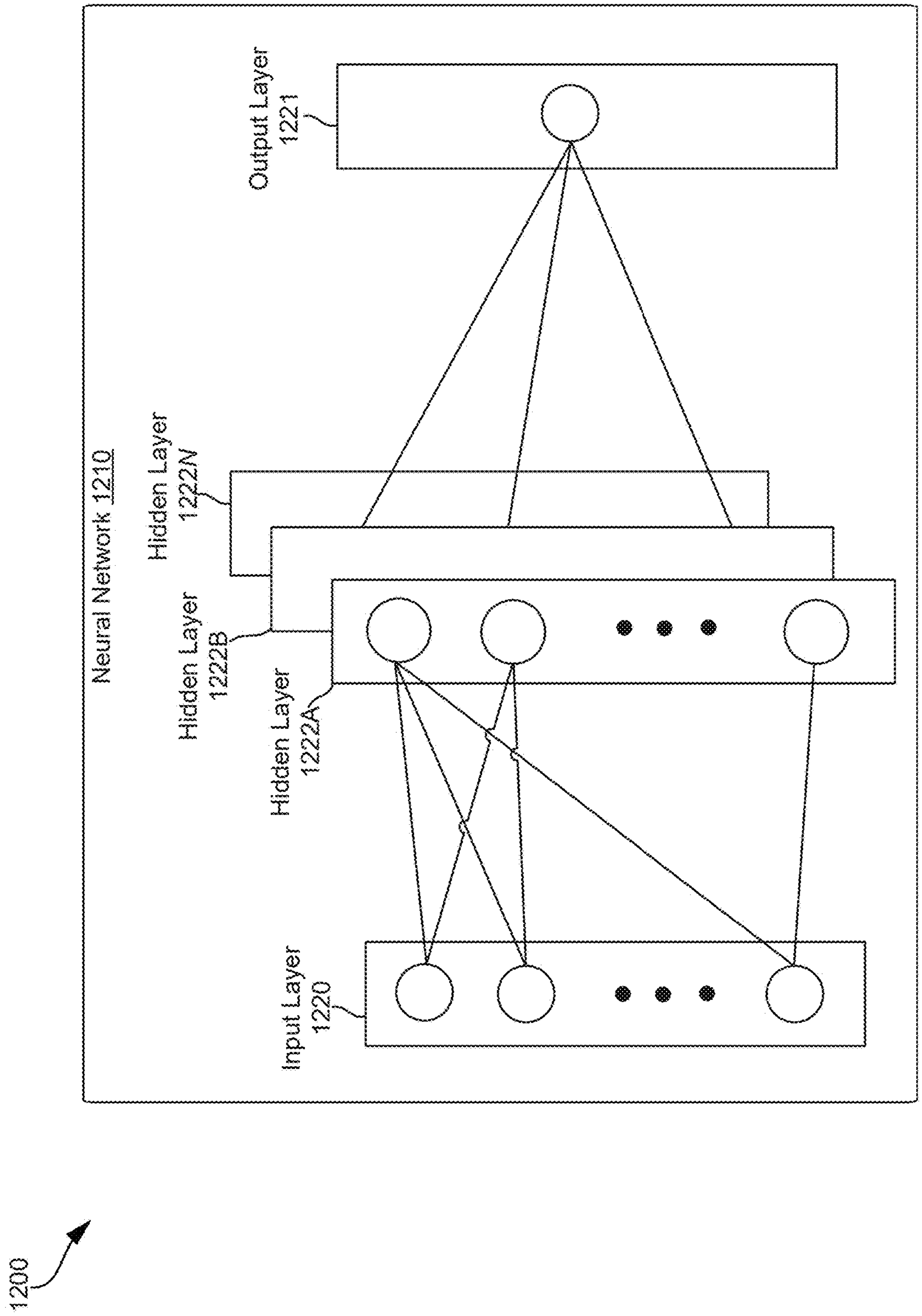
FIG. 12 is a diagram illustrating an example architecture of an example neural network, according to some examples of the present disclosure.

FIG. 12 is a diagram illustrating an example architecture 1200 of an example neural network 1210. The example architecture 1200 can be used to implement any neural network described herein and/or any components described herein that can include or implement a neural network. For example, the architecture 1200 can be used to implement the data processing system 130, the user interaction system 132, the detector engine 320, the smart VSP engine 324, AI model(s) 342, and/or any portion thereof.

The architecture 1200 of the neural network 1210 can include an input layer 1220 that can be configured to receive and process data to generate one or more outputs. The architecture 1200 of the neural network 1210 can also include hidden layers **1222*a*, 1222*b*, through 1222*n*. The hidden layers 1222*a*, 1222*b*, through 1222*n* include "n" number of hidden layers, where "n" is an integer greater than or equal to one. The number of hidden layers can be made to include as many layers as needed for the given application. The architecture 1200 of the neural network 1210 can further include an output layer 1221 that provides an output resulting from the processing performed by the hidden layers 1222*a*, 1222*b*, through 1222*n***.

The neural network 1210 is a multi-layer neural network of interconnected nodes. Each node can represent a piece of information. Information associated with the nodes is shared among the different layers and each layer retains information as information is processed. In some cases, the neural network 1210 can include a feed-forward network, in which case there are no feedback connections where outputs of the network are fed back into itself. In some cases, the neural network 1210 can include a recurrent neural network, which can have loops that allow information to be carried across nodes while reading in input.

Information can be exchanged between nodes through node-to-node interconnections between the various layers. Nodes of the input layer 1220 can activate a set of nodes in the first hidden layer **1222*a*. For example, as shown, each of the input nodes of the input layer 1220 is connected to each of the nodes of the first hidden layer 1222***a*. The nodes of the first hidden layer 1222*a* can transform the information of each input node by applying activation functions to the input node information. The information derived from the transformation can then be passed to and can activate the nodes of the next hidden layer 1222*b*, which can perform their own designated functions. Example functions include convolutional, up-sampling, data transformation, and/or any other suitable functions. The output of the hidden layer 1222*b* can then activate nodes of the next hidden layer, and so on. The output of the last hidden layer 1222*n* can activate one or more nodes of the output layer 1221, at which an output is provided. In some cases, while nodes in the neural network 1210 are shown as having multiple output lines, a node can have a single output and all lines shown as being output from a node represent the same output value.

In some cases, each node or interconnection between nodes can have a weight that is a set of parameters derived from the training of the neural network 1210. Once the neural network 1210 is trained, it can be referred to as a trained neural network, which can be used to generate one or more outputs. For example, an interconnection between nodes can represent a piece of information learned about the interconnected nodes. The interconnection can have a tunable numeric weight that can be tuned (e.g., based on a training dataset), allowing the neural network 1210 to be adaptive to inputs and able to learn as more and more data is processed.

The neural network 1210 is pre-trained to process the features from the data in the input layer 1220 using the different hidden layers 1222*a*, 1222*b*, through 1222*n* in order to provide the output through the output layer 1221. In some cases, the neural network 1210 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a number of iterations for each set of training data until the neural network 1210 is trained well enough so the weights of the layers are accurately tuned.

To perform training, a loss function can be used to analyze an error in the output. Any suitable loss function definition can be used, such as a Cross-Entropy loss. Another example of a loss function includes the mean squared error (MSE), defined as E_total=Σ(½ (target-output)^2). The loss can be set to be equal to the value of E_total.

The loss (or error) will be high for the initial training data since the actual values will be much different than the predicted output. The goal of training is to minimize the amount of loss so that the predicted output is the same as the training output. The neural network 1210 can perform a backward pass by determining which inputs (weights) most contributed to the loss of the network and can adjust the weights so that the loss decreases and is eventually minimized.

The neural network 1210 can include any suitable deep network. One example neural network includes a transformer network, which can be used to implement a large language model. Another example neural network includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 1210 can include any other deep network, such as a encoder-decoder network, an encoder-only network, a decoder-only network, a mixture of experts (MoE) network, a generative model network, an autoencoder, Deep Belief Nets (DBNs), Recurrent Neural Networks (RNNs), among others.

As understood by those of skill in the art, machine-learning based techniques can vary depending on the desired implementation. For example, machine-learning schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Minwise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Example Computer System

Figure 13:
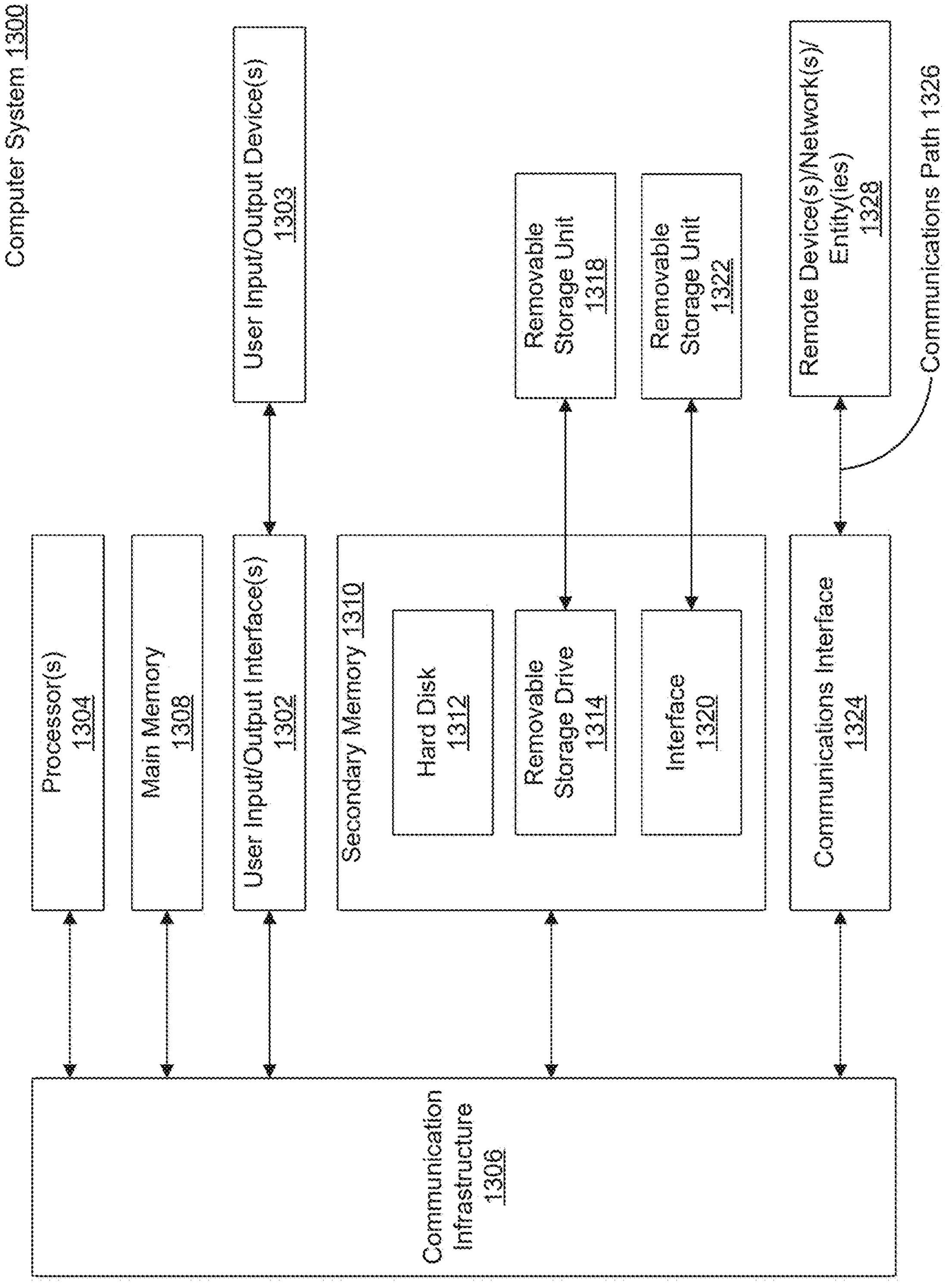
FIG. 13 illustrates an example computer system that can be used for implementing various aspects of the present disclosure.

Various aspects may be implemented, for example, using one or more well-known computer systems, such as computer system 1300 shown in FIG. 13. For example, media device(s) 106, display device(s) 108, content server(s) 120, system server(s) 126, and/or any other device may be implemented using combinations or sub-combinations of computer system 1300. Also or alternatively, computer system 1300 may be used, for example, to implement any of the aspects and examples discussed herein, as well as combinations and sub-combinations thereof.

Computer system 1300 may include one or more processors (e.g., central processing units or CPUs), such as processor 1304. Processor 1304 may be connected to a communication infrastructure 1306 (or communication bus). Computer system 1300 may include user input/output device(s) 1303, such as monitors, keyboards, pointing devices, etc., which may communicate with communication infrastructure 1306 through user input/output interface(s) 1302.

In some examples, the one or more processors 1304 may include a graphics processing unit (GPU). A GPU may include a specialized electronic circuit designed to process mathematically intensive applications. The GPU may have a structure that is efficient for parallel processing of blocks of data, such as mathematically intensive data common to computer graphics applications, images, videos, etc. The one or more processors 1304 may additionally or alternatively include or be part of a digital signal processor (DSP), an image signal processor (ISP), an application-specific integrated circuit (ASIC), a field-programmable gate array (FPGA), an integrated circuit, a microcontroller, and/or any other processing device.

Computer system 1300 may include main or primary memory 1308, such as random access memory (RAM). Main memory 1308 may include one or more levels of cache. Main memory 1308 may have stored therein control logic (e.g., computer software) and/or data. Computer system 1300 may also include one or more secondary storage devices or memory 1310. Secondary memory 1310 may include, for example, a hard disk drive 1312 and/or a removable storage device or drive 1314. Removable storage drive 1314 may include a floppy disk drive, magnetic tape drive, compact disk drive, optical storage device, tape backup device, and/or any other storage device.

Removable storage drive 1314 may interact with a removable storage unit 1318. Removable storage unit 1318 may include a computer-readable storage device having stored thereon software (control logic) and/or data. Removable storage unit 1318 may be a floppy disk, magnetic tape, compact disk, DVD, optical storage disk, and/any other computer data storage device. Removable storage drive 1314 may read from and/or write to removable storage unit 1318.

Secondary memory 1310 may include other means, devices, components, instrumentalities or approaches for allowing computer programs, instructions and/or data to be accessed by computer system 1300. Such means, devices, components, instrumentalities or other approaches may include, for example, removable storage unit 1322 and interface 1320. Examples of the removable storage unit 1322 and the interface 1320 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1300 may include a communication or network interface 1324. Communication interface 1324 may enable computer system 1300 to communicate and interact with any combination of external devices, external networks, external entities, etc. (individually and collectively referenced by reference number 1328). For example, communication interface 1324 may allow computer system xx00 to communicate with external or remote devices 1328 over communications path 1326, which may be wired and/or wireless (or a combination thereof), and which may include any combination of LANs, WANs, the Internet, etc. Control logic and/or data may be transmitted to and from computer system 1300 via communication path 1326.

Computer system 1300 may include a personal digital assistant (PDA), a computer (e.g., a desktop computer, laptop or notebook computer, netbook, tablet, etc.), a mobile phone, smart wearable device, an Internet-of-Things device, and/or an embedded system, to name a few examples. Computer system 1300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (Saas), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of these examples or other services or delivery paradigms.

Any applicable data structures, file formats, and schemas in computer system 1300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some examples, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1300, main memory 1308, secondary memory 1310, and removable storage units 1318 and 1322, as well as tangible articles of manufacture embodying any combination of the foregoing. Such control logic, when executed by one or more data processing devices (such as computer system 1300 or processor(s) 1304), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

CONCLUSION

It is to be appreciated that the detailed description section, and not any other section, is intended to be used to interpret the claims. Other sections can set forth one or more but not all examples as contemplated by the inventor(s) and thus, are not intended to limit this disclosure or the appended claims in any way. While this disclosure describes examples, embodiments, fields and applications, the disclosure is not limited thereto. Other examples, embodiments and modifications are possible and within the scope and spirit of the disclosure. For example and without limiting the generality of this paragraph, embodiments are not limited to software, hardware, firmware, and/or entities illustrated in the figures and/or described herein. Embodiments (whether or not explicitly described herein) have significant utility to fields and applications beyond the examples described herein.

Embodiments have been described with the aid of functional building blocks illustrating the implementation of specified functions and relationships thereof. The boundaries of these functional building blocks have been defined herein for the convenience of the description. Alternate boundaries can be defined as long as the functions and relationships (or equivalents thereof) are appropriately performed. Also, alternative embodiments can perform functional blocks, steps, operations, methods, etc. using orderings different than those described herein.

References herein to "one embodiment," "an embodiment," or similar phrases, indicate that the embodiment may include a particular feature, structure, or characteristic, but every embodiment may not necessarily include the particular feature, structure, or characteristic. Such phrases are not necessarily referring to the same embodiment. When a particular feature, structure, or characteristic is described in connection with an embodiment, it would be within the knowledge of persons skilled in the art(s) to incorporate such feature, structure, or characteristic into other embodiments whether or not explicitly mentioned or described. Some embodiments can be described using the expression "coupled" and "connected" along with their derivatives. These terms are not necessarily intended as synonyms for each other. For example, some embodiments can be described using the terms "connected" and/or "coupled" to indicate that elements are in physical or electrical contact with each other. The term "coupled," however, can also mean that elements are not in direct contact with each other, but co-operate or interact with each other.

The breadth and scope of the disclosure should not be limited by any of the above-described embodiments, but should be defined in accordance with the following claims and their equivalents.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A system comprising memory and one or more processors coupled to the memory and configured to perform operations comprising: receiving a request to perform a video control operation during playback of a video at a client device; based on a type of video control operation of the requested video control operation and a playback position of the video, selecting one or more video markers for the requested video control operation from a plurality of video markers associated with respective video frames from a plurality of video frames of the video, the one or more video markers being associated with one or more video frames of the video; selecting the one or more video frames for the requested video control operation based on the one or more video markers; and generating a signal configured to trigger the requested video control operation at the client device based on the one or more video frames associated with the one or more video markers.

Aspect 2. The system of Aspect 1, wherein the requested video control operation comprises a replay operation, a skip operation, a rewind operation, a forward operation, a record operation, or a custom highlight video reel operation.

Aspect 3. The system of any of Aspects 1 to 2, wherein the signal is configured to move the playback position of the video to a different position within the one or more video frames and continue playback of the video from the different position within the one or more video frames.

Aspect 4. The system of any of Aspects 1 to 3, wherein the signal is configured to move the playback position to a first position within a video frame from the one or more video frames, initiate the requested video control operation from the first position within the video frame, and end the requested video control operation when playback of the video reaches a second position within a different video frame from the one or more video frames.

Aspect 5. The system of any of Aspects 1 to 4, wherein selecting the one or more video markers for the requested video control operation comprises: determining one or more features associated with a video frame corresponding to the playback position of the video; determining one or more types of video frames for the requested video control operation based on the type of video control operation of the requested video control operation, the one or more types of video frames comprising at least one of a previous video frame relative to a location of the video frame within a sequence of the video and a future video frame relative to the location of the video frame within the sequence of the video; and selecting the one or more video markers from the plurality of video markers based on the one or more types of video frames determined for the requested video control operation and a correlation between the one or more features associated with the video frame and one or more features associated with the one or more video frames associated with the one or more video markers.

Aspect 6. The system of any of Aspects 1 to 5, wherein selecting the one or more video markers for the requested video control operation comprises: determining one or more types of video frames for the requested video control operation based on the type of video control operation of the requested video control operation, the one or more types of video frames comprising at least one of a previous video frame relative to a location of the video frame within a sequence of the video and a future video frame relative to the location of the video frame within the sequence of the video; based on the plurality of video markers, identifying a set of video markers associated with a set of video frames matching at least one of the one or more types of video frames; based on a sequence of video frames of the video, determining a respective number of video frames within the sequence of video frames between a video frame corresponding to the playback position and each video frame from the set of video frames associated with the identified set of video markers; selecting the one or more video markers from the plurality of video markers based on the respective number of video frames between the video frame corresponding to the playback position and each video frame from the set of video frames associated with the identified set of video markers.

Aspect 7. The system of Aspect 6, wherein the one or more processors are configured to perform operations further comprising: determining one or more features associated with the video frame corresponding to the playback position of the video; and selecting the one or more video markers further based on a correlation between the one or more features associated with the video frame corresponding to the playback position of the video and respective features associated with the set of video frames associated with the identified set of video markers.

Aspect 8. The system of any of Aspects 1 to 7, wherein the one or more processors are configured to perform operations further comprising: determining respective fingerprints for the plurality of video frames, each fingerprint from the respective fingerprints identifying a respective video frame from the plurality of video frames; determining similarity scores between the respective fingerprints determined for the plurality of video frames; and selecting the one or more video markers based on a threshold similarity between one or more respective fingerprints of the one or more video frames associated with the one or more video markers and a respective fingerprint of a video frame corresponding to the playback position.

Aspect 9. The system of any of Aspects 1 to 8, wherein the one or more processors are configured to perform operations further comprising: determining one or more features associated with content selected for a customized video package; based on the one or more features, determining a fingerprint for a video frame comprising the content associated the one or more features; based on the fingerprint determined for the video and respective fingerprints associated with video frames from one or more videos, identifying a set of video frames from the video frames comprising content having a threshold similarity to the content associated with the video frame; and generating the customized video package based on the set of video frames.

Aspect 10. The system of any of Aspects 1 to 9, further comprising the client device, and wherein the request to perform the video control operation is received from at least one of a remote control associated with the client device and a user input via the client device.

Aspect 11. A computer-implemented method comprising: receiving a request to perform a video control operation during playback of a video at a client device; based on a type of video control operation of the requested video control operation and a playback position of the video, selecting one or more video markers for the requested video control operation from a plurality of video markers associated with respective video frames from a plurality of video frames of the video, the one or more video markers being associated with one or more video frames of the video; selecting the one or more video frames for the requested video control operation based on the one or more video markers; and generating a signal configured to trigger the requested video control operation at the client device based on the one or more video frames associated with the one or more video markers.

Aspect 12. The computer-implemented method of Aspect 11, wherein the requested video control operation comprises a replay operation, a skip operation, a rewind operation, a forward operation, a record operation, or a custom highlight video reel operation.

Aspect 13. The computer-implemented method of any of Aspects 11 to 12, wherein the signal is configured to move the playback position of the video to a different position within the one or more video frames and continue playback of the video from the different position within the one or more video frames.

Aspect 14. The computer-implemented method of any of Aspects 11 to 13, wherein the signal is configured to move the playback position to a first position within a video frame from the one or more video frames, initiate the requested video control operation from the first position within the video frame, and end the requested video control operation when playback of the video reaches a second position within a different video frame from the one or more video frames.

Aspect 15. The computer-implemented method of any of Aspects 11 to 14, wherein the requested video control operation comprises adjusting one or more settings of the video, wherein the one or more settings comprises at least one of a display setting, a playback setting, an audio output setting, a closed caption setting, a language setting, and a video setting.

Aspect 16. The computer-implemented method of any of Aspects 11 to 15, wherein selecting the one or more video markers for the requested video control operation comprises: determining one or more features associated with a video frame corresponding to the playback position of the video; determining one or more types of video frames for the requested video control operation based on the type of video control operation of the requested video control operation, the one or more types of video frames comprising at least one of a previous video frame relative to a location of the video frame within a sequence of the video and a future video frame relative to the location of the video frame within the sequence of the video; and selecting the one or more video markers from the plurality of video markers based on the one or more types of video frames determined for the requested video control operation and a correlation between the one or more features associated with the video frame and one or more features associated with the one or more video frames associated with the one or more video markers.

Aspect 17. The computer-implemented method of any of Aspects 11 to 16, wherein selecting the one or more video markers for the requested video control operation comprises: determining one or more types of video frames for the requested video control operation based on the type of video control operation of the requested video control operation, the one or more types of video frames comprising at least one of a previous video frame relative to a location of the video frame within a sequence of the video and a future video frame relative to the location of the video frame within the sequence of the video; based on the plurality of video markers, identifying a set of video markers associated with a set of video frames matching at least one of the one or more types of video frames; based on a sequence of video frames of the video, determining a respective number of video frames within the sequence of video frames between a video frame corresponding to the playback position and each video frame from the set of video frames associated with the identified set of video markers; selecting the one or more video markers from the plurality of video markers based on the respective number of video frames between the video frame corresponding to the playback position and each video frame from the set of video frames associated with the identified set of video markers.

Aspect 18. The computer-implemented method of Aspect 17, further comprising: determining one or more features associated with the video frame corresponding to the playback position of the video; and selecting the one or more video markers further based on a correlation between the one or more features associated with the video frame corresponding to the playback position of the video and respective features associated with the set of video frames associated with the identified set of video markers.

Aspect 19. The computer-implemented method of any of Aspects 11 to 18, further comprising: determining one or more features associated with content selected for a customized video package; based on the one or more features, determining a fingerprint for a video frame comprising the content associated the one or more features; based on the fingerprint determined for the video and respective fingerprints associated with video frames from one or more videos, identifying a set of video frames from the video frames comprising content having a threshold similarity to the content associated with the video frame; and generating the customized video package based on the set of video frames.

Aspect 20. The computer-implemented method of any of Aspects 11 to 19, further comprising: determining respective fingerprints for the plurality of video frames, each fingerprint from the respective fingerprints identifying a respective video frame from the plurality of video frames; determining similarity scores between the respective fingerprints determined for the plurality of video frames; and selecting the one or more video markers based on a threshold similarity between one or more respective fingerprints of the one or more video frames associated with the one or more video markers and a respective fingerprint of a video frame corresponding to the playback position.

Aspect 21. The computer-implemented method of any of Aspects 11 to 20, wherein the request to perform the video control operation is received from at least one of a remote control associated with the client device and a user input via the client device.

Aspect 22. A non-transitory computer-readable medium having instructions stored thereon that, when executed by one or more processors, cause the one or more processors to perform a method according to any of Aspects 11 to 21.

Aspect 23. A system comprising means for performing a method according to any of Aspects 11 to 21.

What is claimed is:

1. A system comprising:
- memory; and
- one or more processors coupled to the memory and configured to perform operations comprising:
  - receiving a request to perform a video control operation during playback of a video at a client device;
  - selecting, from a plurality of video markers associated with the video, one or more video markers for the requested video control operation based on a type of video control operation of the requested video control operation, a playback position of the video, a representation of a video frame corresponding to the playback position of the video, and one or more respective representations of one or more video frames associated with the one or more video markers, wherein the representation of the video frame comprises one or more features or a fingerprint of the video frame, and wherein the one or more respective representations of the one or more video frames comprise one or more respective features or one or more respective fingerprints of the one or more video frames;
  - selecting the one or more video frames for the requested video control operation based on the one or more video markers; and
  - generating a signal configured to trigger the requested video control operation at the client device based on the one or more video frames associated with the one or more video markers.

2. The system of claim 1, wherein the requested video control operation comprises a replay operation, a skip operation, a rewind operation, a forward operation, a record operation, or a custom highlight video reel operation.

3. The system of claim 1, wherein the signal is configured to move the playback position of the video to a different position within the video corresponding to a specific video frame from the one or more video frames, and continue playback of the video from the different position.

4. The system of claim 1, wherein the signal is configured to move the playback position to a first position within the video corresponding to a first video frame from the one or more video frames, initiate the requested video control operation from the first position, and end the requested video control operation when playback of the video reaches a second position within the video corresponding to a second video frame from the one or more video frames.

5. The system of claim 1, wherein selecting the one or more video markers for the requested video control operation comprises:
- determining the one or more features of the video frame corresponding to the playback position of the video;
- determining one or more types of video frames for the requested video control operation based on the type of video control operation of the requested video control operation, the one or more types of video frames comprising at least one of a previous video frame relative to a location of the video frame within a sequence of the video and a future video frame relative to the location of the video frame within the sequence of the video; and
- selecting the one or more video markers based on the one or more types of video frames determined for the requested video control operation and a correlation between the one or more features of the video frame corresponding to the playback position and the one or more respective features of the one or more video frames associated with the one or more video markers.

6. The system of claim 1, wherein selecting the one or more video markers for the requested video control operation comprises:
- determining one or more types of video frames for the requested video control operation based on the type of video control operation of the requested video control operation, the one or more types of video frames comprising at least one of a previous video frame relative to a location of the video frame within a sequence of the video and a future video frame relative to the location of the video frame within the sequence of the video;
- based on the plurality of video markers, identifying a set of video markers associated with a set of video frames matching at least one of the one or more types of video frames, wherein the set of video markers comprises the one or more video markers and the set of video frames comprises the one or more video frames associated with the one or more video markers;
- based on a sequence of video frames of the video, determining a respective number of video frames within the sequence of video frames between the video frame corresponding to the playback position of the video and each video frame from the set of video frames;
- selecting the one or more video markers from the plurality of video markers based on the respective number of video frames between the video frame corresponding to the playback position of the video and each video frame from the set of video frames associated with the set of video markers.

7. The system of claim 6, wherein selecting the one or more video markers for the requested video control operation further comprises:
- determining the one or more features of the video frame corresponding to the playback position of the video; and
- selecting the one or more video markers further based on a correlation between the one or more features associated with the video frame corresponding to the playback position of the video and respective features associated with the set of video frames associated with the set of video markers, the respective features associated with the set of video frames comprising the one or more respective features of the one or more video frames associated with the one or more video markers.

8. The system of claim 1, wherein selecting the one or more video markers for the requested video control operation further comprises:
- determining respective fingerprints for a plurality of video frames, wherein the respective fingerprints comprise the one or more respective fingerprints of the one or more video frames associated with the one or more video markers, and wherein each fingerprint from the respective fingerprints identifies a respective video frame from the plurality of video frames;

determining similarity scores between the respective fingerprints determined for the plurality of video frames; and selecting the one or more video markers based on a threshold similarity between the one or more respective fingerprints of the one or more video frames and the fingerprint of the video frame corresponding to the playback position.

9. The system of claim 1, wherein the one or more processors are configured to perform operations further comprising:

determining one or more features of content selected for a customized video package;

based on the one or more features of the content, determining a respective fingerprint of a specific video frame comprising the content;

based on the respective fingerprint of the specific video frame and respective fingerprints of video frames from one or more videos, identifying a set of video frames from the video frames comprising respective content having a threshold similarity to the content associated with the specific video frame; and generating the customized video package based on the set of video frames.

10. The system of claim 1, further comprising the client device, and wherein the request to perform the video control operation is received from at least one of a remote control associated with the client device and a user input via the client device.

11. A computer-implemented method comprising:

receiving a request to perform a video control operation during playback of a video at a client device;

selecting, from a plurality of video markers associated with the video, one or more video markers for the requested video control operation based on a type of video control operation of the requested video control operation, a playback position of the video, a representation of a video frame corresponding to the playback position of the video, and one or more respective representations of one or more video frames associated with the one or more video markers, wherein the representation of the video frame comprises one or more features or a fingerprint of the video frame, and wherein the one or more respective representations of the one or more video frames comprise one or more respective features or one or more respective fingerprints of the one or more video frames;

selecting the one or more video frames for the requested video control operation based on the one or more video markers; and generating a signal configured to trigger the requested video control operation at the client device based on the one or more video frames associated with the one or more video markers.

12. The computer-implemented method of claim 11, wherein the video control operation comprises a replay operation, a skip operation, a rewind operation, a forward operation, a record operation, or a custom highlight video reel operation.

13. The computer-implemented method of claim 11, wherein the signal is configured to move the playback position of the video to a different position within the video corresponding to a specific video frame from the one or more video frames, and continue playback of the video from the different position.

14. The computer-implemented method of claim 11, wherein the signal is configured to move the playback position to a first position within the video corresponding to a first video frame from the one or more video frames, initiate the requested video control operation from the first position, and end the requested video control operation when playback of the video reaches a second position within the video corresponding to a second video frame from the one or more video frames.

15. The computer-implemented method of claim 11, wherein selecting the one or more video markers for the requested video control operation comprises:

determining the one or more features of the video frame corresponding to the playback position of the video;

determining one or more types of video frames for the requested video control operation based on the type of video control operation of the requested video control operation, the one or more types of video frames comprising at least one of a previous video frame relative to a location of the video frame within a sequence of the video and a future video frame relative to the location of the video frame within the sequence of the video; and selecting the one or more video markers based on the one or more types of video frames determined for the requested video control operation and a correlation between the one or more features of the video frame corresponding to the playback position and the one or more respective features of the one or more video frames associated with the one or more video markers.

16. The computer-implemented method of claim 11, wherein selecting the one or more video markers for the video control operation comprises:

determining one or more types of video frames for the requested video control operation based on the type of video control operation of the requested video control operation, the one or more types of video frames comprising at least one of a previous video frame relative to a location of the video frame within a sequence of the video and a future video frame relative to the location of the video frame within the sequence of the video;

based on the plurality of video markers, identifying a set of video markers associated with a set of video frames matching at least one of the one or more types of video frames, wherein the set of video markers comprises the one or more video markers and the set of video frames comprises the one or more video frames associated with the one or more video markers;

based on a sequence of video frames of the video, determining a respective number of video frames within the sequence of video frames between the video frame corresponding to the playback position of the video and each video frame from the set of video frames;

selecting the one or more video markers from the plurality of video markers based on the respective number of video frames between the video frame corresponding to the playback position of the video and each video frame from the set of video frames associated with the set of video markers.

17. The computer-implemented method of claim 16, wherein selecting the one or more video markers for the requested video control operation further comprises:

determining the one or more features of the video frame corresponding to the playback position of the video; and selecting the one or more video markers further based on a correlation between the one or more features associated with the video frame corresponding to the playback position of the video and respective features associated with the set of video frames associated with the set of video markers, the respective features associated with the set of video frames comprising the one or more respective features of the one or more video frames associated with the one or more video markers.

18. The computer-implemented method of claim 11, further comprising:

determining one or more features of content selected for a customized video package;

based on the one or more features of the content, determining a respective fingerprint of a specific video frame comprising the content;

based on the respective fingerprint of the specific video frame and respective fingerprints of video frames from one or more videos, identifying a set of video frames from the video frames comprising respective content having a threshold similarity to the content associated with the specific video frame; and generating the customized video package based on the set of video frames.

19. The computer-implemented method of claim 11, wherein the request to perform the video control operation is received from at least one of a remote control associated with the client device and a user input via the client device.

20. A non-transitory computer-readable medium having instructions stored thereon that, when executed by one or more processors, cause the one or more processors to perform operations comprising:

receiving a request to perform a video control operation during playback of a video at a client device;

selecting, from a plurality of video markers associated with the video, one or more video markers for the requested video control operation based on a type of video control operation of the requested video control operation, a playback position of the video, a representation of a video frame corresponding to the playback position of the video, and one or more respective representations of one or more video frames associated with the one or more video markers, wherein the representation of the video frame comprises one or more features or a fingerprint of the video frame, and wherein the one or more respective representations of the one or more video frames comprise one or more respective features or one or more respective fingerprints of the one or more video frames;

selecting the one or more video frames for the requested video control operation based on the one or more video markers; and generating a signal configured to trigger the requested video control operation at the client device based on the one or more video frames associated with the one or more video markers.

* * * * *